US012703393B2

(12) United States Patent
Nister

(10) Patent No.: US 12,703,393 B2
(45) Date of Patent: Aug. 11, 2026

(54) MOTION PLANNING

(71) Applicant: NVIDIA Corporation, Santa Clara, CA (US)

(72) Inventor: David Nister, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 133 days.

(21) Appl. No.: 18/674,639

(22) Filed: May 24, 2024

(65) Prior Publication Data

US 2024/0400098 A1 Dec. 5, 2024

Related U.S. Application Data

(60) Provisional application No. 63/469,311, filed on May 26, 2023.

(51) Int. Cl.
*B60W 60/00* (2020.01)
*B60W 50/00* (2006.01)

(52) U.S. Cl.
CPC ........ *B60W 60/0011* (2020.02); *B60W 50/00* (2013.01); *B60W 2050/0005* (2013.01); *B60W 2520/105* (2013.01)

(58) Field of Classification Search
None
See application file for complete search history.

(56) References Cited

U.S. PATENT DOCUMENTS

| | | | |
|---|---|---|---|
| 10,573,071 B2 | 2/2020 | Sun et al. | |
| 11,619,943 B2 | 4/2023 | Jing et al. | |
| 11,842,528 B2 | 12/2023 | Wheeler et al. | |
| 11,860,628 B2 | 1/2024 | Nister et al. | |

(Continued)

FOREIGN PATENT DOCUMENTS

| | | |
|---|---|---|
| CN | 111426330 A | 7/2020 |
| WO | 2017139613 | 8/2017 |

OTHER PUBLICATIONS

Lavalle, et al.; "Planning Algorithms. Cambridge University Press, 2006," Section 7.6, Chapters 5,8, and 10, (2006) 1023 pgs.

(Continued)

*Primary Examiner* — James J Lee
*Assistant Examiner* — Jonathan E Reinert
(74) *Attorney, Agent, or Firm* — IRON SUMMIT IP LLP

(57) ABSTRACT

Path planning may be performed under non-holonomic constraints based at least on discretizing and selectively analyzing a solution space using a graph that includes vertices corresponding to machine configurations in a configuration space, along with associated maneuver types used by the machine to traverse these configurations. The graph may include transition edges associating costs with machine transitions between maneuver types and maneuvers. One or more of the vertices may correspond to a transition state between maneuver types. In some examples, a maneuver type may be used as a transition state between maneuver types to reduce the vertices and edges of the graph. The graph may incorporate vertices and edges representing optimal maneuver types for traversing the configuration space, including longitudinally extremal and/or laterally extremal maneuvers based on machine models.

20 Claims, 34 Drawing Sheets

(56) References Cited

U.S. PATENT DOCUMENTS

| | | | | |
|---|---|---|---|---|
| 11,926,346 | B2 | 3/2024 | Yang et al. | |
| 12,077,181 | B1 | 9/2024 | Costantino et al. | |
| 12,296,847 | B1 * | 5/2025 | Choi | B60W 30/18163 |
| 12,606,207 | B2 | 4/2026 | Nister | |
| 2011/0087371 | A1 | 4/2011 | Sandberg et al. | |
| 2018/0172450 | A1 | 6/2018 | Lalonde et al. | |
| 2019/0012832 | A1 | 1/2019 | Sun et al. | |
| 2019/0299410 | A1 | 10/2019 | Sinyavskiy et al. | |
| 2020/0089245 | A1 | 3/2020 | Yadmellat et al. | |
| 2020/0301434 | A1 | 9/2020 | Manna et al. | |
| 2021/0020045 | A1 | 1/2021 | Huang et al. | |
| 2021/0254983 | A1 | 8/2021 | Wheeler et al. | |
| 2021/0331670 | A1 * | 10/2021 | Valchok | G01C 21/3658 |
| 2022/0290997 | A1 * | 9/2022 | Cserna | G01C 21/32 |
| 2022/0355819 | A1 | 11/2022 | Yu et al. | |
| 2022/0396289 | A1 | 12/2022 | Li et al. | |
| 2022/0404829 | A1 | 12/2022 | Nister et al. | |
| 2023/0037767 | A1 | 2/2023 | Yang et al. | |
| 2023/0097767 | A1 | 3/2023 | Sato et al. | |
| 2024/0034307 | A1 | 2/2024 | Szlachetka et al. | |
| 2024/0059317 | A1 * | 2/2024 | Quirynen | B60W 30/09 |
| 2024/0391495 | A1 | 11/2024 | Nister | |
| 2024/0400097 | A1 | 12/2024 | Nister | |
| 2024/0400098 | A1 | 12/2024 | Nister | |

OTHER PUBLICATIONS

Liu, et al. (Jun. 2017). Boundary Layer Heuristic for Search-Based Nonholonomic Path Planning in Maze-Like Environments. In 2017 IEEE Intelligent Vehicles Symposium (IV) (pp. 831-836). IEEE, 6 pgs.

Cheng, et al. (2014). Professional CUDA c programming. John Wiley & Sons, 527 pgs.

Paeth, A. W. (Aug. 1986). A fast algorithm for general raster rotation. In Proceedings on Graphics Interface'86/Vision Interface'86 (pp. 77-81). 5 pgs.

Agarwal, et al.; "Approximation algorithms for curvature-constrained shortest paths," SIAM Journal on Computing, 2001, 10 pgs.

Backer, et al.; "A Complete Approximation Algorithm for Shortest bounded-Curvature Paths," ISAAC 2008: Algorithms and Computation, pp. 628-643, 2008.

Bialkowski, et al.; "Massively parallelizing the RRT and the RRT*", IEEE/RSJ International Conference on Intelligent Robots and Systems, Sep. 25, 2011 (pp. 3513-3518). IEEE.

Cao, et al.; "Parallel Banding Algorithm to Compute Exact Distance Transform with the GPU," Proceedings of the 2010 ACM SIGGRAPH Symposium on Interactive 3D Graphics and Games 2010, 8 pgs.

Dubins, et al.; "On curves of minimal length with a constraint on average curvature, and with prescribed initial and terminal positions and tangents", American Journal of Mathematics, (1957).

Ichter, et al.; "Group Marching Tree: Sampling-based Approximately Optimal Motion Planning on GPUs," First IEEE International Conference on Robotic Computing, Apr. 10, 2017, 8 pgs.

Jacobs, et al.; "Robust Motion Planning for Mobile Robots," IEEE International Conference on Robotics and Automation, 2-7, 1990.

Jacobs, et al.; "Planning Smooth Paths for Mobile Robots," Nonholonomic Motion Planning, 1993, 6 pgs.

Kider, Jr. et al.; "High-Dimensional Planning on the GPU," IEEE International Conference on Robotics and Automation, May 3, 2010, 8 pgs.

Kirkpatrick, et al.; "Hardness Results for Two-Dimensional Curvature-Constrained Motion Planning," In CCCG, Toronto ON, Aug. 2011, 6 pgs.

Laumond, et al.; "A Motion Planner For Nonholonomic Mobile Robots," IEEE Transaction on Robotics and Automation, Oct. 1994, 17 pgs.

Lemire, "Streaming Maximum-Minimum Filter Using No. More Than Three Comparisons Per Element," arXiv preprint cs/0610046, Oct. 9, 2006, 12 pgs.

McNaughton; "Parallel Algorithms for Real-Time Motion Planning," Doctoral Dissertation, Carnegie Mellon University, 2011, 233 pgs.

Meijster, et al.; "A General Algorithm for Computing Distance Transforms in Linear Time," Mathematical Morphology and its application to image and signal processing, 2000, 11 pgs.

Munkres, "Topology," Second Edition, Prentice Hall, ISBN 0-13-181629-2, 2000.

Pan, et al.; "g-Planner: Real-time Motion Planning and Global Navigation using GPUs," In Twenty-Fourth AAAI Conference on Artificial Intelligence, Jul. 2010, 7 pgs.

Pan, et al.; "GPU-based Parallel Collision Detection for Fast Motion Planning," The International Journal of Robotics Research, Feb. 2012, 12 pgs.

Park, et al.; "RealTime GPU-based motion planning for task executions", IEEE International Conf. on Robotics and Automation Workshop on Combining Task and Motion Planning, May 2013.

Parkinson, et al., "A Hamilton-Jacobi formulation for time-optimal paths of rectangular non-holonomic vehicles", IEEE Conference on Decision and Control, 4073-4078, Dec. 14, 2020.

Pivtoraiko, et al.; "Efficient Constrained Path Planning Via Search in State Lattices," International Symposium on AI, Robotics, and Automation in Space, Sep. 5, 2005, 7 pgs.

Pivtoraiko, et al.; "Differentially constrained mobile robot motion planning in state lattices", Journal of Field Robotics. Mar. 2009;26(3):308-33.

Plaku, et al.; "Sampling-based Roadmap of Trees for Parallel Motion Planning," IEEE Transactions on Robotics 21.4 (2005), 12 pgs.

Reeds, et al.; "Optimal Paths for a Car That Goes Both Forwards and Backwards," Pacific Journal of Mathematics, 1990, 28 pgs.

Reif, et al.; "The Complexity of the Two Dimensional Curvature-constrained Shortest-path Problem," Workshop on the Algorithmic Foundations of Robotics, Natick, MA, USA, pp. 49-57. A.K. Peters, ltd., 1998.

Sellen, "Approximation and Decision Algorithms for Curvature-Constrained Path Planning: A State-Space Approach," Workshop on the Algorithmic Foundations of Robotics, pp. 59-67, Dec. 15, 1998.

Soueres, et al.; "Shortest Paths Synthesis for a Car-Like Robot," IEEE Transactions on Automatic Control, 41(5), 672-688, 1996.

Sussmann, et al.; "Shortest Paths for the Reeds-Shepp Car: A Worked Out Example of the Use of Geometric Techniques in Nonlinear Optimal Control," Rutgers Center for Systems and Control Tech Report, 1991, 72 pgs.

Sussmann, "The Markov-Dubins problem with angular acceleration control", Proceedings of the 36th IEEE Conference on Decision and Control, 3:2639-2643, Dec. 12, 1997.

Gulati, et al.; "A Nonlinear Constrained Optimization Framework for Comfortable and Customizable Motion Planning of Nonholonomic Mobile Robots—Part I," arXiv:1305.5024; May 22, 2013, 51 pgs.

Laumond, et al.; "A Motion Planner for Nonholonomic Mobile Robots," IEEE Transaction on Robotics and Automation, vol. 10, No. 5, Oct. 1994, 17 pgs.

Nister, David; Non-Final Office Action for U.S. Appl. No. 18/674,551, filed May 24, 2024, mailed Oct. 27, 2025, 31 pgs.

Nister, David; Non-Final Office Action for U.S. Appl. No. 18/674,591, filed May 24, 2024, mailed Oct. 29, 2025, 35 pgs.

Wang, et al.; "Approximation algorithms for curvature-constrained shortest paths," SIAM Journal on Computing, 2001, 10 pgs.

Nister, David; Final Office Action for U.S. Appl. No. 18/674,591, filed May 24, 2024, mailed Apr. 9, 2026, 33 pgs.

Nister, David; Notice of Allowance for U.S. Appl. No. 18/674,551, filed May 24, 2024, mailed Mar. 9, 2026, 11 pgs.

* cited by examiner

SELECTIVELY ANALYZE A GRAPH INCLUDING:
VERTICES INDEXED AT LEAST BY CONFIGURATIONS AND MANEUVER TYPES OF A MACHINE,
MANEUVER EDGES LINKING FIRST GROUPS OF THE VERTICES THAT CORRESPOND TO A SAME MANEUVER TYPE,
AND TRANSITION EDGES LINKING SECOND GROUPS OF THE VERTICES THAT CORRESPOND TO DIFFERENT MANEUVER TYPES
B1002

DETERMINE ONE OR MORE PATHS THROUGH THE GRAPH
B1004

PERFORM ONE OR MORE CONTROL OPERATIONS ASSOCIATED WITH THE MACHINE
B1006

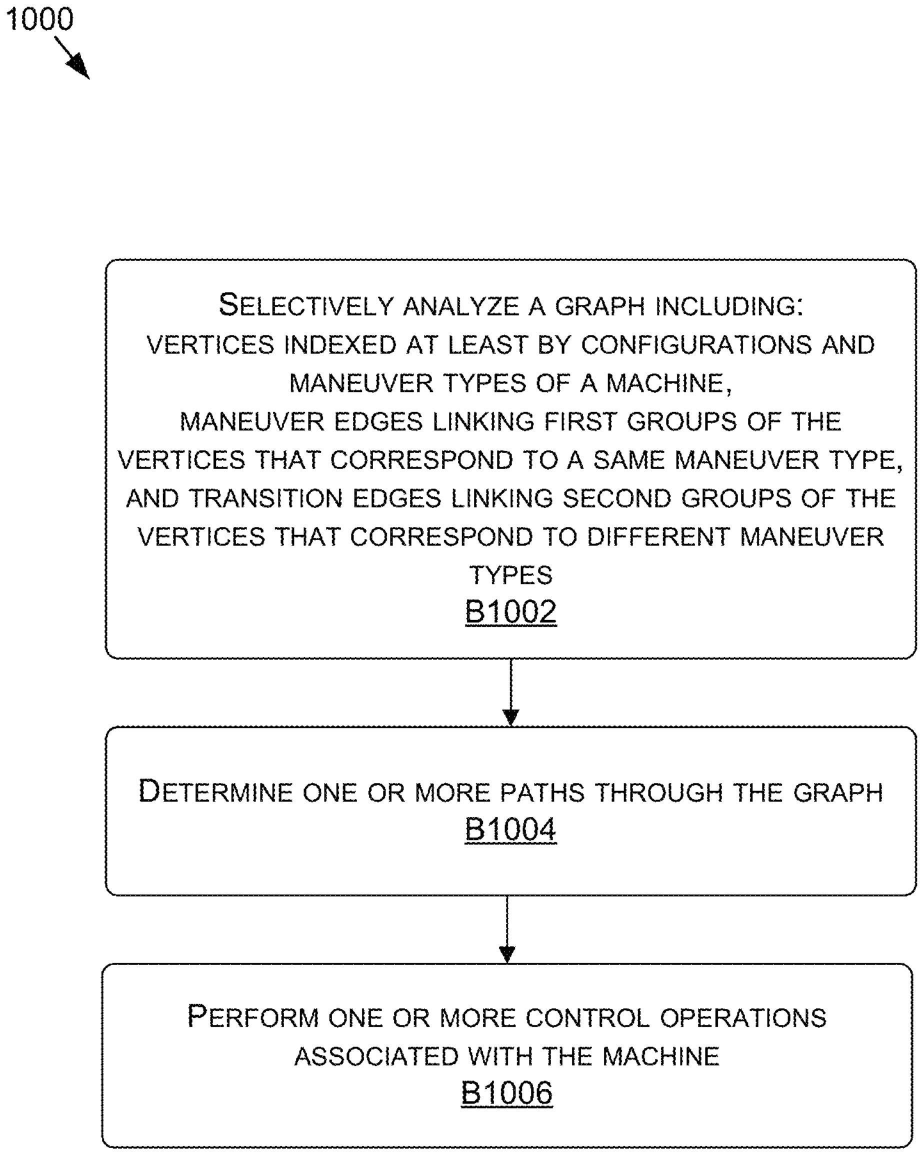

```
for (c=0, i=0; i<N; i++) {
  c      = max(c+1, O[i]);     //Update cost
  c      = min(c, Ri[i]);      //Update cost
  Ro[i]  = c;                  //Store back
}
```

1530

```
for(v=∞, i=0; i<N; i++) {
   u      = V[i];                   //Read value from volume
   V[i]   = min(v,u);               //Store back best value
   v      = min(v,u+ct)+cx*B[i];    //Update value
}
```

OVERWRITE THE ONE OR MORE SECOND COST VALUES WITH THE ONE OR MORE FIRST COST VALUES IN A MEMORY VOLUME THAT CORRESPONDS TO CONFIGURATIONS OF A CONFIGURATION SPACE
B1604

DETERMINE ONE OR MORE PATHS THROUGH THE CONFIGURATION SPACE USING THE ONE OR MORE FIRST COST VALUES
B1606

PERFORM ONE OR MORE CONTROL OPERATIONS ASSOCIATED WITH THE MACHINE
B1608

2200

ANALYZE ONE OR MORE DISCRETIZED SPATIAL GRIDS REPRESENTING CONFIGURATIONS OF A MACHINE, THE CONFIGURATIONS BEING PARAMETERIZED USING ONE OR MORE VARIABLES CORRESPONDING TO A CURVATURE OF STEERING OF THE MACHINE
B2202

DETERMINE ONE OR MORE PATHS THROUGH THE CONFIGURATIONS
B2204

PERFORM ONE OR MORE CONTROL OPERATIONS ASSOCIATED WITH THE MACHINE
B2206

MOTION PLANNING

CROSS-REFERENCE TO RELATED APPLICATIONS

This application claims the benefit of U.S. Provisional Application No. 63/469,311, filed on May 26, 2023, the contents of which are hereby incorporated by reference in their entirety.

BACKGROUND

The Piano Mover's problem is a classic challenge in the field of robotics and motion planning, involving navigating a rigid object through a cluttered environment without collisions. Complexity arises when considering the object's shape, size, and the spatial constraints of the environment. Traditionally, the Piano Mover's problem has been approached by discretizing a configuration space into a regular grid—allowing for the use of graph-based algorithms to find a path from a starting position to a goal. However, this approach does not account for non-holonomic constraints, which are essential for accurately modeling the motion of certain objects, such as vehicles and robots that may be unable to move directly sideways.

Addressing non-holonomic constraints in motion planning introduces significant challenges. The solution space should be formulated to capture the object's limited motion capabilities. Traditional motion planning methods work well for holonomic systems, where control inputs to the object directly correspond to degrees of freedom but fall short when applied to non-holonomic systems. For example, it is challenging to create a graph representation of the configuration space that corresponds to an objects' kinematics in non-holonomic systems. Additionally, efficiently storing and processing cost values associated with traversing the configuration space is complex, especially when aiming for real-time planning capabilities in dynamic environments.

SUMMARY

Embodiments of the present disclosure relate to graphs for non-holonomic motion planning for autonomous and semi-autonomous systems and applications. Systems and methods are disclosed that may determine a path of a vehicle through a configuration space while accounting for non-holonomic motion constraints.

In contrast to traditional approaches, disclosed approaches may perform path planning under non-holonomic constraints based at least on discretizing and selectively analyzing the solution space using a graph that includes vertices corresponding to machine configurations in a configuration space, along with associated maneuver types used by the machine to traverse these configurations. Additionally, disclosed approaches provide for graphs with transition edges, associating costs with machine transitions between maneuver types and maneuvers. In at least one embodiment, one or more of the vertices may correspond to a transition state between maneuver types. In further respects, a maneuver type may be used as a transition state between maneuver types to reduce the vertices and edges of the graph. Furthermore, the graph may incorporate vertices and edges representing optimal maneuver types for traversing the configuration space, including longitudinally extremal and/or laterally extremal maneuvers based on machine models.

BRIEF DESCRIPTION OF THE DRAWINGS

The present systems and methods for graphs for non-holonomic motion planning for autonomous and semi-autonomous systems and applications are described in detail below with reference to the attached drawing figures, wherein:

FIG. 10 is a flow diagram showing a method for selectively analyzing a graph having vertices are indexed by configurations and maneuver type and edges corresponding to maneuvers and transitions between maneuvers, in accordance with some embodiments of the present disclosure;

DETAILED DESCRIPTION

Figure 1A:
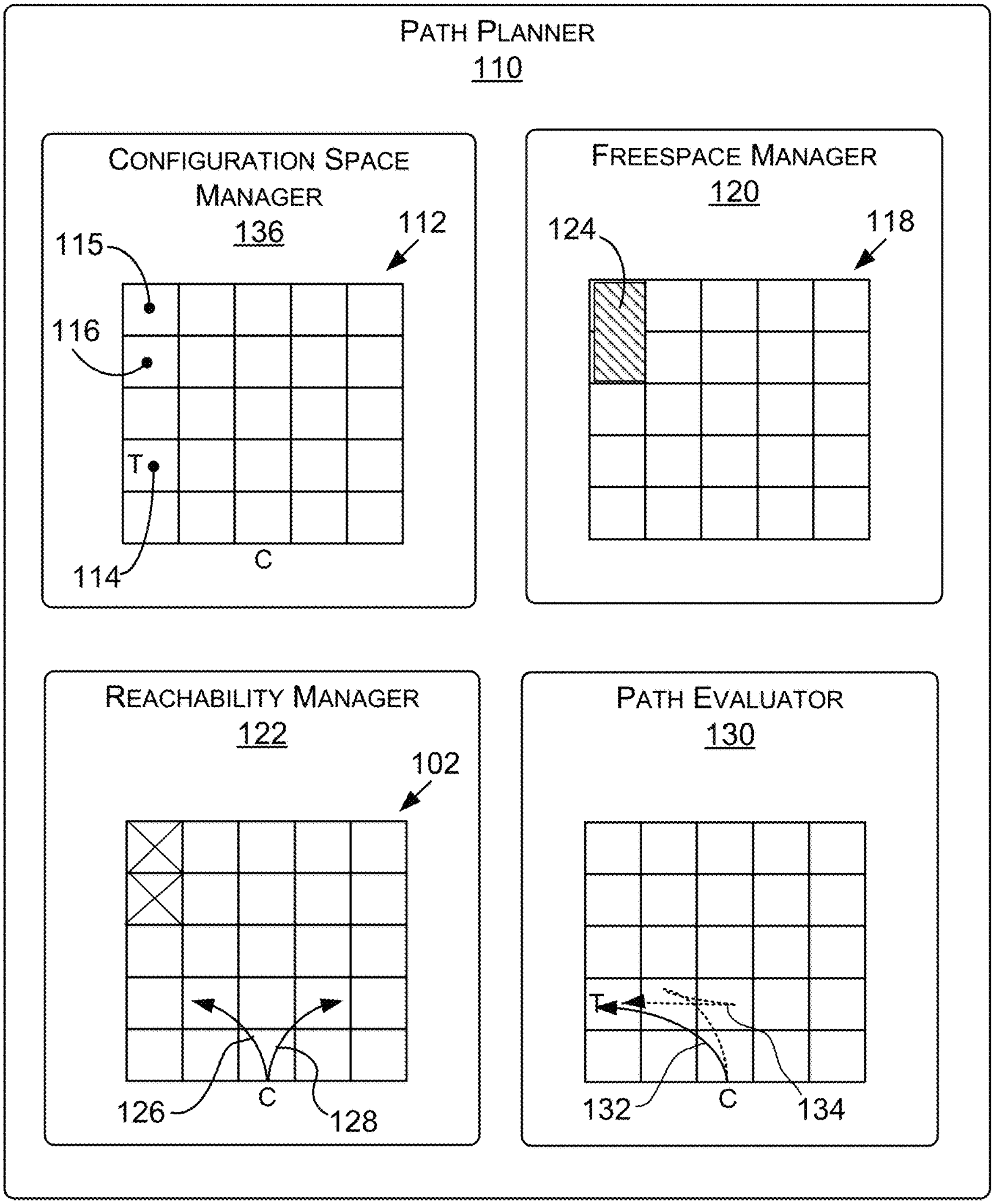
FIG. 1A is an illustration including an example of a path planner, in accordance with some embodiments of the present disclosure.

Systems and methods are disclosed related to graphs for non-holonomic motion planning for autonomous systems and applications. Although the present disclosure may be described with respect to an example autonomous or semi-autonomous vehicle or machine 2600 (alternatively referred to herein as "vehicle 2600," "ego-vehicle 2600," "ego-machine 2600," or "machine 2600," an example of which is described with respect to FIGS. 26A-26D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to path planning for controlling a vehicle, this is not intended to be limiting, and the systems and methods described herein may be used in augmented reality, virtual reality, mixed reality, robotics, security and surveillance, autonomous or semi-autonomous machine applications, and/or any other technology spaces where path planning or analysis may be used.

In one or more embodiments, disclosed approaches provide for path planning under non-holonomic constraints based at least on discretizing a solution space using a graph. In at least one embodiment, the graph includes vertices corresponding to configurations of a machine in a configuration space (e.g., as described herein) and respective maneuver types used by the machine to traverse the configurations. By associating vertices with both configurations of the machine and respective maneuver types available to the machine, disclosed approaches may selectively analyze the graph while accounting for one or more of a cost(s) associated with the machine maintaining a maneuver of a particular maneuver type(s) (e.g., a maneuver cost) and/or a cost(s) associated with the machine transitioning the maneuver to a different maneuver type(s) (e.g., a transition cost).

In further respects, in addition to or alternatively from providing a graph having one or more vertices corresponding to a respective maneuver type(s), disclosed approaches provide for graphs having transition edges to associate a cost(s) with the machine transitioning between maneuver types and/or maneuvers. For example, without such transition costs, a search of the graph may result in a path that frequently switches between maneuver types and/or maneuvers (e.g., with no penalty). Using transition costs, switching between maneuver types and/or maneuvers may be sufficiently discouraged when evaluating potential paths for the machine.

In further respects, in addition to or alternatively from the forgoing, disclosed approaches provide for graphs having one or more vertices that correspond to a transition state(s) between one or more maneuver types and/or maneuvers for traversing the configurations of the configuration space. By associating vertices with transition states, a graph for modeling the solution space may require fewer vertices and/or edges, and/or a cost(s) may be associated with the machine transitioning between maneuver types and/or maneuvers (e.g., transition costs). For example, using at least one vertex corresponding to and/or indexed as a transition state, vertices that correspond to different maneuver types may be connected through a transition state vertex, rather than requiring separate edges between each pair of vertices. Further, in one or more embodiments, the number of vertices may be reduced based at least on using at least one vertex corresponding to and/or indexed as a transition state and a maneuver type(s). Thus, the total number of vertices and/or edges needed for the graph may be reduced as separate vertices may not be need for the transition state and the maneuver type(s). By way of example, a straight maneuver type may be used as a transition state between a left maneuver type and a right maneuver type. Using one or more vertices corresponding to a transition state(s) may further allow for reduced storage and computing to track costs associated with potential paths through the graph, for example, using kernel style processing as described herein.

In further respects, in addition to or alternatively from the forgoing, disclosed approaches provide for graphs having one or more vertices and/or edges that correspond to one or more maneuver types for traversing the configurations of the configuration space, where the maneuver types may provide for more optimal paths through the configuration space. In one or more embodiments, one or more of the maneuver types include one or more longitudinally extremal maneuvers for a longitudinally extremal model of the machine and/or one or more laterally extremal maneuvers for a laterally extremal model of the machine. Using extremal models of the machine may ensure that a finite set of maneuver types can be analyzed with respect to a graph of a solution space to derive a shortest path through a corresponding configuration space.

In certain applications, an objective may be to maneuver a vehicle under non-holonomic constraints into a spot or location (e.g., a parking spot from within roughly line of sight distances), while avoiding collision with obstacles (e.g., other vehicles, pillars, barriers, walls, parking structures, pedestrians, etc.). Systems and methods are disclosed that may determine a path (e.g., a multi-point turn suitable for parking or maneuvering in tight quarters) of a vehicle from a current pose to a target pose in a configuration space, in which poses may be in freespace or blocked by an obstacle (e.g., perceived or predicted obstacle based on vehicle sensor data). That is, several different paths may exist from the current pose to the target pose, and each path may be made up of different combinations of maneuver types (e.g., sharp left turn, slight left turn, straight, slight right turn, and sharp right turn) and directions (e.g., forward and reverse). Moreover, one or more obstacles may be positioned along one or more of the paths. Disclosed approaches may be used to evaluate the paths to identify a recommended path around the obstacle(s) and to the target pose based on one or more criteria (e.g., shortest distance, fastest, lowest number of maneuvers, etc.).

Disclosed approaches may model object motion using maneuver types. A maneuver type may refer to a specific category of movements or actions that an object can perform. For example, each maneuver type may correspond to a distinct set of maneuvers and/or movements that a vehicle can execute. Each maneuver type may be configured to model a different respective movement pattern, such as turning left, going straight, or turning right. In at least one embodiment, each maneuver type may be characterized by one or more corresponding constraints on or definitions of (e.g., mathematically modeled using one or more motion models) parameters and/or movements such as, but not limited to, curvature, direction, velocity, acceleration, steering, distance covered, angular change, and/or other features described herein.

In a graph configuration, a maneuver edge may represent continuous movements within an instances of a maneuver type. A transition edge may represent changes between different instances of maneuver types and often incurs additional cost to simulate the time or effort required for such transition.

Various aspects of the disclosure may be implemented using parallelized or serial graph-search algorithms. For example, classic graph-search algorithms such as Dijkstra's algorithm or A* algorithm may be used. In at least one embodiment, an iterative approach may be used where in an iteration, reachability of a set of trajectories, path segments, or maneuvers may be evaluated (e.g., in parallel), and the results may serve as inputs to evaluate reachability of the set of trajectories (or a different set of trajectories) in a subsequent iteration (effectively extending reachable trajectories with additional trajectories). Inferior path recommendations may be avoided by thoroughly exploring path possibilities.

Various disclosed approaches allow for massive parallelism that can take advantage of modern parallel processing architectures (e.g., having thousands of cores and/or threads) and/or efficient techniques for storing, representing, and/or processing the solution space used for motion planning under non-holonomic constraints.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing language models, such as large language models (LLMs) or vision language models (VLMs), systems implementing one or more multi-modal language models), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1A, FIG. 1A is an illustration including an example of a path planner 110, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In at least one embodiment, the path planner 110 may include a configuration space manager 136, a freespace manager 120, a reachability manager 122, and a path evaluator 130. The configuration space manager 136 may manage a configuration space 112, which may represent potential configurations of a vehicle (or other object) in an environment (e.g., a parking lot), such as poses (e.g., poses 114, 116, and 115) comprising positions and orientations.

The freespace manager 120 and the reachability manager 122 may process the configuration space 112 to determine one or more paths for maneuvering from a current pose C to a target pose T (or generally between any number of poses) in the configuration space 112. For example, the freespace manager 120 may collision test the vehicle with objects 124 in the environment to determine an occupancy space(s) 118 that may capture which poses may be blocked or occupied (e.g., the pose 116 and the pose 115) and which poses may be free or unoccupied (e.g., the pose 114). The reachability manager 122 may analyze at least portions of trajectories (e.g., the trajectories 126 and 128) of poses that the vehicle may traverse in the configuration space 112 to determine a reachability space(s) 102 (which may also be referred to as a cost space or volume) that may capture which poses in the configuration space 112 are reachable by the trajectories and/or costs of reaching those poses. The path evaluator 130 may identify one or more proposed or potential paths for the vehicle based at least on the assessment by the reachability manager 122. For example, the path evaluator 130 may identify and/or evaluate the paths or multi-segment trajectories (e.g., paths 132 and 134) based on one or more criteria (e.g., distance, number of turns, number of gear changes, cost, reachability, etc.).

Figure 1B:
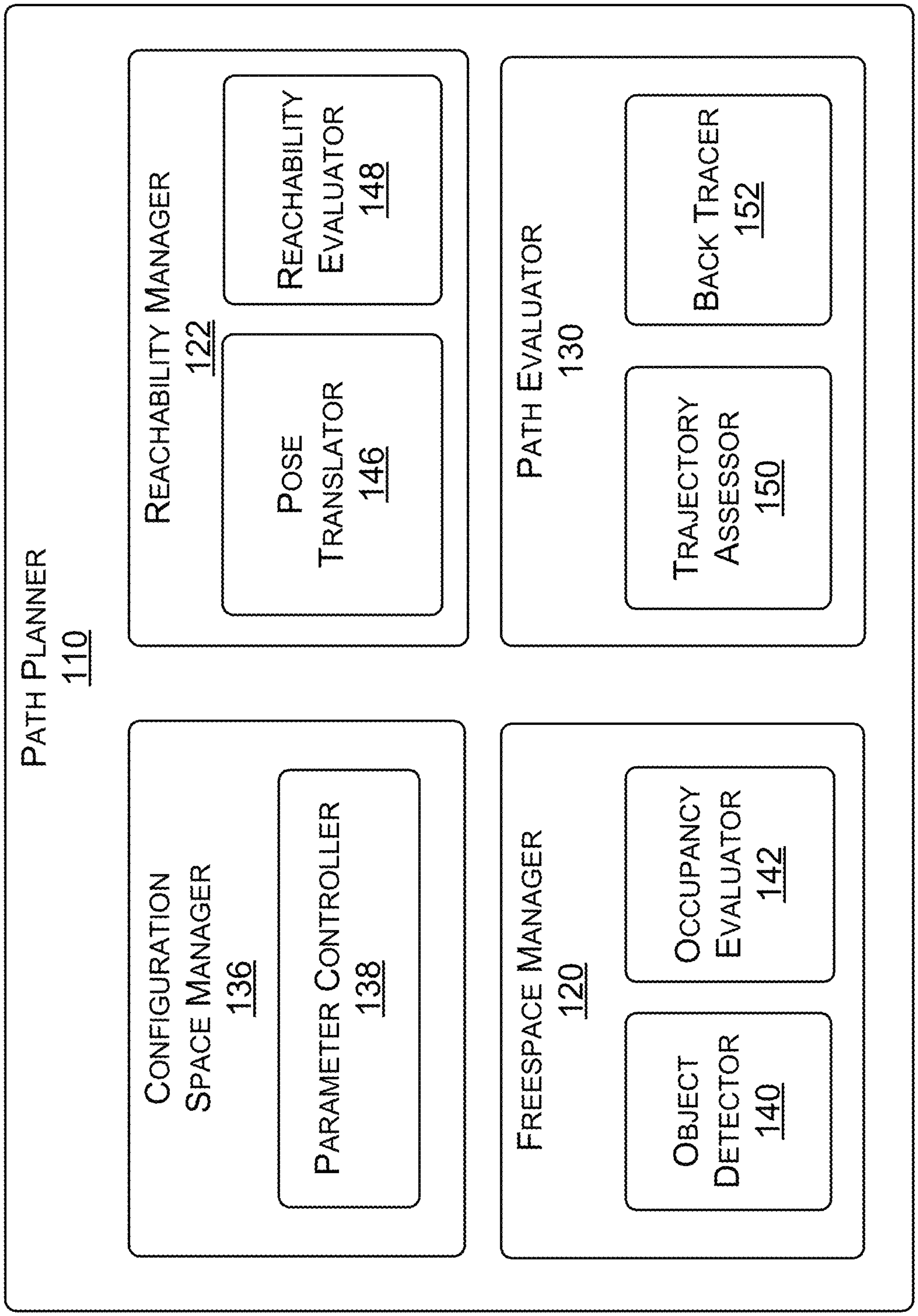
FIG. 1B is an illustration showing additional elements that may be included in the path planner of FIG. 1A, in accordance with some embodiments of the present disclosure.

Referring now to FIG. 1B, FIG. 1B is an illustration showing additional elements that may be included in the path planner 110 of FIG. 1A, in accordance with some embodiments of the present disclosure. The configuration space manager 136 may include a parameter controller 138, the reachability manager 122 may include a pose translator 146 and a reachability evaluator 148, the freespace manager 120 may include an object detector 140 and an occupancy evaluator 142, and the path evaluator 130 may include a trajectory assessor 150 and a back tracer 152.

In at least one embodiment, the configuration space manager 136 may facilitate operations related to the configuration space 112 using the parameter controller 138 to configure parameters of the configuration space 112. The configuration space 112 may represent vehicle potential configurations (e.g., poses and/or other parameters) using a space, such as multi-dimensional space (e.g., a 3D space, a 4D space, a 5D space, etc.). For example, the vehicle may be in a driving environment (e.g., a parking lot). Each pose in the configuration space 112 may include at least a vehicle position in the driving environment, and an orientation of the vehicle at the vehicle position. In at least one embodiment, the positions within the environment may be represented in the configuration space 112 using an XY grid (e.g., a representing a ground plane), for example, as shown in FIG. 1A. The orientations within the environment may be represented in the configuration space 112 using an angular-orientation component θ (e.g., rotation relative to the x-axis). In at least one embodiment, the configuration space 112 may be parameterized, at least in part, by the pose P=(x, y, θ). While some examples are described herein using a 3D configuration space, for example parameterized by P=(x, y, θ), the examples may generally apply to other parameterizations which may include more or fewer parameters. For example, examples of parameterizations for 4D and 5D configuration spaces are also described herein.

Figure 2:
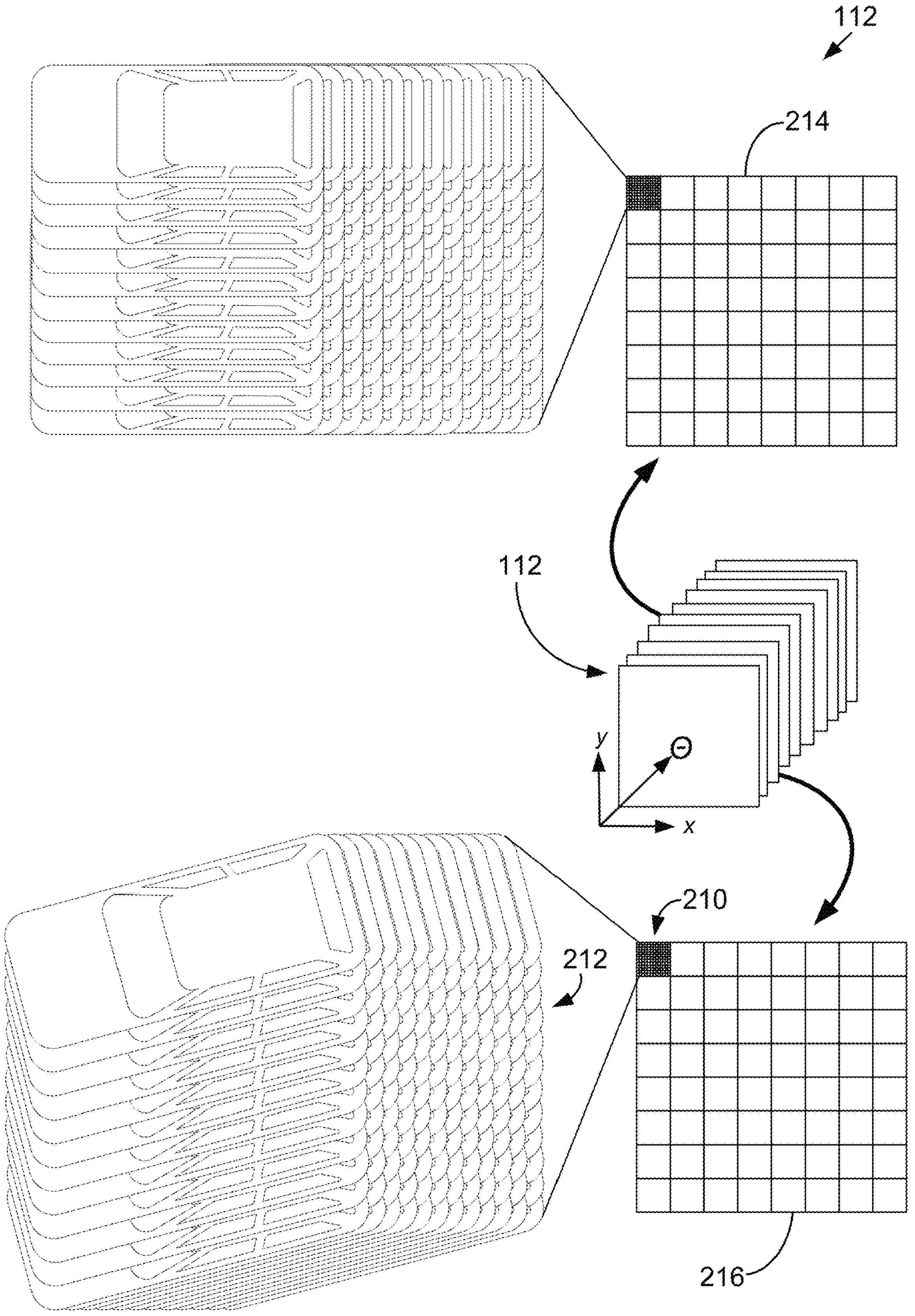
FIG. 2 is an illustration showing an example of a configuration space that may be used to model vehicle poses, in accordance with some embodiments of the present disclosure.

FIG. 2 is an illustration showing an example of the configuration space 112 that may be used to model vehicle poses, in accordance with some embodiments of the present disclosure. FIG. 2 illustrates an example of how a grid of poses 210—each pose P=(x, y, θ)—stored in the configuration space 112 may represent positions 212 of a vehicle in the driving environment. For example, FIG. 2 illustrates that each θ slice 214 and 216 of the configuration space 112 may represent a set of (x, y) values in combination with a respective angular orientation θ.

In at least one embodiment, the configuration space 112 may be used to define vehicle models that are evaluated during path planning. In at least one embodiment, the configuration space 112 may correspond to a state space indexed by a coordinate vector X, and the states may change may according to the differential equation $\dot{X}=f(X, u)$, where u may refer to another coordinate vector representing the control, $\dot{X}$ may denote the time-derivative of the state, and $f(X, u)$ may refer to a dynamics function that maps the state and the control to the time-derivative of the state.

The path planner 110 may be configured to determine, for example, an optimal control function u(t) of time that provides an optimal path(s) through state or configuration space from a starting state $X_{start}$ to a goal state $X_{goal}$. In at least one embodiment, the path planner 110 analyzes a graph discretization of the configuration space 112, which may handle a straightforward generalization to a set of start states with a cost depending on where the analysis and/or path starts within the graph and a set of goal states with a reward depending on where the analysis and/or path finishes within the graph. The quality of a path may be defined by a cost $c=\int L(X, u)dt$, which may refer to the integral over the time interval used by the path, of an instantaneous cost function L(X, u) called the Lagrangian, plus the cost at the start minus the reward at the goal. Obstacles may be considered as a term O(X, u) that additively contributes to the Lagrangian and can in general be 'soft' (finite) or 'hard' (only taking on the values zero or infinity $\{0, \infty\}$).

In at least one embodiment, the vehicle 2600 may exist in a world space, such as 2D space indexed by two spatial coordinates ($x_W$, $y_W$) that can be thought of as Bird's-Eye-View (BEV). However, the configuration space 112 may be indexed by the coordinates X that include a representation of a transformation between the vehicle coordinate system and the world coordinate system. The coordinates X may describe the full configuration of the machine, which can include, for example, the machine's full pose and further dynamic state, as opposed to only an original world location. In at least one embodiment, the configuration space 112 includes the original world location (x, y), which may be thought of as the point to which the origin of the vehicle coordinate system transforms. The configuration space 112 may also include an angular orientation θ, which may refer to the angle between the vehicle coordinate axes and the corresponding world coordinate axes. Thus, the pose of the vehicle may be described by (x, y, θ) and the transformation from the vehicle coordinates ($x_V$, $y_V$) to the world coordinates ($x_W$, $y_W$) may be defined as follows: $(x_W, y_W)=(x, y)+(x_V \cos\theta-y_V \sin, x_V \sin\theta+y_V \cos\theta)$.

Figure 3:
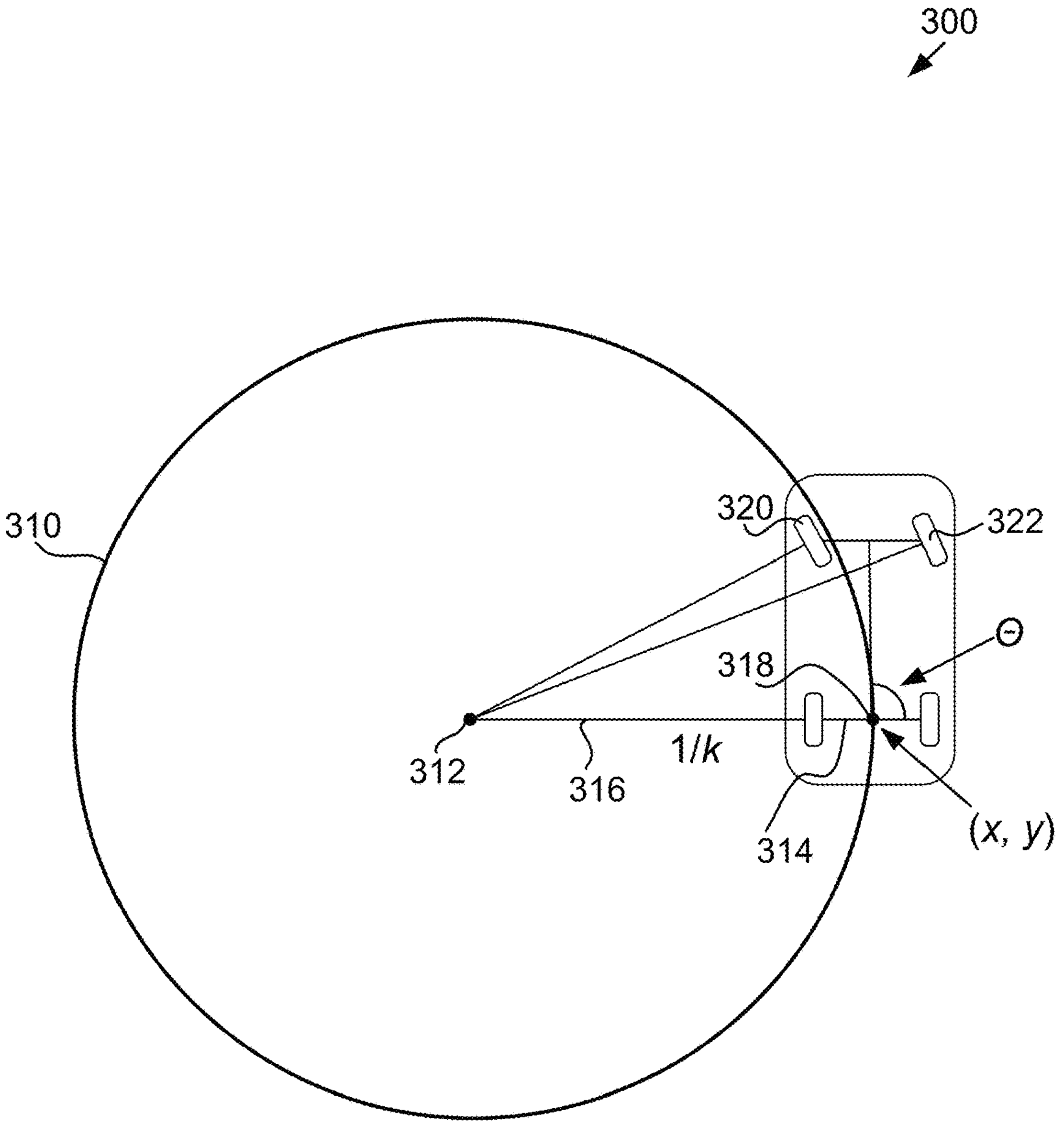
FIG. 3 illustrates an example of a motion model that may be used to define trajectories of the vehicle through the configuration space, in accordance with some embodiments of the present disclosure.

FIG. 3 illustrates an example of a motion model 300 that may be used to define trajectories or maneuvers of the vehicle through the configuration space 112, in accordance with some embodiments of the present disclosure. The poses captured in the configuration space 112 may correspond to points on trajectories or paths or maneuvers captured by the motion model 300. In the example shown, the motion model 300 comprises an Ackermann model for motion. Under the motion model 300, a turn may progress as a circular body motion 310 with a center 312 of the turn axially aligned with a rear wheel axle 314 of the vehicle at a distance 316 (corresponding to curvature k) from a center of a rear wheel axle 318. As indicated in FIG. 3, the center of the rear wheel axle 318 may correspond to the x, y coordinates of a pose in the configuration space 112. The distance 316 correspond to the radius of the turn, which may be determined by an angle of front wheels 320 and 322 of the vehicle. As indicated in FIG. 3, the angle of front wheels 320 and 322 of the vehicle may correspond to the θ coordinate of a pose in the configuration space 112.

Various parameters may affect the configuration space 112, such as the size of the environment represented by the configuration space 112 and the spatial and angular cell size. As such, the configuration space manager 136 may use the parameter controller 138 to define these settings. For example, the parameter controller 138 may receive dimensions of the environment to be evaluated (e.g., 30 m×30 m) and a cell size (e.g., 0.3 m), which may affect the spatial density of the configuration space 112 (e.g., the number of cells in the x-axis and in the y-axis). In addition, the angular cell size (e.g., in radians) or number of angular cells may also be provided to the parameter controller 138, which may affect the angular density of the configuration space 112 (e.g., the number of layers in the θ-axis). A configuration space with more cells in a given space (e.g., due to smaller spatial cell size and/or angular cell size in a given area) may present a larger number of eligible poses and paths for evaluation and may allow for more precision when targeting a pose.

In at least one embodiment, to determine paths and/or multi-point turns specific to an environment, the occupancy of the configuration space 112 may be computed, such as by using the freespace manager 120. That is, the freespace manager 120 may determine which poses in the configuration space 112 are perceived as at least partially occupied by an obstacle and which poses are perceived as open or free. The freespace manager 120 may use the object detector 140 to detect and/or identify objects that may occupy or obstruct positions in the environment. The freespace manager 120 may additionally or alternatively receive data representing objects from an object detector 140 operating external to the path planner 110. The freespace manager 120 may use the occupancy evaluator 142 to collision-test a body of the vehicle against the objects. Some dilation of the body of the vehicle and/or objects may be used to provide a margin.

The coordinates (x, y, θ) may be sufficient for the freespace manager 120 to perform obstacle collision checking and may be included in the configuration state X for the vehicle or motion models being evaluated. This process may correspond to rendering the original world space obstacles into configuration space obstacles. For each configuration (x, y, θ), the freespace manager may set an obstacle cost O(x, y, θ) to zero or infinity depending on whether the vehicle shape (padded by some margin for safety) in vehicle coordinates, transformed into world coordinates, intersects with an obstacle set defined in the world coordinate system.

Figure 4:
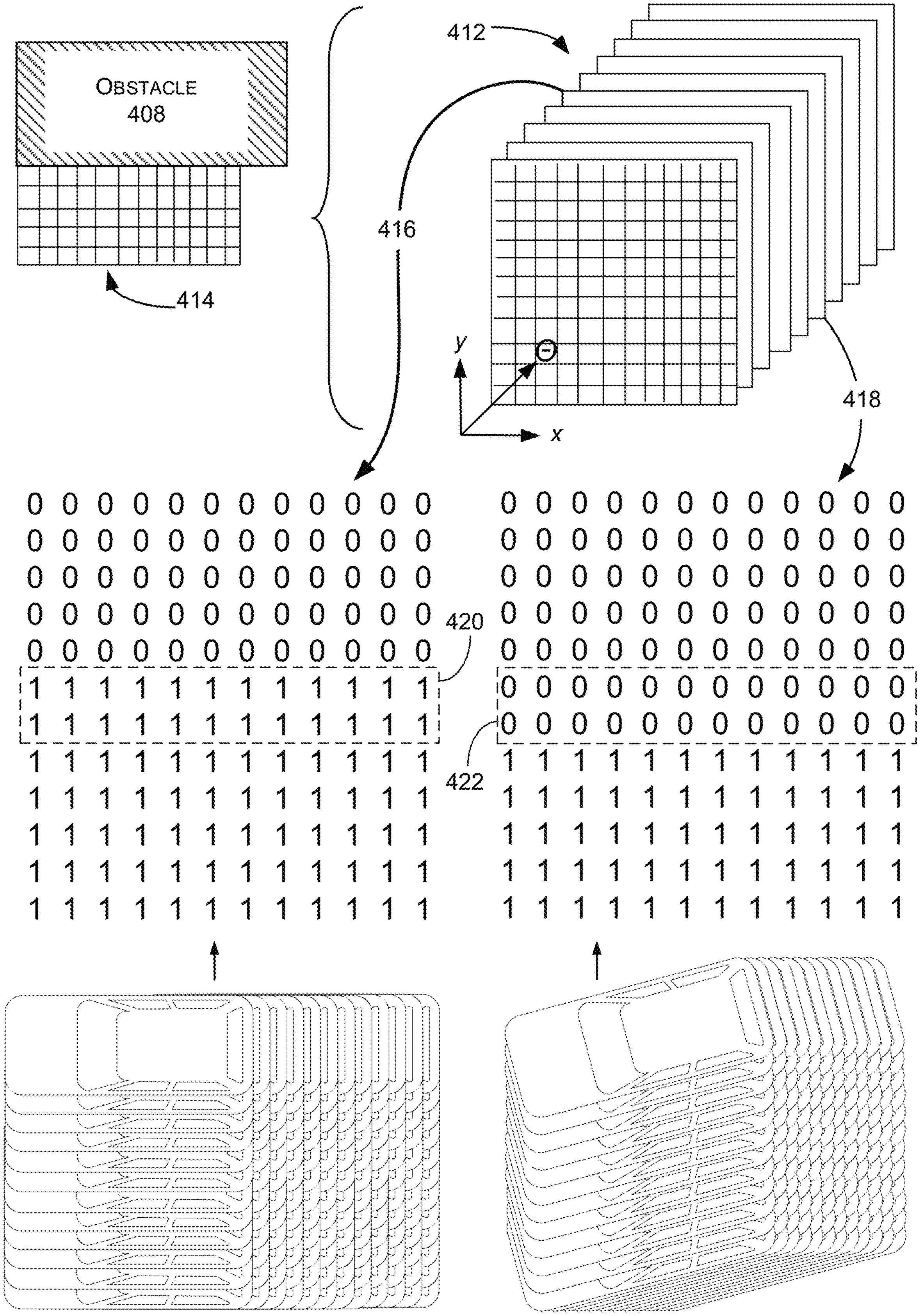
FIG. 4 is an illustration of an example of an occupancy space that captures occupancy of poses in a configuration space, in accordance with some embodiments of the present disclosure.

When collision testing, the obstacle and vehicle body representations used as input to the occupancy evaluator 142 may be polygonal or rasterized, and the output may be rasterized. The collision testing may use the center of the vehicle rear wheel axle at (x, y) with a rotation θ relative to the x-axis. Referring now to FIG. 4, FIG. 4 is an illustration of an example of an occupancy space 412 that captures occupancy of poses in a configuration space, in accordance with some embodiments of the present disclosure. In particular, FIG. 4 depicts at least a portion of the occupancy space 412 that may be parameterized similar to the configuration space 112 (e.g., using at least x, y, θ). In addition, FIG. 4 depicts an example obstacle 408 that may be perceived and depicts the position of the obstacle 408 relative to a set of (x, y) values 414, which may be consistent across all 0's. Furthermore, FIG. 4 illustrates example data values for a θ plane 416 and for a θ plane 418, each of which may correspond to a respective vehicle angular orientation.

By way of example and not limitation, the occupancy space 412 may store one bit per cell, where a one may represent that the corresponding pose is free, and a zero may represent that the corresponding pose is not free (e.g., is occupied). As indicated in FIG. 4, some of the poses 420 for the θ plane 416 are set to one and are free based on the angular orientation of the vehicle. However, corresponding poses 422 in the θ plane 418 are set to zero and are potentially obstructed due to the angle of the vehicle being different and potentially overlapping with the obstacle 408.

In at least one embodiment, the occupancy evaluator 142 may compute occupancy of the poses of the configuration space 112 and write results to the occupancy space 412 in parallel. For example, each of the poses may be tested separately (e.g., by a thread) and the results written in parallel (e.g., by the thread) into the occupancy space 412. The data of the occupancy space 412 may be used by the reachability manager 122 for subsequent processing and path identification and evaluation.

With the data from the occupancy space obtained from the freespace manager 120, the path planner 110 may execute an algorithm to find a recommended path from a current pose ($x_c$, $y_c$, θ) to a target pose set ($x_{min}$,$y_{min}$,$\theta_{min}$), ($x_{max}$,$y_{max}$, $\theta_{max}$), given the non-holonomic constraints of the vehicle. Both the current pose and the target pose set may be provided as inputs to the path planner 110 from one or more other motion planners (e.g., when detecting a parking spot, a position allowing a robot to pick up a pallet, etc.). In at least one embodiment, the path planner 110 uses a continuum version of a path planning problem to find a continuous path of coordinates (x, y, θ) from a start to a goal that is free of obstacles and has an optimal cost.

In at least one embodiment, the path planner 110 may be configured to evaluate one or more pre-determined turns or maneuver types with respect to the current or starting pose in the configuration space 112, where a turn or maneuver type may correspond, as an example, to a given turn radius and a direction (e.g., forwards or backwards). For example, a maneuver type may define multiple trajectories throughout the configuration space 112, and the reachability manager 122 may use the reachability evaluator 148 to evaluate all or nearly all of those poses with respect to an initial or current pose. Trajectories that are at least portions of turns are primarily described herein by way of example, but disclosed embodiments may more generally apply to other types of trajectories which may, for example, be built from turn primitives.

In at least one embodiment, the reachability evaluator 148 may determine reachability, for example, with respect to whether the poses within a trajectory can be reached from the current or starting pose C of the vehicle (or a target pose T or other pose in some embodiments). An iterative approach may be employed where the reachability manager 122 evaluates reachability for a set of trajectories (e.g., of one or more turn types), and uses the results of the evaluation as inputs to evaluate reachability for the set of trajectories (or a different set of trajectories or maneuvers) in a subsequent iteration. For example, a trajectory of a subsequent iteration may be reachable based at least on it being reachable by (e.g., connecting to) at least one trajectory from a prior iteration, and the starting pose being reachable by that at least one trajectory from the prior iteration.

The reachability evaluator 148 may evaluate reachability for any number of trajectory executions (e.g., up to a threshold number of trajectory executions and/or until a target pose is reachable). For example, the reachability manager 122 may evaluate reachability were the vehicle to execute a single turn or a multi-point turn (e.g., up to a threshold number of turns, such as 8 turns) in the configuration space 112. In at least one embodiment, the reachability evaluator 148 may also evaluate reachability for trajectories with respect to whether the poses thereof are free (e.g., using determinations from the freespace manager 120). For example, an obstacle in a trajectory may automatically preclude the reachability of any subsequent poses in the trajectory.

The reachability evaluator 148 may also in some embodiments determine and/or record costs associated with reaching poses of the trajectories, for example while evaluating reachability of the poses. As described herein, a cost score (e.g., hard or soft) may be used as an indicator of reachability, for example, with a 1 or 0 indicating whether or not a pose is reachable, a max cost score indicating unreachable and another cost score indicating reachable, etc. In other examples, the reachability manager 122 may store cost scores separate from reachability indicators. In various embodiments, one or more obstacles may not necessarily result in a pose in a trajectory being found unreachable but may introduce some cost which may be greater than a cost value were the obstacle not present. Additionally different obstacles may have different cost values.

Figure 5:
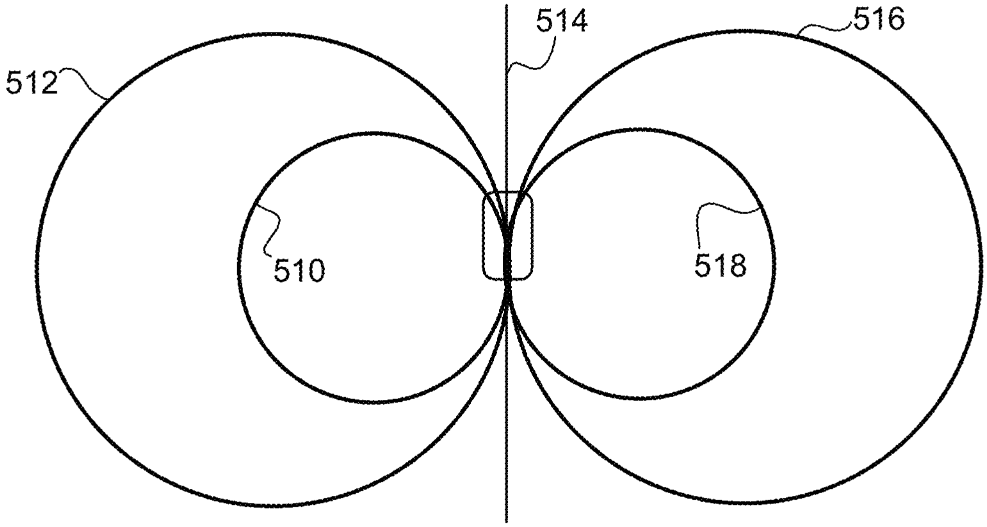
FIG. 5 illustrates examples of turns of different turn types that may be evaluated in a configuration space, in accordance with some embodiments of the present disclosure.

As described herein, one or more of the maneuvers associated with a pose in the configuration space 112 may be a turn, and each "turn" may include the vehicle moving forward or backward for an arbitrary distance while keeping the steering wheel fixed (thereby maintaining the turn radius). For example, FIG. 5 illustrates examples of turns of different turn types that may be evaluated in the configuration space 112, including a sharp left 510, a slight left 512, a straight 514 (θ=0), a slight right 516, and a sharp right 518. Each of the different turn types may include a respective turn radius, with left turns denoted as negative (−) and right turns denoted as positive (+). For example, the radius for the sharp left 510 may be −10 m, and the radius for the slight left 512 may be −20 m; whereas the radius for the sharp right 518 may be 10 m and the radius for the slight right 516 may be 20 m.

The reachability evaluator 148 may process through all of the potential turn combinations, including any variations of turn types (e.g., forward, then backward). The reachability manager 122 may update a reachability space 102 (or volume) after every reachability evaluation iteration with an indication of whether each pose in the configuration space 112 is reachable in that particular iteration (e.g., reachable back to the starting pose and not blocked by an obstacle) and/or with a cost of reaching the pose. Progressing through every trajectory at every iteration may represent a significant volume of processing, and in some instances, which may be greatly accelerated by parallel processing and/or efficiently representing the solution space.

Graphs for Non-Holonomic Motion Planning

In one or more embodiments, disclosed approaches provide for path planning under non-holonomic constraints based at least on discretizing a solution space using a graph. In at least one embodiment, the graph includes vertices corresponding to configurations of a machine in a configuration space (e.g., as described herein) and respective maneuver types used by the machine to traverse the configurations. By associating vertices with both configurations of the machine and respective maneuver types, disclosed approaches may selectively analyze the graph while accounting for one or more of a cost(s) associated with the machine maintaining a maneuver of a particular maneuver type(s) (e.g., a maneuver cost) and/or a cost(s) associated with the machine transitioning the maneuver to a different maneuver type(s) (e.g., a transition cost).

In further respects, in addition to or alternatively from providing a graph having one or more vertices corresponding to a respective maneuver type(s), disclosed approaches provide for graphs having transition edges to associate a cost(s) with the machine transitioning between maneuver types and/or maneuvers. For example, without such transition costs, a search of the graph may result in a path that frequently switches between maneuver types and/or maneuvers (e.g., with no penalty). Using transition costs, switching between maneuver types and/or maneuvers may be sufficiently discouraged when evaluating potential paths for the machine.

In further respects, in addition to or alternatively from the forgoing, disclosed approaches provide for graphs having one or more vertices that correspond to a transition state(s) between one or more maneuver types and/or maneuvers for traversing the configurations of the configuration space. By associating vertices with transition states, a graph for modeling the solution space may require fewer vertices and/or edges, and/or a cost(s) may be associated with the machine transitioning between maneuver types and/or maneuvers (e.g., transition costs). For example, using at least one vertex corresponding to and/or indexed as a transition state, vertices that correspond to different maneuver types may be connected through a transition state vertex, rather than requiring separate edges between each pair of vertices. Further, in one or more embodiments, the number of vertices may be reduced based at least on using at least one vertex corresponding to and/or indexed as a transition state and a maneuver type(s). Thus, the total number of vertices and/or edges needed for the graph may be reduced as separate vertices may not be need for the transition state and the maneuver type(s). By way of example, a straight maneuver type may be used as a transition state between a left maneuver type and a right maneuver type. Using one or more vertices corresponding to a transition state(s) may further allow for reduced storage and computing to track costs associated with potential paths through the graph, for example, using kernel style processing as described herein.

In further respects, in addition to or alternatively from the forgoing, disclosed approaches provide for graphs having one or more vertices and/or edges that correspond to one or more maneuver types for traversing the configurations of the configuration space, where the maneuver types may provide for more optimal paths through the configuration space. In one or more embodiments, one or more of the maneuver types include one or more longitudinally extremal maneuvers for a longitudinally extremal model of the machine and/or one or more laterally extremal maneuvers for a laterally extremal model of the machine. Using extremal models of the machine may ensure that a finite set of maneuver types can be analyzed with respect to a graph of a solution space to derive a shortest path through a corresponding configuration space.

Figure 6A:
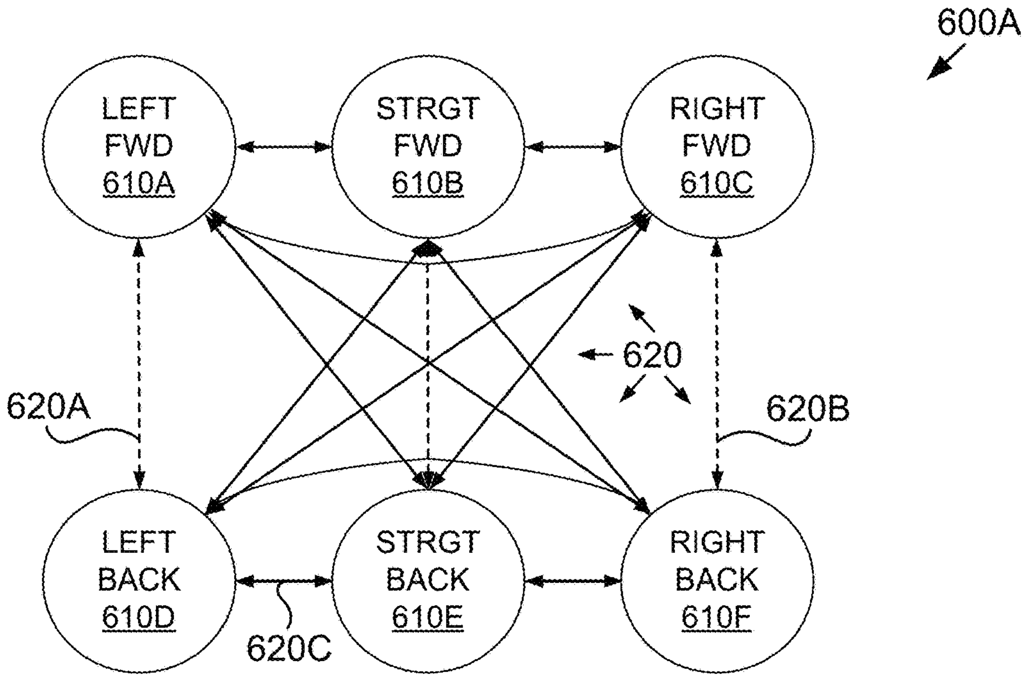
FIG. 6A illustrates an example visualization of a subgraph of a fully connected graph that may be used for path planning, in accordance with some embodiments of the present disclosure.

FIGS. 6A-6D are used to illustrate and describe examples of various disclosed concepts related to the graph(s) for path planning in accordance with various embodiments. Referring now to FIG. 6A, FIG. 6A illustrates an example visualization of a subgraph of a fully connected graph 600A that may be used for path planning, in accordance with some embodiments of the present disclosure. In the example of FIG. 6A, the subgraph of the graph 600A includes vertices 610A, 610B, 610C, 610D, 610E, and 610F (also referred to as vertices 610) and edges 620, of which edges 620A, 620B, and 620C are individually labelled.

In one or more embodiments, the graph 600A and/or other graphs used by the reachability manager 122 to process the configuration space 112 to determine one or more paths for the vehicle 2600 may include a directed graph. The set V of graph vertices v of the graph may be indexed as v=(X, M). For example, for the graph 600A, the vertices 610 may refer to the set V of graph vertices v. Here, X may refer to a coordinate vector indexing points in a 'volume' representing an underlying continuum configuration space 112 (e.g., such as 2D position and angular orientation) that has been discretized into a grid (e.g., an array of integer coordinates modeling a vector of real numbers).

Further, M may refer to an index corresponding to on one or more of a finite number of values representing a maneuver type(s) and/or a transition state(s). For example, the vertex 610A is shown as corresponding to a left maneuver type, and more specifically a left-forward maneuver type, and the vertex 610D is shown as corresponding to a left maneuver type, and more specifically a left-backward maneuver type. Further, the vertex 610B is shown as corresponding to a straight maneuver type, and more specifically a straight-forward maneuver type, and the vertex 610E is shown as corresponding to a straight maneuver type, and more specifically a straight-backward maneuver type. Additionally, the vertex 610C is shown as corresponding to a right maneuver type, and more specifically a right-forward maneuver type, and the vertex 610F is shown as corresponding to a right maneuver type, and more specifically a right-backward maneuver type.

Figure 6B:
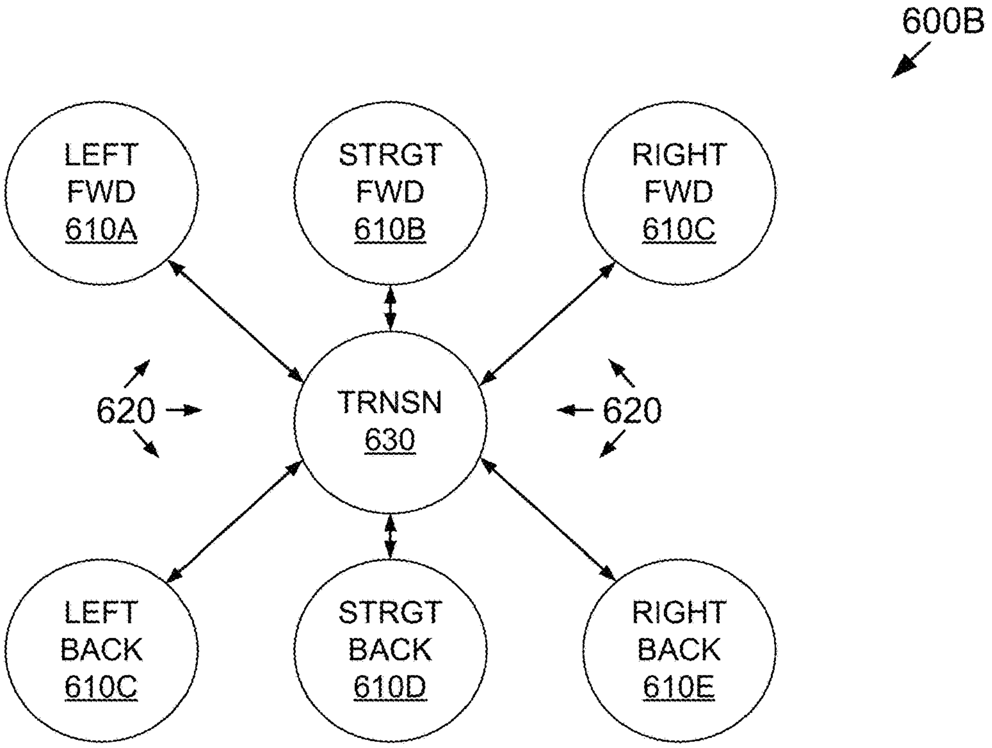
FIG. 6B illustrates an example visualization of a subgraph of a star graph that may be used for path planning, in accordance with some embodiments of the present disclosure.

Referring now to FIG. 6B, FIG. 6B illustrates an example visualization of a subgraph of a star graph 600B that may be used for path planning, in accordance with some embodiments of the present disclosure. As shown in FIG. 6A, the subgraph of the graph 600B further includes a vertex 630 corresponding to a transition state(s) between one or more of the maneuver types and/or maneuvers.

Figure 6C:
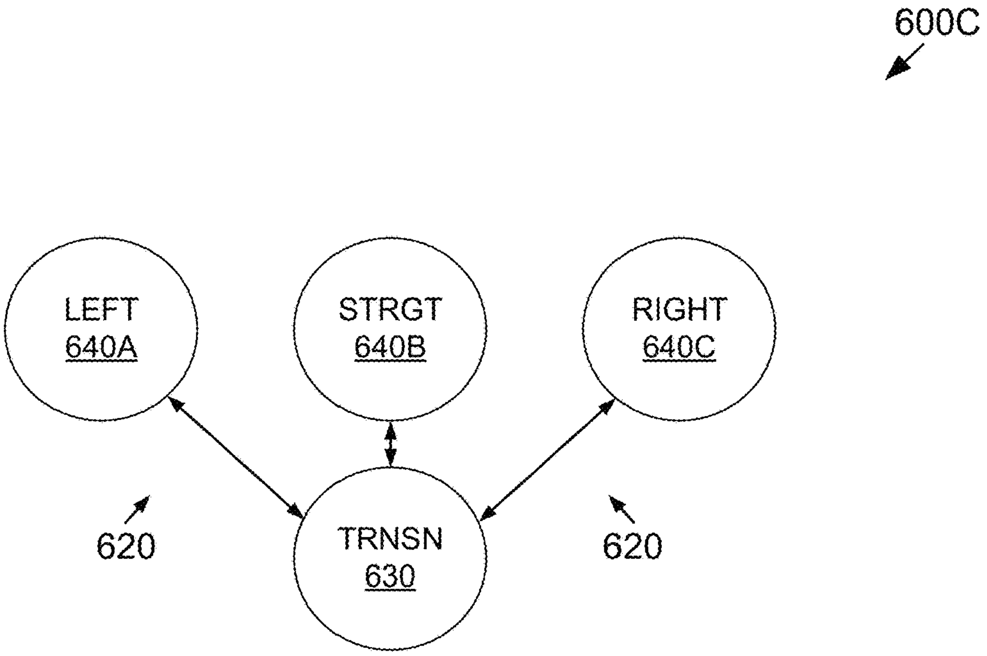
FIG. 6C illustrates an example visualization of a subgraph of a condensed star graph that may be used for path planning, in accordance with some embodiments of the present disclosure.

In various examples, M may be used to index individual maneuver types and/or sets of maneuver types that correspond to different variants or versions of a same maneuvers (e.g., forward vs. backward or reversed versions). Referring now to FIG. 6C, illustrates an example visualization of a subgraph of a condensed star graph 600C that may be used for path planning, in accordance with some embodiments of the present disclosure. In the example of FIG. 6C, the subgraph of the graph 600C includes a vertex 640A, a vertex 640B, and a vertex 640C (also referred to as "vertices 640"). The vertices 640 each correspond to multiple variants or versions of a same maneuver. For example, the vertex 640A corresponds to a left-forward maneuver type and a left-backward maneuver type, the vertex 640B corresponds to a straight-forward maneuver type and a straight-backward maneuver type, and the vertex 640C corresponds to a right-forward maneuver type and a right-backward maneuver type.

Figure 6D:
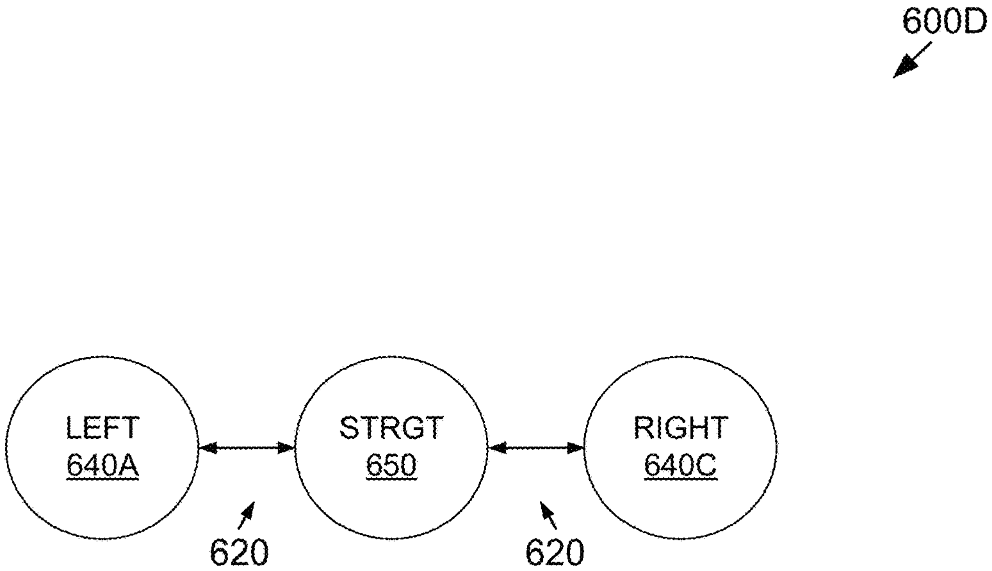
FIG. 6D illustrates an example visualization of a subgraph of a compact graph that may be used for path planning, in accordance with some embodiments of the present disclosure.

Referring now to FIG. 6D, illustrates an example visualization of a subgraph of a compact graph 600D that may be used for path planning, in accordance with some embodiments of the present disclosure. Similar to the graph 600C, the subgraph of the graph 600D includes the vertex 640A and the vertex 640C. However, in the subgraph of the graph 600D, a vertex 650 is provided as an example of a vertex which may correspond to both a maneuver type(s) and a transition state(s). As an example, the vertex 650 corresponds to a straight-forward maneuver type, a straight-backward maneuver type, and a transition state.

Figure 7:
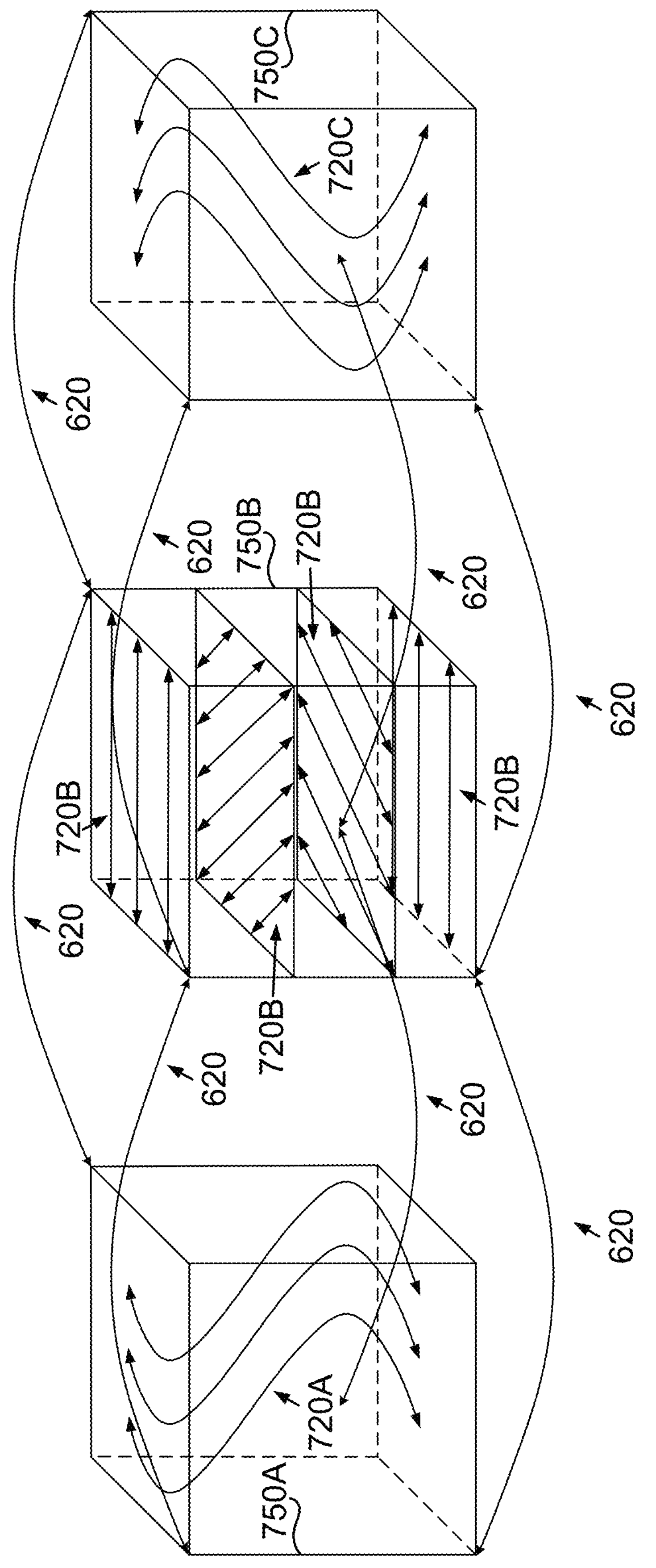
FIG. 7 illustrates an example visualization of volumes and edges of a compact graph that may be used for path planning, in accordance with some embodiments of the present disclosure.

Referring now to FIG. 7, FIG. 7 illustrates an example visualization of volumes and edges of the compact graph 640D that may be used for path planning, in accordance with some embodiments of the present disclosure. FIG. 7 shows a volume 150A corresponding to vertices for a left maneuver type(s), which may include the vertex 640A, a volume 750B corresponding to vertices for a transition state(s), which may include the vertex 650, and a volume 750C corresponding to vertices for a right maneuver type(s), which may include the vertex 650A. FIG. 7 also shows edges 720A, edges 720B, and edges 720C (also referred to as edges 720). The edges 720A correspond to the volume 750A, the edges 720B correspond to the volume 750B, and the edges 720C correspond to the volume 750C. In at least one embodiment, a volume corresponds, at least in part, to a reachability space 102.

In at least one embodiment, the graph(s) may include transition edges and/or maneuver edges. For example, the edges 620 of FIGS. 6A-6D and FIG. 7 may correspond to transition edges. Further the edges 720 in FIG. 7 are examples of maneuver edges. The maneuver edges may link vertices within the same volume and/or maneuver type(s). For example, a maneuver edge may map a source maneuver vertex to a destination maneuver vertex of a common maneuver type(s), but a different transition subgraph S(X). When followed in sequence, maneuver edges may model a movement within a volume while staying with the same maneuver type (such as tracing out a circular turn to the left). In at least one embodiment, the maneuver edges link vertices with different X but the same M. The transition edges may link vertices within different volumes and/or different maneuver type(s). In at least one embodiment, the transition edges link vertices with the same X in different volumes (e.g., with different M), although other transitions may be permitted. For example, one transition edge may map a source maneuver vertex to a different maneuver vertex of a different maneuver type(s), but a same transition subgraph S(X). In at least one embodiment, the transition edges may enable the path planner 110 to model changes of maneuver type(s) and to assign a cost(s) to such changes, such as starting, stopping, changing gear, and/or turning the wheel, which take time but are not necessarily modeled by the continuum configuration space.

In one or more embodiments, the reachability manager 148 computes the value function on the set of vertices (or some subset of the set of vertices), which may include the cost-to-come or cost-to-go for each vertex. In at least one embodiment, this can be thought of as the cost-to-come to a particular X with M as the most recent/current maneuver type. The current maneuver and maneuver type may be linked to a physical state (such as steering wheel position and/or velocity), so a vertex v may be thought of as a configuration or configuration state, and the edges as choices of control, either staying with the same maneuver type (maneuver edges) or transitioning between maneuver types (transition edges).

In one or more embodiments, providing for maneuver types and within them individual maneuvers may enable the path planner 110 to assign a cost on transitioning between maneuver types, while identifying maneuvers of the same type(s) so that only one vertex is needed per type(s).

To specify a graph, the configuration space manager 136 may choose a discretized set of values X to parameterize each of the volumes corresponding to the graph, a discrete set of values for the maneuver type(s) M, the maneuver edges, the transition edges, and/or corresponding costs. A volume (e.g., for storing and/or indexing cost values) may have any suitable dimensions, which may depend upon the dimensions of the configuration space 112 being employed. In at least one embodiment, one or more of the volumes may be a 3D volume, indexed, at least in part, by X=(x, y, θ) where (x, y) may refer to the 2D spatial position of the center of the rear wheel axis and the third dimension θ may refer to the angular orientation.

FIGS. 6A-6D and FIG. 7 indicate examples of six maneuvers and/or maneuver types, which may include any combination of LEFT/STRAIGHT/RIGHT laterally and FORWARD/BACKWARD longitudinally. A graph may be specified in terms of a transition subgraph S(X) and discretized maneuver curves and edges that form the transition subgraph S(X). For each choice of fixed X, the vertices with that X from each volume may be linked together by transition edges, and may form a subgraph for that X, which may be referred to as the transition subgraph S(X). The collection of these subgraphs for all X may make up the bulk of the transition edges of the graph. Therefore, the transition subgraph S(X) may be defined to specify the transition edges.

The graph 600A of FIG. 6A is an example of a brute force and flexible configuration where the transition subgraph S(X) is a fully connected graph. A fully connected topology for the transition subgraph S(X) of the edges 620 (transition edges) may be more flexible than other topologies while producing a larger graph that other topologies. The fully connected topology may include $N_\mu$ vertices and $N_\mu(N_\mu-1)=30$ directed transition edges for the example of $N_\mu=6$ maneuvers or maneuver types. However, in at least one embodiment, there is no benefit in following a maneuver with a reversed version (e.g., forward followed by backward), or vice versa, since doing so may retrace steps. Thus, the edges 620 between forward and backward versions of a maneuver, such as the edge 620A and the edge 620B, are indicated using dashed lines, and may not be necessary. In the example of $N_\mu=6$ maneuvers or maneuver types, removing the edges 620 between the forward and backward versions of maneuvers may yield $N_\mu(N_\mu-2)=24$ directed edges.

The graph 600B of FIG. 6B is an example of using a transition state(s) to reduce the size of a graph. For example, the vertex 630 corresponds to a transition state at the center of the transition subgraph S(X) for a star topology. The star topology may result in a graph that is much more efficient to store and process than one using the fully connected topology, and as described herein. In the star topology, a transition edge 620 may be provided to and/or from the vertex 630 (a transition vertex) for each corresponding vertex 610 (a maneuver vertex). These edges 620 may carry the costs (e.g., time) spent by the vehicle 2600 getting to and/or from the transition state to any other maneuver and/or maneuver type. As described herein, a cost may correspond to the time spent optionally changing gear, changing the steering wheel, accelerating to full speed, and/or decelerating to a stop. For the example of $N_\mu=6$ maneuvers or maneuver types for the star topology, the transition subgraph S(X) may include $(N_\mu+1)=7$ vertices and $2N_\mu=12$ directed transition edges 620.

The graph 600C of FIG. 6C provides an example of combining maneuvers and/or maneuver types. For example, as described herein, there may be no benefit in following a maneuver with a reverse version of the maneuver. Thus, the maneuvers and/or maneuver types may be combined into a common maneuver type or vertex. In at least one embodiment, combining maneuvers and/or maneuver types may result in using the same cost from the transition state (e.g., the vertex 630) for both forward and backward versions. For the example of $N_\mu=6$ maneuvers or maneuver types for the condensed star topology of FIG. 6C, the transition subgraph S(X) may include $N_M=N_\mu/2=3$ main maneuver types and/or maneuver vertices, $(N_M+1)=4$ total vertices, and $2N_M=N_\mu=6$ directed transition edges 620. One or more values may still be stored in the volume to track which of the maneuver types or maneuvers were used to reach the vertex.

The graph 600D of FIG. 6D provides an example of combining maneuvers and/or maneuver types with a transition state(s). For example, in the compact topology of FIG. 6D, the transition subgraph S(X) may identify a transition state with a straight maneuver type(s). Thus, the transition subgraph S(X) may include 3 vertices 640A, 650, and 640B and 4 transition edges 620. In one or more embodiments, compared to other topologies, the compact topology may no longer provide the flexibility, for example, to provide costs where a gear change for a maneuver is penalized more than the corresponding maneuver without a gear change, but may result in a smaller graph 600D.

Although not specifically identified, in at least one embodiment, a collapsed topology may be used for the transition subgraph S(X), which may provide a collapsed graph. In this example, all of the maneuvers and/or maneuver types may be included in a common vertex. This may result in a transition subgraph S(X) that does not include any transition edges. However, in the example of $N_\mu=6$ maneuvers or maneuver types, the transition subgraph S(X) may still include 6 maneuver edges per value of X. In at least one embodiment, the collapsed topology may no longer provide the ability to represent costs for transitions between any of the maneuvers and/or maneuver types in the graph, and transitions may become free.

Figure 8:
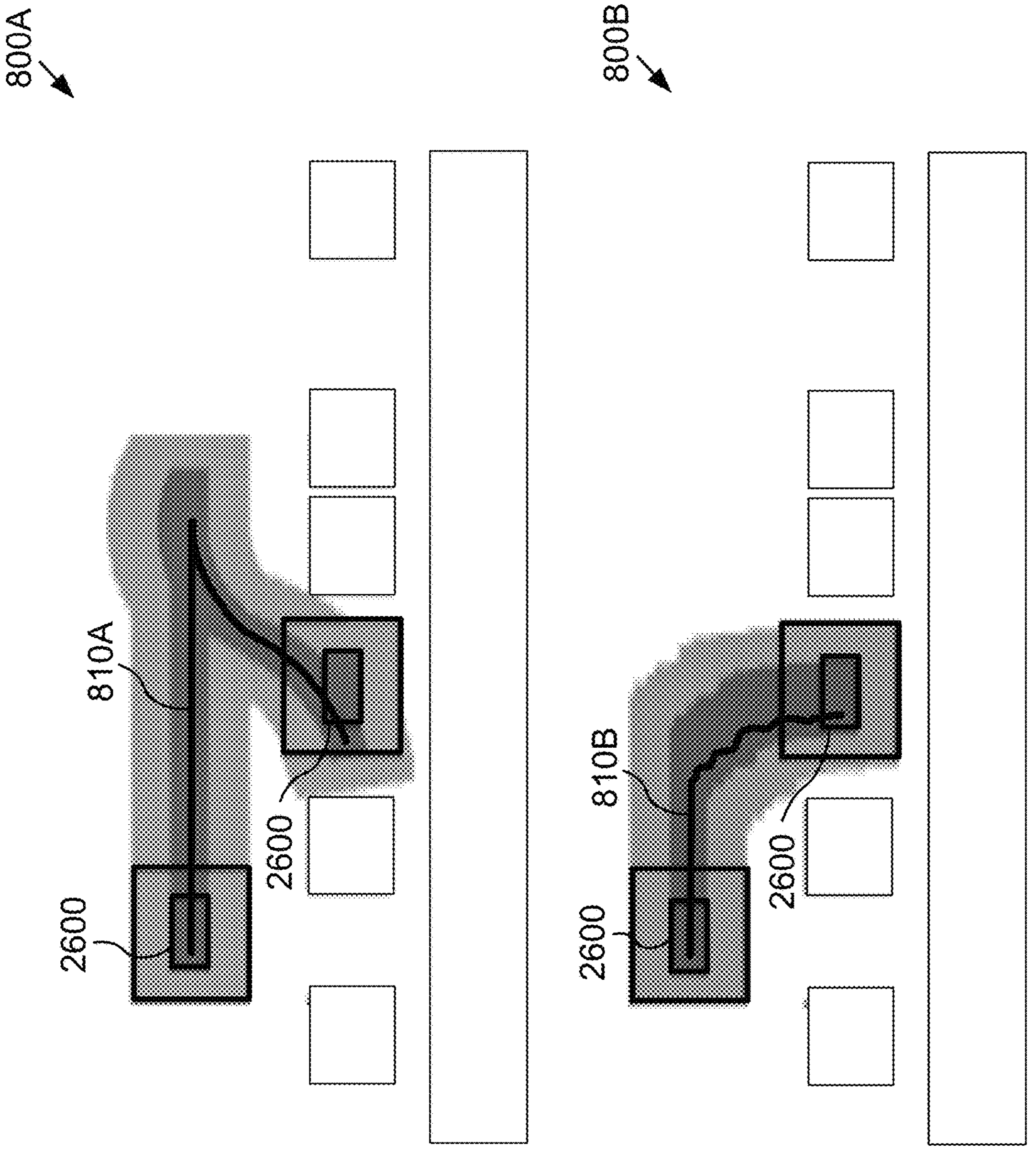
FIG. 8 illustrates example visualizations and of path plans generated with and without transition costs, in accordance with some embodiments of the present disclosure.

Referring now to FIG. 8, FIG. 8 illustrates example visualizations of path plans 800A and 800*b* generated with and without transition costs, in accordance with some embodiments of the present disclosure. The path plan 800A includes a path 810A that the path planner 110 may generate by assigning transition costs to edges and/or vertices of a graph, such as the graphs of FIGS. 6A-6D, where the path 810A and may include 4 maneuvers. In contrast, for a same state of the environment, the path planner 110 may generate the path 810B without using transition costs. The resultant path 810B may be less smooth than the path 810A due to being less constrained by transitioning between maneuvers and/or maneuver types in the graph.

While various examples of configurations for the transition subgraph S(X) are described herein, in some examples, a single graph may be provided with one or more combinations of such configurations and/or other configurations. Further, while maneuver and transition costs are primarily described herein as being assigned to edges, in some examples, maneuver, transition, and/or other costs may additionally or alternatively be assigned to vertices.

As described herein, a maneuver edge, such as an edge 720 of FIG. 7, may correspond to the vehicle 2600 performing a maneuver for one step, cycle, or iteration. In at least one embodiment, there is one outgoing and one incoming maneuver edge 720 per maneuver for each maneuver vertex. In at least one embodiment, the edges 720 are arranged such that when following several consecutive maneuver edges 720 from a same maneuver, a maneuver curve is traced out in the configuration space 112 and/or a corresponding volume that is globally accurate (e.g., according to a motion model of the vehicle).

In at least one embodiment, for a graph, one or more vertices and/or edges that correspond to one or more maneuver types and/or maneuvers may correspond to one or more longitudinally extremal maneuvers for a longitudinally extremal model of the machine and/or one or more laterally extremal maneuvers for a laterally extremal model of the machine. For example, the maneuver types modeled and/or analyzed using the graph may be limited to and/or include a finite set of control actions for the vehicle 2600, at least some of which may be based on one or more extremal models of the vehicle 2600.

In at least one embodiment, a model of the non-holonomic kinematics of the configuration space 112 may include $X=(x, y, \theta)$ (see, e.g., FIG. 3) with control $u=(k, v)$ and dynamics function $\dot{X}=f(X, u)=v(\cos\theta, \sin\theta, k)$. Here, k may denote curvature, and v velocity, with $0\leq\theta<2\pi$ having cyclic topology. For the graph discretization, the spatial dimensions may be limited to $0\leq x<x_{max}$, $0\leq y<y_{max}$. Further, the curvature may be bounded to $|k|\leq k_{max}$ by the steering limits of the vehicle 2600, and velocity may be bounded to $|v|\leq v_{max}$. The path planner 110 may then attempt to find best (e.g., shortest time or equivalent distance) path or paths based on the foregoing definition of the dynamics function $f$.

By way of example, Pontryagin's maximum principle may be used to define the extremal maneuver types. For example, Pontryagin's maximum principle may define that in freespace, a shortest time path with the above model may use a steering control either straight or at the extremes ($|k|=k_{max}$ or $k=0$), and a velocity control at the extremes ($|v|=v_{max}$). Thus, these extremal controls may define an extremal control model for the vehicle 2600, which corresponds to a set of extremal maneuver types. For example, the maneuver vertices 610 and corresponding maneuver edges may correspond to the Pontryagin extremal primitives, which for a 3D configuration space 112 may include circles of maximum/extremal curvature k and lines in world space (See, e.g., FIG. 5 for examples of circles and lines).

Pontryagin's maximum principle may provide that in the absence of obstacles, the reachable sets for pure distance in an extremal vehicle model are identical to those of a corresponding original vehicle model. The reachable sets may refer to the sets of configurations that can be reached within some given time. In at least one embodiment, the graph discretization of the solution space may model the reachable sets accurately while providing a theoretically provable worst-case upper bound on errors of the graph discretization. For example, in at least one embodiment, in the absence of obstacles, the reachable sets (with sufficient maneuver counting transition costs) of the graph discretization may differ from those of an extremal vehicle model by being at most 4 grid cells larger in max-norm $\|(x, y, \theta)\|_\infty$ and at most $7+\pi d/N_\theta$ grid cells smaller, where d may refer to an equivalent distance traveled and $N_\theta$ may refer to an angular resolution.

Pontryagin's maximum principle may apply to control problems where the state X is assumed to be a function of time T, a control function u(T), and a starting state $X_0$, expressed as the integral $$X(T, u, X_0) = x_0 + \int_0^T f(X(t), u(t))dt$$

over time of a dynamics function $f(X, u)$, which can be thought of as the time-derivative of the state for a given control u. This may also be expressed as $\dot{X}=f(X, u)$. Defining the cost of a path as the integral $$c(T, u, X_0) = \int_0^T L(X(t), u(t))dt$$

over time of a scalar Lagrangian function L(X, u) of the state and instantaneous control, the path planner 110 may search for an optimal path. Then Pontryagin's maximum principle can be understood as variational calculus where both the state X and the control u (both thought of as functions of time) are varied, and the path planner 110 can search for local minima under the constraint that the state and the control are linked correctly by the dynamics function.

To enforce the dynamics constraints, Lagrange multiplier vector functions $\lambda(t)$ of time called co-states may be added. The co-states adjoined to the original state may double the dimensionality of the state space. Pontryagin's maximum principle gives a dynamics function for the doubled dimensionality state space (with the same control), and the constraint that the control u for each time must minimize the Hamiltonian function $H(X, u, \lambda)=L(X, u)+\lambda^T f(X, u)$. Where the extended dynamics function is $\dot{X}=f=\delta H/\delta\lambda$, $\dot{\lambda}=-\delta H/\delta X$, the Hamiltonian conveniently captures both the extended dynamics function and the minimization criterion for the control. Doubling the state space may provide that the minimization criterion for u usually constrains u to a smaller set, which may be finite or even consist of a unique u. When it is finite, there may be a finite set of vector fields in the extended state space that the trajectory must follow to be locally optimal, and therefore also to be globally optimal.

In at least one embodiment, Pontryagin's maximum principle can be used to derive that only the LEFT/STRAIGHT/RIGHT steering control actions and MAX/MIN velocity can yield optimal trajectories, as follows. The 3D configuration space model may correspond to $f(X, u)=v(\cos\theta, \sin\theta, k)$. Using shortest time as a cost function means $L(X, u)=1$. Then $\dot{\lambda}=-\delta H/\delta X=v(0,0,\lambda_1\sin\theta-\lambda_2\cos\theta)$. Thus $\lambda_1$, $\lambda_2$ are constant and $$u_{opt} = \underset{u}{\operatorname{argmin}} H(X, u, \lambda) = \underset{u}{\operatorname{argmin}} \lambda^\top f(X, u) = \underset{u}{\operatorname{argmin}} v(\lambda_1\cos\theta + \lambda_2\sin\theta + \lambda_3 k).$$

To minimize the last expression, unless $\lambda_3=0$, both k and v may be up against their bounds. Unless $\lambda_3$ stays zero, control may be against the bounds except for on a set of measure zero. For $\lambda_3$ to be and stay zero, $\lambda_1\sin\theta-\lambda_2\cos\theta$ may stay zero, which since $\lambda_1$, $\lambda_2$ are constant implies that θ is constant, which implies that k=0, steering is straight and the vehicle follows a line. In this case, v may also be up against its bounds.

In examples, the transition costs may correspond to time penalties introduced on the extremal vehicle model for gear and steering changes to improve the cost function and discourage frequently switching paths. However, the extremal vehicle model without transition costs may still find pure shortest distance paths, or equivalently shortest time paths if gear and steering changes are considered free. The transition costs may be used to provide the extremal vehicle model with a more realistic model of time spent. Using disclosed approaches, an upper bound on the size of the reachable sets may correspond to how 'optimistic' the graph is, and a guarantee that if a path appears executable by the graph in that time/distance, it is sufficiently close to something exactly executable using a continuum model. The lower bound on the size of the reachable sets may be thought of as a guarantee of sampling density in the sense that for any goal and a best way to reach the goal among all possible, the graph will include a path candidate that gets close to optimal in the same time/distance as resolution is increased. Thus, reachable sets of the graph may converge in max-norm to the exact answer of the continuum model as resolution is increased.

Disclosed approaches may be used to selectively analyze the graph(s) to provide more computationally and storage efficient path planning. For example, one or more edges and/or vertices of a graph described herein may be selectively analyzed (e.g., based at least on corresponding costs described herein) using a path planning algorithm so as to focus the search on relevant parts of the graph. Thus, the search may avoid unnecessary exploration (e.g., based at least on pruning one or more portions of the graph from the search) and/or order the search (e.g., via ordered edges and/or vertices) to prioritize promising paths or path portions. Without discretizing and evaluating the solution space using the graph, a brute force approach may be required where all possible paths are evaluated. A brute force approach may be more suitable for highly parallelized searches, such as using kernel-style processing described herein. However, for more sequential searches, the size of the solution space may be prohibitive to using a brute force approach.

Any suitable graph-based path planning algorithm may be used to selectively analyze the graph(s). Non-limiting examples include Dijkstra's algorithm, A* algorithm, Yen's algorithm, Bellman-Ford algorithm, Floyd-Warshall Algorithm, bidirectional search algorithms, depth-first search algorithms, breadth-first search algorithms, greedy search algorithms, heuristic search algorithms, optimal search algorithms, value iteration algorithms, and more.

Various techniques may be used to selectively analyze the graph(s). For example, one or more heuristic functions (e.g., with an A* algorithm) may be used to estimate a remaining cost(s) from one or more vertices to one or more ending vertices and/or goals so as to guide the search toward promising paths. As a further example, instead of searching from a start vertex only, the graph may be explored from multiple vertices (e.g., a start vertex and an end vertex as in a bidirectional search) and one or more determined paths corresponding to the explored vertices may be joined to generate one or more composite paths. Additionally, various approaches may prune one or more unpromising branches, edges, and/or vertices from the graph. For example, if a path has already exceeded a certain cost, it may be pruned. Also, in one or more embodiments, selectively analyzing the graph may be used to avoid revising one or more vertices and/or edges of the graph in the search, and/or to avoid cycles and/or backtracking. In various examples, selectively analyzing the graph(s) may include performing edge relaxation (e.g., using Dijkstra's algorithm or Bellman-Ford algorithm). For example, edge relaxation may include updating shortest path estimates and if a shorter path to a vertex is discovered, a distance value for the vertex may be updated accordingly. In at least one embodiment, the selective analysis may include preprocessing the graph to remove unnecessary edges and/or vertices.

Where the search is at least partially parallelized, any combination of the disclosed selective analysis may be used to evaluate and/or select one or more graph portions (e.g., one or more edges and/or vertices or sequences or branches thereof) for and/or prune one or more graph portions from parallel analysis.

The reachability manager 122 may maintain search information to facilitate any combination of selective analysis of the graph, such as information indicating visited nodes, edges, one or more sequences thereof, and/or corresponding costs. For example, the search information may be used to facilitate any combination of the various selective analysis described herein. The search information may be used to order the search, avoid redundant computation, determine whether and/or when to terminate the search, determine one or more portions of the graph to prune from the search, etc. In one or more embodiments, the search information may include one or more priority queues and/or heaps (e.g., a min-heap for Dijkstra's algorithm).

Figure 9:
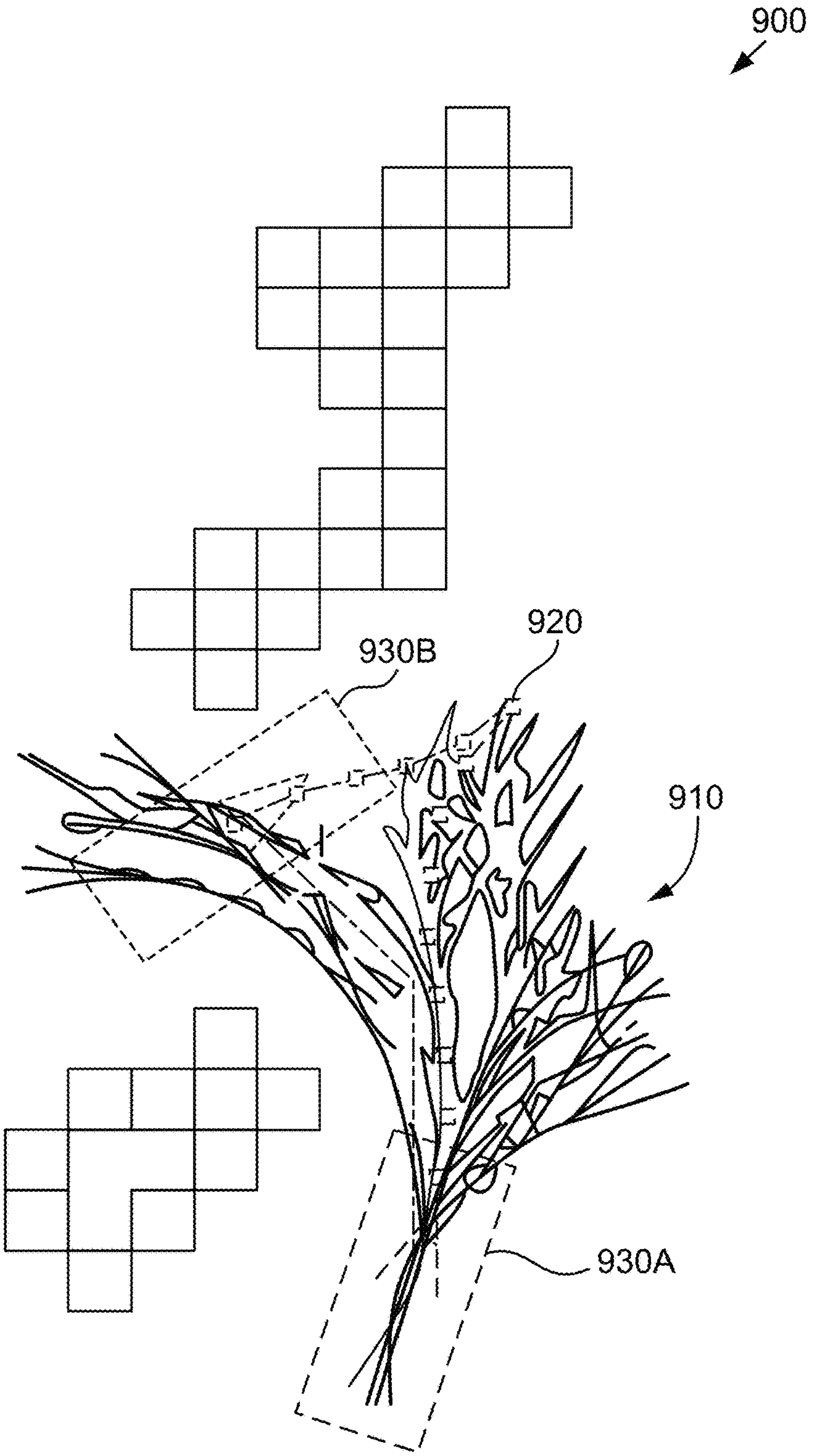
FIG. 9 illustrates a visualization of examples of configurations explored using a graph-based search algorithm, in accordance with some embodiments of the present disclosure.

Referring now to FIG. 9, FIG. 9 illustrates a visualization 900 of examples of configurations 910 explored using a graph-based search algorithm, in accordance with some embodiments of the present disclosure. The graph-based search algorithm (e.g., an A* algorithm in this example) may be used to determine a path 920 from a pose configuration 930A for the vehicle 2600 to a pose configuration 930B for the vehicle 2600. By selectively analyzing the graph, the explored configurations 910 are small relative to the total configurations of the graph. For example, using disclosed approaches, a graph structure can be used to prune out suboptimal paths via the dynamic programming principle that suboptimal paths to an intermediate state can be pruned.

In at least one embodiment, a graph as described herein is processed using Dijkstra's algorithm. By way of example and not limitation, the heap may be represented using two additional arrays or other data structure or object of at least a same size as the volume(s) holding the vertex values. For example, one array may store the heap location of that vertex, and the other array may hold the vertex of that heap location. Priority values of the heap may already be represented in the value function volumes. In one or more embodiments, the value of vertices may be computed with edge weights calculated using edge distances and obstacle volume values.

Now referring to FIG. 10, each block of method 1000 and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the path planner 110 of FIGS. 1A and 1B. However, these methods may additionally or alternatively be executed by any one system, or any combination of systems, including, but not limited to, those described herein.

FIG. 10 is a flow diagram showing a method 1000 for selectively analyzing a graph having vertices are indexed by configurations and maneuver type and edges corresponding to maneuvers and transitions between maneuvers, in accordance with some embodiments of the present disclosure. The method 1000, at block B1002, includes selectively analyzing a graph including vertices indexed at least by configurations and maneuver types of a machine, maneuver edges linking first groups of the vertices that correspond to a same maneuver type, and transition edges linking second groups of the vertices that correspond to different maneuvers.

For example, the path planner 110 may selectively analyze a graph corresponding to any of the various subgraphs of FIGS. 6A-6D based at least on costs associated with one or more of vertices 630 and/or 650 or edges 620 and/or 720 of the graph. The graph may include the vertices 630 and/or 650 indexed at least by configurations of the machine 2600 in the configuration space 112 and by maneuver types used by the machine 2600 to traverse the configurations, the edges 720 including maneuver edges linking first groups of the vertices that correspond to a same maneuver type of the maneuver types, and the edges 620 including transition edges linking second groups of the vertices that correspond to different maneuver types of the maneuver types.

At block B1004, the method 1000 includes determining one or more paths through the graph. For example, the path evaluator 130 may, based at least on the selectively analyzing, determine one or more paths through the graph.

At block B1006, the method 1000 includes performing one or more control operations associated with the machine. For example, the control component(s) 2350 may perform, based at least on the one or more paths, one or more control operations associated with the machine.

Figure 11:
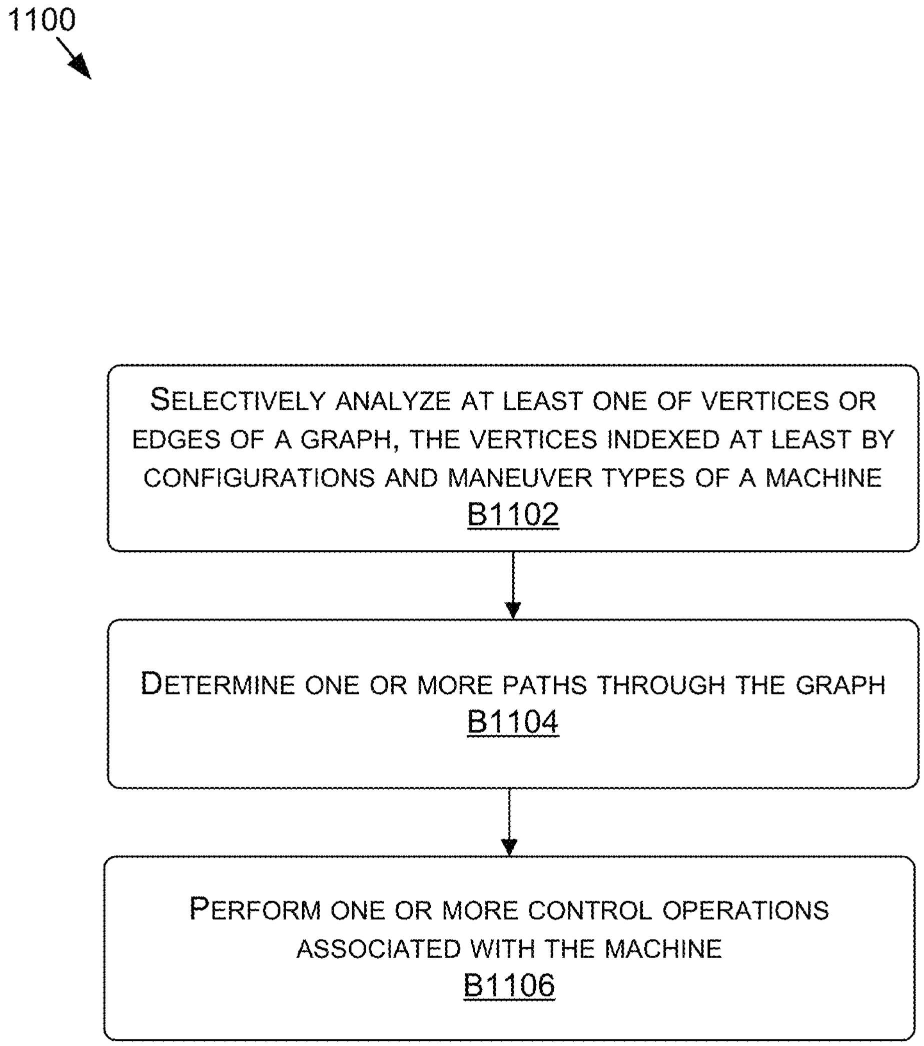
FIG. 11 is a flow diagram showing a method for selectively analyzing one or more edges or vertices of a graph where the vertices are indexed by configurations and maneuver type, in accordance with some embodiments of the present disclosure.

Now referring to FIG. 11, FIG. 11 is a method 1100 for selectively analyzing one or more edges or vertices of a graph where the vertices are indexed by configurations and maneuver type, in accordance with some embodiments of the present disclosure. The method 1100, at block B1102, includes selectively analyzing at least one of vertices or edges of a graph, the vertices indexed at least by configurations and maneuver types for a machine. For example, the path planner 110 may selectively analyze vertices 630 and/or 650 or edges 620 and/or 720 of the graph of a graph corresponding to any of the various subgraphs of FIGS. 6A-6D, the vertices indexed at least by configurations of the machine 2600 in the configuration space 112 and by maneuver type used by the machine 2600 to traverse the configurations.

At block B1104, the method 1100 includes determining one or more paths through the graph. For example, the path evaluator 130 may, based at least on the selectively analyzing, determine one or more paths through the graph.

At block B1106, the method 1100 includes performing one or more control operations associated with the machine. For example, the control component(s) 2350 may perform, based at least on the one or more paths, one or more control operations associated with the machine.

Non-Holonomic Motion Planning Using Transition State Volumes

As described herein, points corresponding to a maneuver type(s) and/or a transition state(s) may be indexed in a 'volume' corresponding to an underlying configuration space 112. For example, in FIG. 7, the volume 750A indexes points (e.g., corresponding to the vertices) for a left maneuver type. In at least one embodiment, a volume for a maneuver type(s) may be used track and/or store cost values corresponding to maneuver edges (maneuver costs). The cost for a vertex (e.g., corresponding to a point in the volume) may be based at least on the cost-to-come or cost-to-go between vertices of the same volume while maintaining the maneuver type(s). Similarly, a volume for a transition state(s) may be used track and/or store cost values corresponding to transition edges (transition costs). The cost for a vertex (e.g., corresponding to a point in the volume) may be based at least on the cost-to-come or cost-to-go between vertices of different volumes of different maneuver types.

However, using the volumes to store maneuver costs may require a corresponding memory volume for each maneuver type, with each memory volume providing storage space for each configuration of the discretized configuration space 112. Thus, for example, using the graph 600B of FIG. 6B, six memory volume may be needed, each having a storage size corresponding to the resolution of the discretized configuration space 112. As such, the computational requirements for storing the maneuver costs may become prohibitive both in terms of storage space and access times and/or bandwidth for corresponding read/write operations. As such, the resolution of the configuration space 112 and/or the number of maneuver types used for path planning may be limited to fit within computational budgets.

In accordance with one or more embodiments, rather than storing a cost associated with a point or vertex corresponding to a maneuver type(s) in a corresponding maneuver volume, the cost may be stored using a point or vertex corresponding to a transition state(s) in a corresponding transition volume. Thus, the cost(s) for performing a maneuver type(s) or maneuver may be accounted for without requiring a dedicated memory volume. For example, the reachability evaluator 148 may use the same memory volume for storing cost values that correspond to maneuvers for different maneuver types that correspond to different volumes and/or vertices in the transition subgraph S(X). Thus, a separate memory volume need not be used for each maneuver type, transition state, and/or vertex of the transition subgraph S(X), thereby preserving computational resources.

In at least one embodiment, to share a memory volume between maneuver types, the system may determine a cost for a machine to reach a configuration of a configuration space using various different maneuver types. The system may then evaluate one or more of the costs to determine which of the costs to store at one or more memory location(s) corresponding to the configuration (e.g., a point in a memory volume). For example, the system may evaluate the costs using one or more criteria, such as by comparing one or more of the costs (e.g., for value iteration). In at least one embodiment, the evaluation may be used to select a lowest cost maneuver type and/or corresponding path for reaching the configuration and to store the cost(s) corresponding to the selection. In at least one embodiment, when evaluating a maneuver corresponding to a maneuver type, a cost may be determined for each configuration traversed using the maneuver with costs rippling through the maneuver as the cost for each configuration is evaluated with respect to any previously stored cost(s).

In at least one embodiment, a configuration may include an initial cost for reaching the configuration (e.g., corresponding to a current discovered lowest cost path for reaching the configuration). Multiple maneuvers having different maneuver types may be evaluated starting from the configuration. When evaluating a maneuver, the initial cost may be updated using corresponding maneuver costs to determine potential costs for each configuration reached from the initial configuration. At each configuration reached using the maneuver, the system may compare the current cost (if present) stored in the memory volume for that configuration to the cost corresponding to the maneuver (e.g., in accordance with value iteration) to determine whether to store the cost for that configuration (e.g., to overwrite one or more existing cost values). For example, the system may determine, using the cost corresponding to the maneuver, that a path corresponding to the cost is an improvement to a path corresponding to the stored cost. In at least one embodiment, the system compares the costs and retains the lowest cost and corresponding pose for the configuration.

In at least one embodiment, the one or more memory location(s) may correspond to a transition state(s) and/or a transition volume. Further, in addition to maneuver costs, the costs that are evaluated may reflect a transition cost(s) for reaching the configuration. For example, a configuration may include an initial cost for reaching the configuration (e.g., corresponding to a current discovered lowest cost path for reaching the configuration).

Figure 12:
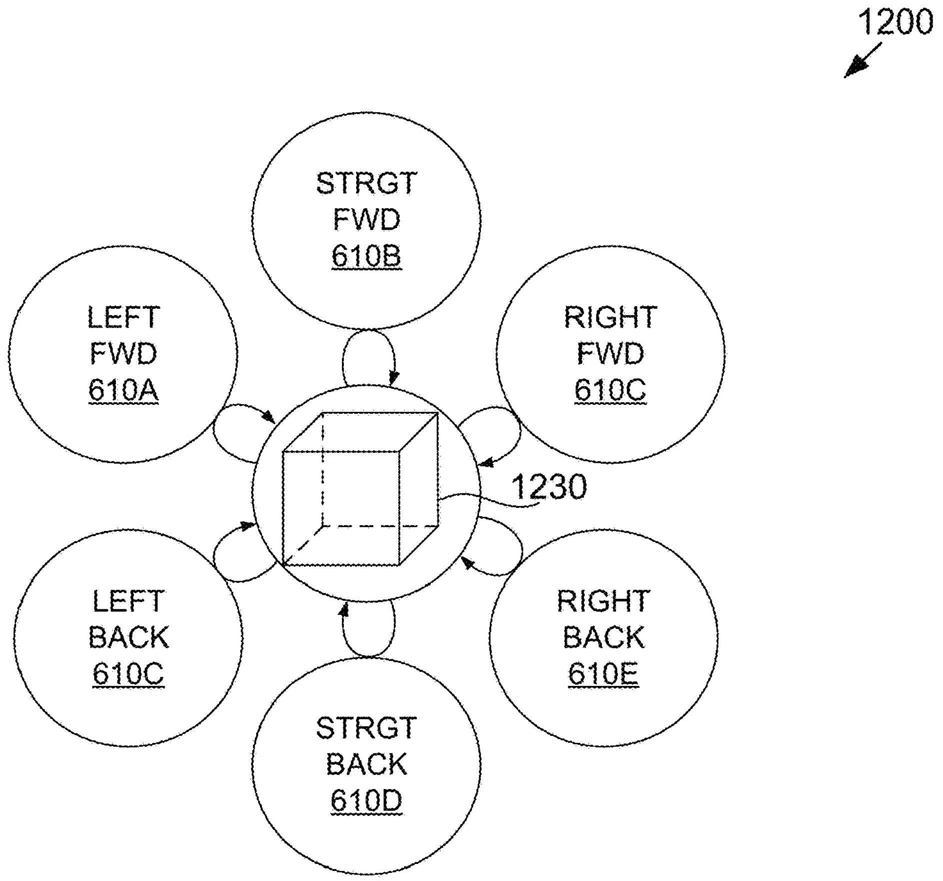
FIG. 12 illustrates a visualization of an example approach for processing maneuvers to determine one or more paths through a configuration space, in accordance with some embodiments of the present disclosure.

Referring now to FIG. 12, FIG. 12 illustrates a visualization 1200 of an example approach for processing maneuvers to determine one or more paths through a configuration space, in accordance with some embodiments of the present disclosure. The approach is shown using an example of a memory volume 1230 corresponding to a transition state(s), which may correspond to the vertex 630 of FIG. 6B. In particular, the visualization 1200 may correspond to the star topology described with respect to FIG. 6B. However, disclosed approaches may be used for with other topologies and/or graphs. As further examples, the processing approach may be implemented using the graph 600C (e.g., using a memory volume corresponding to the vertex 630) or the graph 600D (e.g., using a memory volume corresponding to the vertex 650).

In performing the processing to determine one or more paths through a configuration space, the reachability evaluator 148 may process a cycle through a respective maneuver for each maneuver type(s) of the transition subgraph S(X). In the example of FIG. 12, there may be a cycle for processing six different maneuvers corresponding to six different maneuver types (e.g., in parallel). Processing a cycle for a maneuver may include performing value iteration through all edges of the maneuver (e.g., corresponding to respective configurations reached or traversed by the maneuver). Over a number of cycles, the cost values may converge to final values which may exactly match an optimal solution to the cost or value function.

The reachability evaluator 148 may process each cycle in the order of, for example, Left-Forward, Straight-Forward, Right-Backward, Right-Forward, Straight-Backward, Left-Backward. If the order is favorable, a single cycle may produce several useful maneuvers, but in the worst case, the maneuvers of the best plan may be in the reverse cycle order, and even in the worst case, processing $N_T$ cycles may evaluate all $N_T$-maneuver plans.

In implementations where the reachability evaluator 148 evaluates maneuvers using a parallel processing unit(s), such as a GPU(s), kernel-style processing may be performed where each maneuver and/or vertex may be processed using a respective maneuver kernel. The maneuver kernel for a maneuver may fast-track value iteration through all of the edges of the corresponding maneuver. With $N_T$ cycles, processing through the maneuvers may guarantee finding optimal paths up to $N_T$ maneuvers but can also discover longer plans. As indicated in FIG. 12, only a single volume of memory may be needed for the value function at the transition state (center) for the processing, as the reachability evaluator 148 may only need to store the value function for the transition state. In at least one embodiment, the cost values may converge in four to eight parallel processing cycles.

For any number of X, kernel-style processing may cycle through all of the maneuvers of a corresponding transition subgraph S(X) for a number of cycles. For example, in parallel implementations maneuver-kernels may process through cycles for all of the maneuver curves of corresponding maneuvers in parallel on a parallel processing unit(s), such as a GPU(s). However, in one or more embodiments, one or more of the cycles may be performed sequentially, such as using a CPU(s). As described herein, in at least one embodiment, only the cost values of the transition states need to be represented in memory and all other edges and vertices may be processed on the fly along one maneuver at a time. In one or more embodiments, a cycle for a maneuver (e.g., performed by a maneuver kernel) may consider starting from any transition state at its current value, transitioning into the maneuver, following any number of edges along the maneuver, and then transitioning back to the transition state, and updating the value if one or more criteria are satisfied (e.g., if the value is determined to be better than the current value according to some metric).

Figure 13:
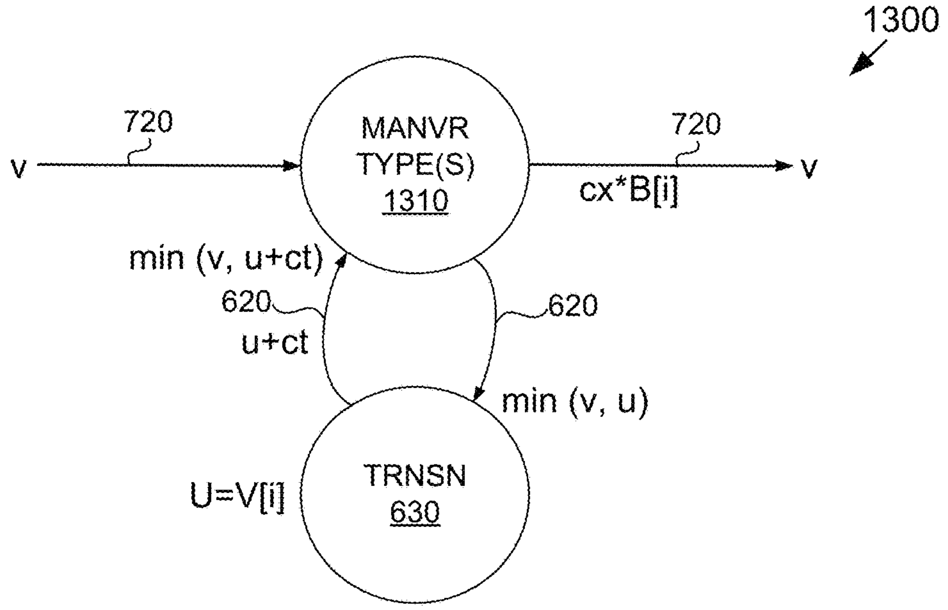
FIG. 13 illustrates a visualization of an example approach for processing maneuvers using maneuver kernels, in accordance with some embodiments of the present disclosure.

Referring now to FIG. 13, FIG. 13 illustrates a visualization 1300 of an example approach for processing maneuvers using maneuver kernels, in accordance with some embodiments of the present disclosure. The visualization 1300 may correspond to processing a maneuver for one of the maneuver types 1310 (e.g., a maneuver vertex). However, a similar approach may be used for each maneuver type and/or maneuver vertex. With reference to FIG. 12, in at least one embodiment, the processing of the maneuver corresponds to pseudocode 1530 of FIG. 15, where V may refer to the memory or value volume (e.g., the memory volume 1230), N may refer to a number of configurations reached by the maneuver, B may refer to an obstacle volume, ct may refer to a transition cost, ex may refer to an edge distance, and u and v may refer to temporary values. The forgoing example may index into an array for simplicity, but in one or more implementations may index into a volume, as described herein. In at least one embodiment, turn maneuvers (e.g., left or right maneuvers) may be processed for two full loops where they are cyclical, whereas a straight maneuver may be processed using a single loop.

Figure 14:
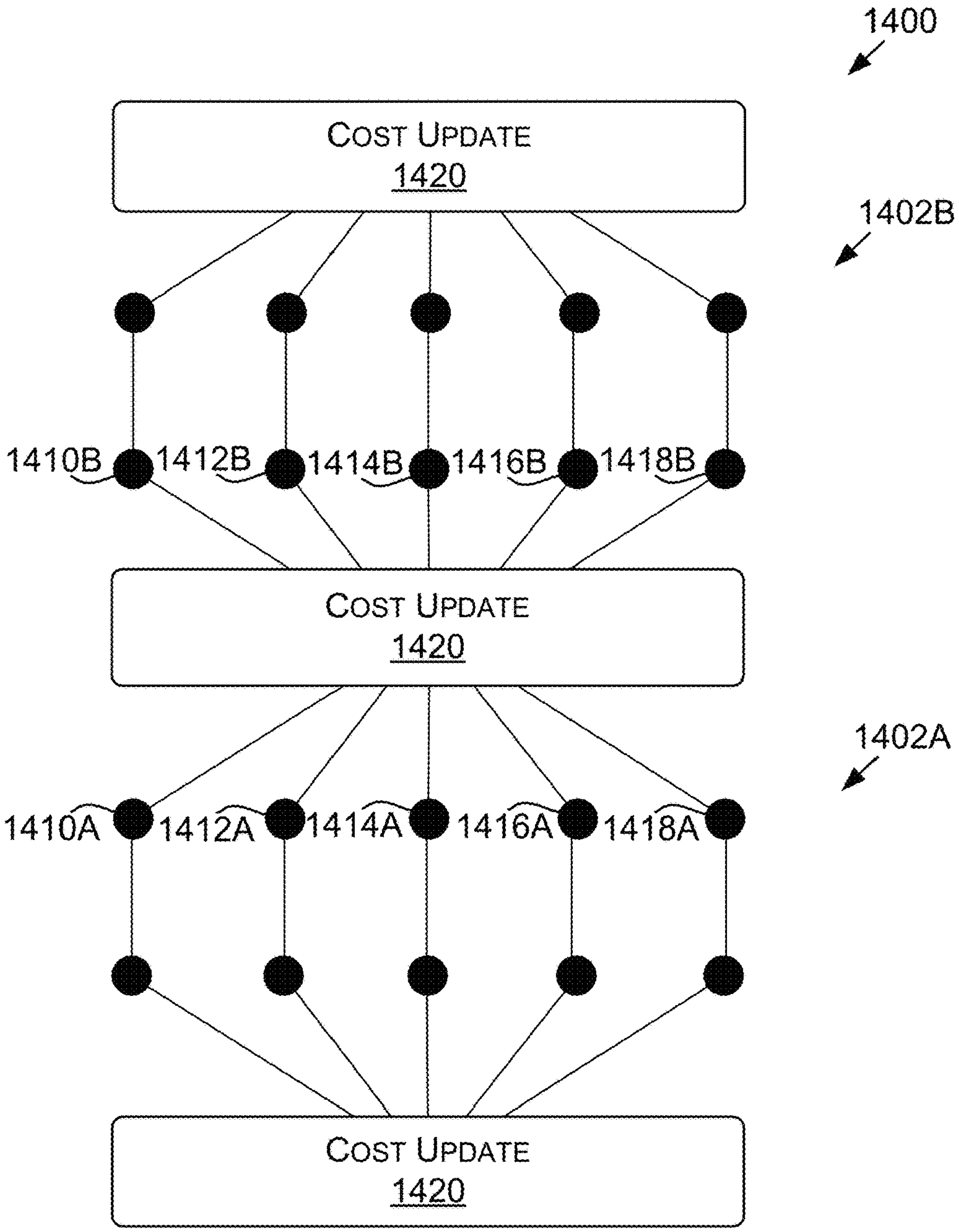
FIG. 14 illustrates an example of a compute flow graph which may be used to process maneuvers, in accordance with some embodiments of the present disclosure.
Figure 15:
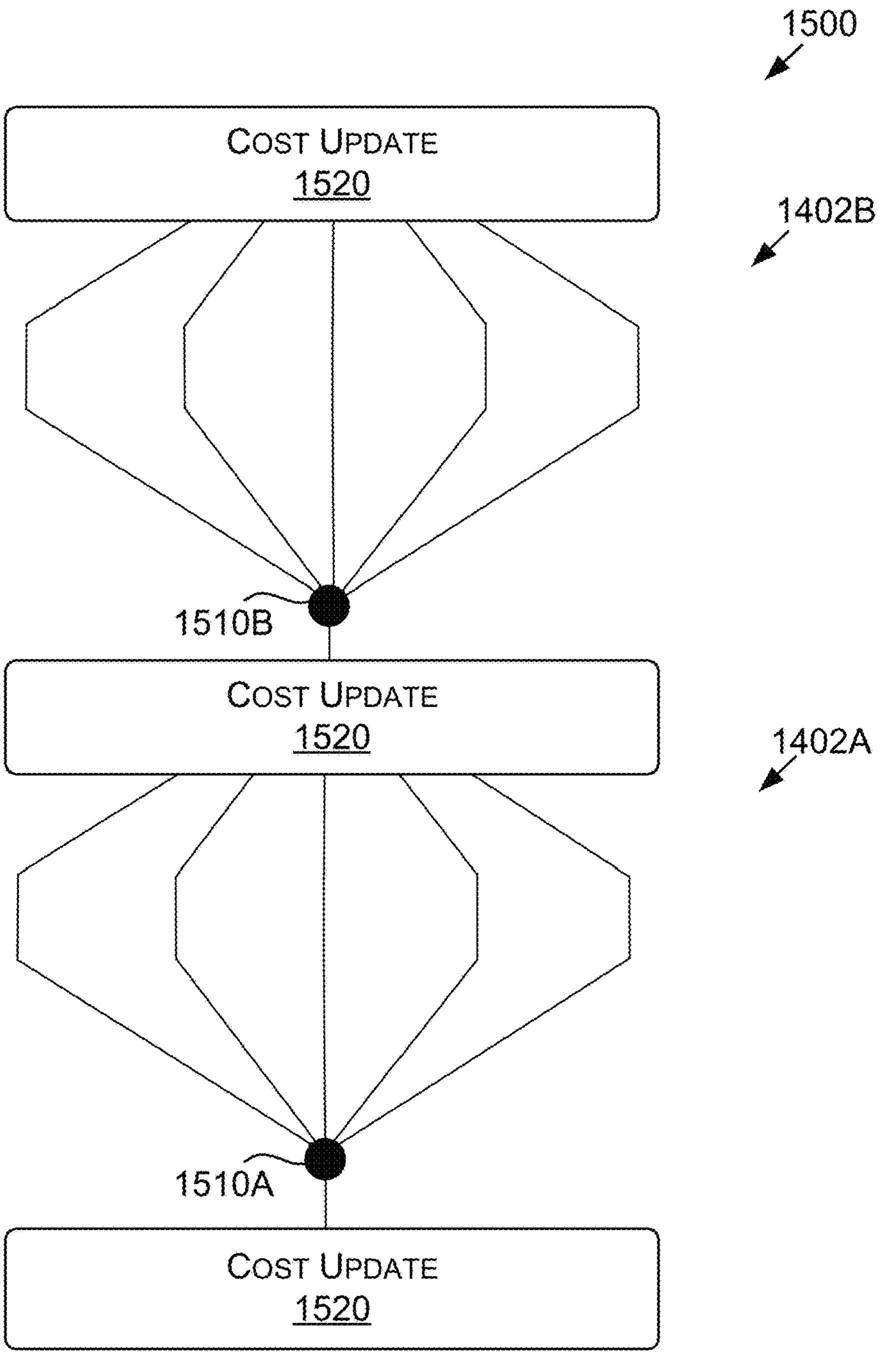
FIG. 15 illustrates another example of a compute flow graph which may be used to process maneuvers, in accordance with some embodiments of the present disclosure.

Referring now to FIGS. 14 and 15, FIG. 14 illustrates an example of a compute flow graph 1400 which may be used to process maneuvers, in accordance with some embodiments of the present disclosure. FIG. 15 illustrates another example of a compute flow graph 1500 which may be used to process maneuvers, in accordance with some embodiments of the present disclosure. In at least one embodiment, the compute flow graph 1500 may correspond to the approach for processing maneuvers to determine one or more paths through a configuration space described with respect to, for example, FIGS. 12 and 13. The compute flow graph 1400 may provide an alternative approach to the approach corresponding to the compute flow graph 1500.

Similar to the compute flow graph 1500, the compute flow graph 1400 may proceed through N iterations or cycles, such as an iteration 1402A and an iteration 1402B. For each iteration, the reachability evaluator 148 may similarly consider K maneuver types (e.g., forward left, backward left, straight, forward right, backward right, etc.). However, rather than storing costs using a shared memory volume, each iteration may use a respective memory volume for storing costs for a respective maneuver type.

In the example shown, the memory volumes are used for a cost update of post-maneuver cost outputs from a previous iteration to generate pre-maneuver costs for the iteration. For example, in the compute flow graph 1400, the iteration 1402B may include a cost update 1420 of post-maneuver cost output spaces 1410A, 1412A, 1414A, 1416A, and 1418A from the iteration 1402A to generate pre-maneuver cost output spaces 1410B, 1412B, 1414B, 1416B, and 1418B for the iteration 1402B. In one or more embodiments, a post-maneuver cost may represent the lowest cost of reaching a configuration ending with the corresponding maneuver type and a pre-maneuver cost may represent the lowest cost of reaching the configuration and being ready without penalty for the corresponding maneuver.

Also in the compute flow graph 1400, the cost update 1420 of an iteration may perform processing to transform the pre-maneuver costs into post-maneuver costs and the process may be repeated. For example, the iteration 1402B may include converting the pre-maneuver cost output spaces 1410B, 1412B, 1414B, 1416B, and 1418B into corresponding post-maneuver cost output spaces. In FIGS. 14 and 15, each vertical line indicates evaluation of a maneuver for one maneuver type (e.g., performed using a maneuver kernel).

FIG. 14 includes pseudocode 1430 to illustrate how a kernel of the reachability evaluator 148 may process through N configuration cells of a maneuver using a core loop that works with a cost function, which involves a cost c. Reachability may be represented by a local variable r when the kernel finds an obstacle as represented by an element of an occupancy space input F, and may be turned on for a configuration cell i when the kernel finds reachability from a previous iteration as represented by a reachability space input Ri, then writes out the reachability r to a reachability space output Ro.

Using the approach of the compute flow graph 1400 may require storage for the costs for each maneuver type, as well as bandwidth for accessing the costs from a previous iteration. In contrast, by sharing storage space for the costs, for example, using the approach of the compute flow graph 1500 to maintain the lowest cost amongst the maneuver types and/or maneuvers or otherwise select a cost amongst the maneuver types and/or maneuvers, the storage and bandwidth requirements need not increase with the number of maneuver types and/or maneuvers. For example, rather than each of the maneuver costs being stored to facilitate a cost update 1420 for transforming pre-maneuver costs into post-maneuver costs, a shared pre/post maneuver cost (e.g., that may or may not account for transition costs) may be stored (e.g., indicated a points 1510A and 1510B) using a cost update 1520. The maneuver costs for each maneuver type and/or maneuver may be respectively computed and added to the shared cost on-the-fly (e.g., using a maneuver kernel), and the post-maneuver costs may be aggregated to update the stored shared cost(s) using the cost update 1520. In at least one embodiment, the shared storage (e.g., in either approach) may further store an indication of the maneuver type(s) corresponding to the shared cost and configuration(s) and/or vertex, for example, to indicate the corresponding path for path tracking.

In addition, in embodiments where transition costs are incorporated into the costs (e.g., pre and/or post maneuver costs), the cost update 1420 may perform a computationally expensive swivel operation to convert the post-maneuver costs from a prior iteration to pre-maneuver costs for a subsequent iteration while accounting for different potential transition cost combinations. For example, for each post-maneuver cost and corresponding maneuver type, the cost update 1420 may access storage to add the transition cost for each other potential maneuver type (e.g., to compute five potential pre-maneuver costs for each maneuver type). The cost update 1420 may then aggregate the potential pre-maneuver costs for all of the maneuver types (e.g., twenty-five potential pre-maneuver costs in this example) to select the optimal (e.g., lowest) pre-maneuver costs and corresponding prior maneuvers and/or maneuver types.

In at least one embodiment, the same transition costs may be used for at least two of the maneuver types and/or maneuvers (e.g., where storage is shared for those maneuver types) to simplify the conversion of post-maneuver costs to pre-maneuver costs. Thus, the potential pre-maneuver cost combinations, corresponding computations used to determine and select the pre-maneuver cost(s), and/or transition edges may be reduced. In at least one embodiment, the same transition cost may be used for each of the maneuver types and/or maneuvers. For example, using the compute flow graph 1500 and/or the approach of FIG. 13, the same transition cost may be used for each maneuver and/or maneuver type such that a swivel operation is not required.

Figure 16:
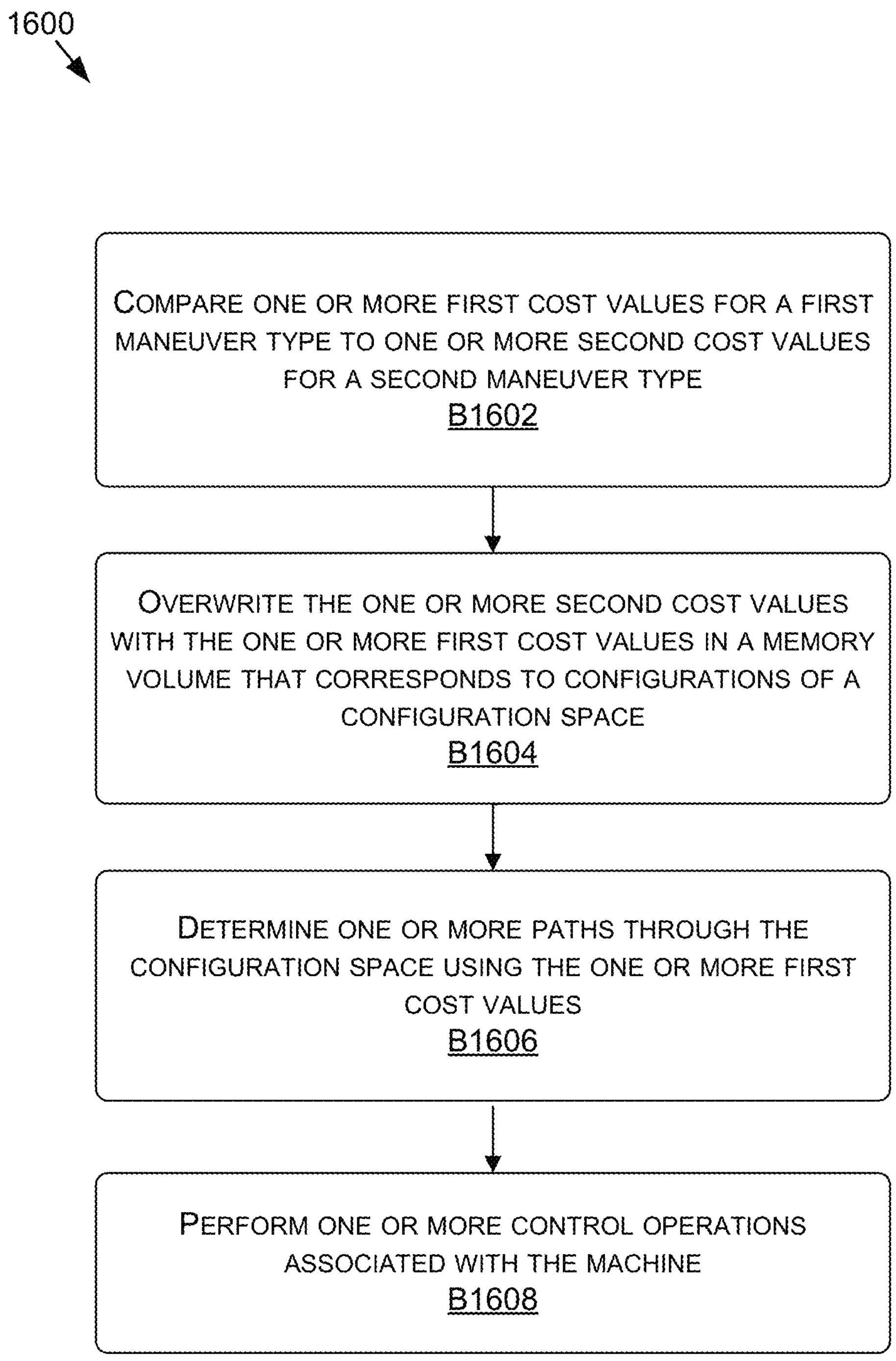
FIG. 16 is a flow diagram showing a method for sharing a memory volume for storing cost values for maneuver types, in accordance with some embodiments of the present disclosure.

Referring now to FIG. 16, FIG. 16 is a flow diagram showing a method 1600 for sharing a memory volume for storing cost values for maneuver types, in accordance with some embodiments of the present disclosure. The method 1600, at block B1602 includes comparing one or more first cost values for a first maneuver type to one or more second cost values for a second maneuver type. For example, as indicated in FIGS. 12 and 13, the path planner 110 may compare one or more first cost values for the machine 2600 to traverse the configuration space 112 using a first maneuver type 1310 to one or more second cost values for the machine 2600 to traverse the configuration space 112 using a second maneuver type 1310.

At block B1604, the method 1600 includes overriding the one or more second cost values with the one or more first cost values in a memory volume that corresponds to configurations of a configuration space. For example, the path planner 110 may, based at least on the comparing, overwrite the one or more second cost values with the one or more first cost values in the memory volume 1230 that corresponds to configurations of the configuration space 112.

At block B1606, the method 1600 includes determining one or more paths through the configuration space using the one or more first cost values. For example, the path evaluator 130 may determine one or more paths through the configuration space 112 using the one or more first cost values.

At block B1608, the method 1600 includes performing one or more control operations associated with the machine. For example, the control component(s) 2350 may perform, based at least on the one or more paths, one or more control operations associated with the machine.

Figure 17:
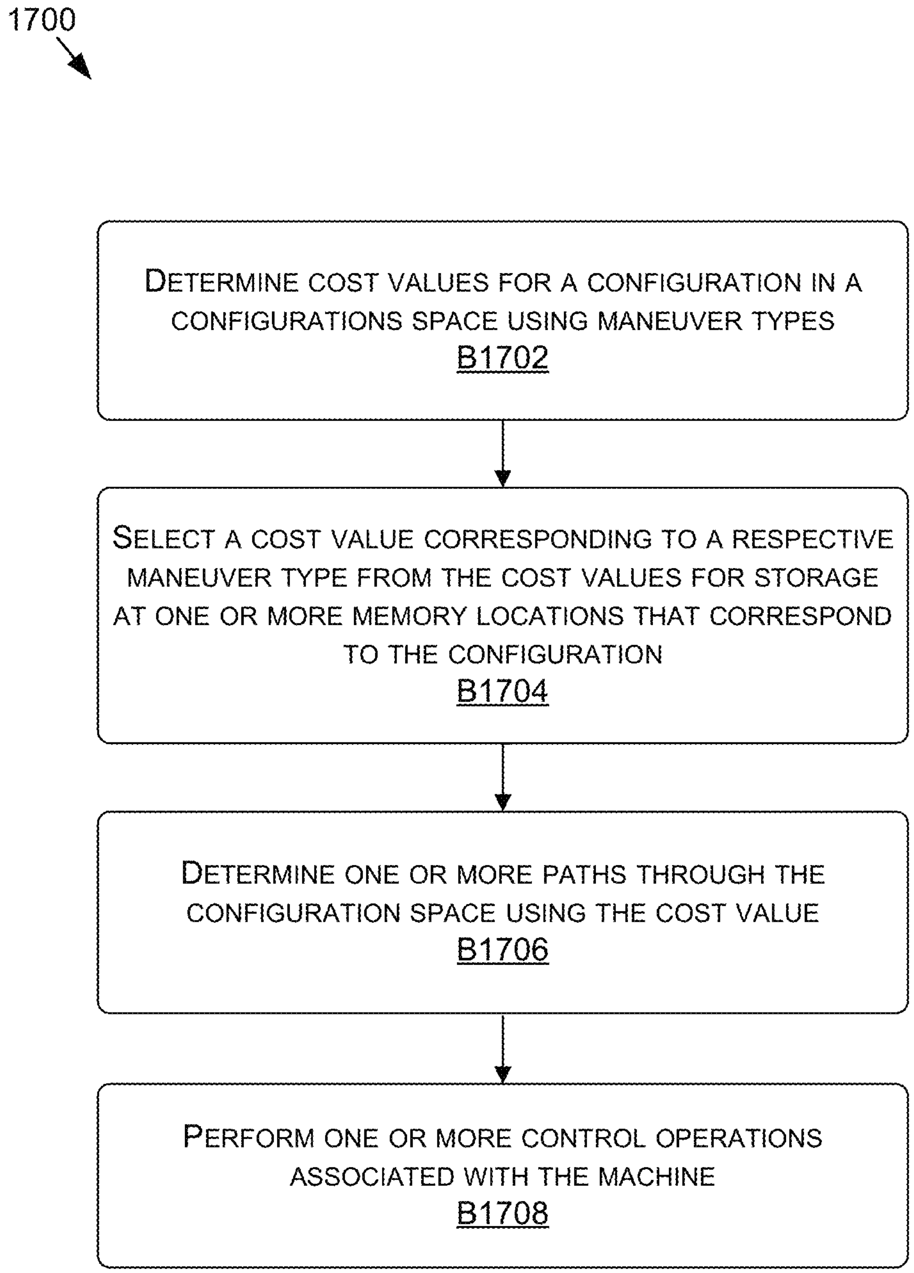
FIG. 17 is a flow diagram showing a method for selecting a cost value from cost values corresponding to maneuver types for storage in a memory volume, in accordance with some embodiments of the present disclosure.

Referring now to FIG. 17, FIG. 17 is a flow diagram showing a method 1700 for selecting a cost value from cost values corresponding to maneuver types for storage in a memory volume, in accordance with some embodiments of the present disclosure. The method 1700, at block B1702 includes determining cost values for a configuration in a configuration space using maneuver types. For example, as indicated in FIGS. 12 and 13, the path planner 110 may determine cost values for a configuration in the configuration space 112 using the maneuver types 1310, a cost value from the cost values corresponding to a respective maneuver type of the maneuver types 1310 being used by the machine 2600 to reach the configuration.

At block B1704, the method 1700 includes selecting a cost value corresponding a respective maneuver type from the cost values for storage at one or more memory locations that correspond to the configuration. For example, the path planner 110 may select the cost value corresponding to the respective maneuver type from the cost values for storage at one or more memory locations that correspond to the configuration space 112 (e.g., in the memory volume 1230).

At block B1706, the method 1700 includes determining one or more paths through the configuration space using the cost value. For example, the path evaluator 130 may determine one or more paths through the configuration space 112 using the cost value.

At block B1708, the method 1700 includes performing one or more control operations associated with the machine. For example, the control component(s) 2350 may perform, based at least on the one or more paths, one or more control operations associated with the machine.

Non-Holonomic Motion Planning with Smooth Curvature and Velocity

As described herein, in at least one embodiment, the configuration space 112 may be parameterized, at least, in part, by the pose for the vehicle 2600, such as the pose P=(x, y, θ). The reachability manager 112 may determine high quality paths through the configuration space 112 using such a parameterization. However, it may be challenging for the reachability manager 148 to accurately model the ability of the vehicle 2600 to change curvature or steering and/or velocity during a maneuver. For example, using P=(x, y, θ) to model maneuvers, the trajectories or maneuvers available for a maneuver type may have a fixed turn radius or vehicle orientation θ, resulting in either circle or straight-line maneuvers, as indicated in FIG. 5. Thus, for example, there may be a limited number of curvatures available for planning the paths through the configuration space 112, which may limit the paths that may be planned through the environment. For example, if the reachability manager were limited to a single left maneuver type curvature, right maneuver type curvature, and straight maneuver type, the resultant paths may be limited to connected circular and straight segments and include jumps in steering controls (e.g., steering wheel positions) to transition between maneuvers. While additional maneuver types may be added to reflect different curvatures, the available maneuvers would still be limited.

In at least one embodiment, a configuration space used to determine paths through an environment, such as the configuration space 112, may be parameterized, at least in part, by one or more variables corresponding to curvature for the vehicle 2600, such as one or more of the curvature of the vehicle orientation or steering of the vehicle 2600, a steering position (e.g., steering wheel) for the vehicle 2600, a velocity of the vehicle 2600, and/or an acceleration of the vehicle 2600. Thus, the maneuvers and/or maneuver types available to the reachability manager 122 for planning paths through the configuration space 112 may reflect a more general and comprehensive model of the steering dynamics available to the vehicle 2600. Such an approach may result in the paths being of higher quality, which may require fewer post-processing and/or re-planning resources.

In at least one embodiment, the configuration space 112 may be parameterized, at least in part, using curvature k as a state dimension (e.g., in addition to the pose). Thus, rather than 3D volumes, the configuration space 112 for maneuver types and/or maneuvers may correspond to 4D volumes or arrays of 3D volumes. For example, memory and/or computation may be organized and treated as an array of a same type of the 3D volumes described herein (e.g., with respect to FIGS. 6A-6D and 7). For example, an array(s) of left maneuver type volumes corresponding to different curvatures may be used along with an array(s) of right maneuver type volumes corresponding to different curvatures.

In at least one embodiment, a maneuver type and/or maneuver may correspond to a constant rate of change of curvature for the vehicle 2600. Corresponding maneuver types may then form respective clothoid maneuvers to model smooth or gradual changes to steering and curvature (e.g., as in FIG. 18). More generally, the maneuvers may have varying curvature, rather than fixed curvature and, for example, correspond to at least a portion of (e.g., forward or backward half of, all of, etc.) an S curve and/or clothoid. In at least one embodiment, the maneuvers and/or maneuver types (e.g., maneuver edges) that have varying curvature may span across an array of fixed curvature volumes (e.g., 3D volumes) as opposed to being confined to a single volume (e.g., as in FIG. 19).

In at least one embodiment, the volumes may collectively be treated as the value function of the transition state(s) in a graph (e.g., the graph 600B), and the edges of the graph may represent the extremal controls. By modeling transition costs, or penalties, with shortest paths, a finite number of primitives (e.g., including clothoids) may be defined. Thus, the maneuver types and/or maneuvers that are modeled and/or analyzed using a graph may still be limited to and/or include a finite set of control actions for the vehicle 2600, at least some of which may be based on one or more extremal models of the vehicle 2600. In one or more embodiments, the maneuvers (e.g., left, straight, right) where curvature $|k|=k_{max}$ or k=0 (steering limits engaged or straights) may still be modeled using corresponding volumes of an array of volumes (e.g., similar to FIG. 7). For example, the maneuvers may correspond to a first, middle, and last of the volumes in an array.

In further respects, the disclosure provides approaches for efficiently modeling stopping from any configuration to change steering (and optionally gear) while the vehicle 2600 is not moving. In at least one embodiment, a transition volume (e.g., a single transition volume) may be used that represents the vehicle 2600 being stopped while changing gear. The transition volume(s) may be connected to any number of the other volumes back and forth using transition edges. This approach may imply a fixed cost for any non-continuous steering change. Another approach may be to connect each volume to neighbor volumes using transition edges. This approach may imply a cost linear to the amount of steering change. A further approach may add an entire array(s) of stopped volumes, which may be connected with the moving volumes and with their neighbors. This approach may allow a transition cost to stop/start and another for amount of steering change.

In at least one embodiment, the volumes may be provided to represent maneuver curves for which the curvature rate of change is held at a constant extreme in which $|v|=v_{max}$ and $|y|=y_{max}$ is inserted into $\dot{X}=f(X, u)=(v \cos \theta, v \sin \theta, vk, \gamma)$. Assume starting at $X=(x_0, y_0, \theta_0, k_0)$, where $$k_0 = 0, \text{ and}$$

$$\psi(t, v, \gamma) = v\gamma t^2/2,$$

$$\phi_s(t, \theta_0, v, \gamma) = v\int_0^t \sin(\theta_0 + \psi(t, v, \gamma))\,d\tau, \text{ and}$$

$$\phi_c(t, \theta_0, v, \gamma) = v\int_0^t \cos(\theta_0 + \psi(t, v, \gamma))\,d\tau.$$

The function arguments v, $\gamma$ may be suppressed to simplify the notation, since they may be assumed constant, to provide $\phi_s(t, \theta_0)$, $\phi_c(t, \theta_0)$, $\psi(t)$. Integer versions may also be defined:

$$\Psi(t) = \text{round}(\psi(t)),$$

$$\Phi_s(t, \theta_0) = \text{round}(\phi_s(t, \theta_0)), \text{ and}$$

$$\Phi_c(t, \theta_0) = \text{round}(\phi_c(t, \theta_0)).$$

For constant controls, the solution to the maneuver curves according to these dynamics may then correspond to clothoids of the form $X(t)=(x_0+\varphi_c(t, \theta_0), y_0+\varphi_s(t, \theta_0), \theta_0+\psi(t), \gamma t)$.

Figure 18:
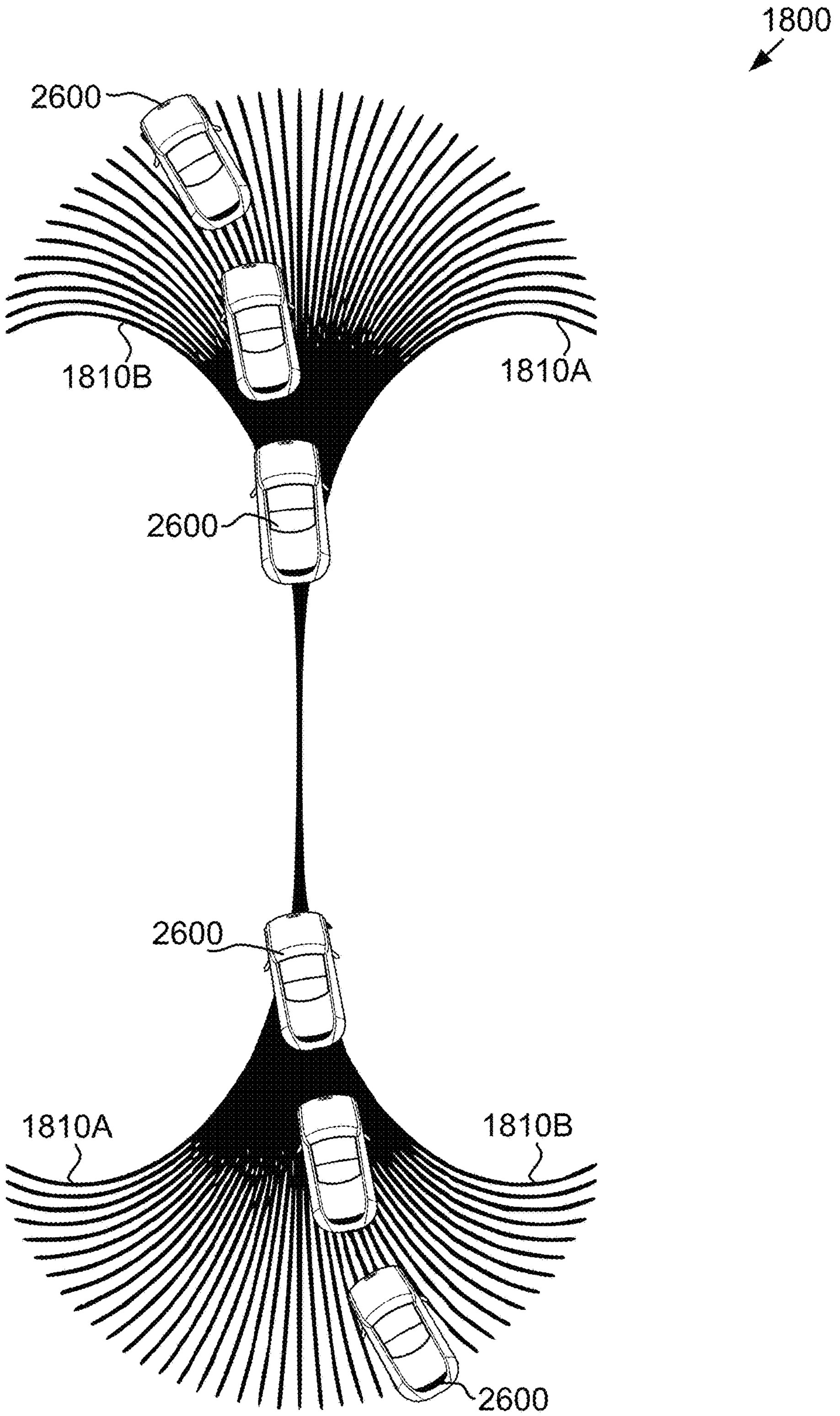
FIG. 18 illustrates a visualization of examples of clothoids which may correspond to maneuvers used to determine one or more paths through a configuration space, in accordance with some embodiments of the present disclosure.

Referring now to FIG. 18, FIG. 18 illustrates a visualization 1800 of examples of clothoids which may correspond to maneuvers used to determine one or more paths through a configuration space, in accordance with some embodiments of the present disclosure. The visualization 1800 includes numerous clothoids, of which clothoid 1810A and clothoid 1810B are individually labeled. The visualization 1800 also shows an example of the vehicle 2600 at various locations along a clothoid.

In at least one embodiment, an integer grid of $(x_0, y_0, \theta_0)$ may be used as thread-indices. The reachability manager 122 may sweep the maneuver curves (e.g., using corresponding maneuver kernels as described herein) parameterized by the curvature k, across the array of volumes, as described herein. Then $t=k/\gamma$ and the threads may map bijectively to each volume via the mapping $(x_0, y_0, \theta_0, k)\rightarrow(x_0+\Phi_c(k/\gamma, \theta_0), y_0+\Phi_s(k/\gamma, \theta_0), \theta_0+\Psi(k/\gamma), k)$, which may be considered modulo the spatial and angular dimensions like in the 3D case. This mapping of integer vectors to integer vectors may represent an approximation (e.g., by rounding) to the continuum solution. The mapping may be bijective in that the mapping has an inverse $(x, y, \theta, k)\rightarrow(x-\Phi_c(k/\gamma, \theta_0), y-\Phi_s(k/\gamma, \theta_0), \theta_0, k)$, where $\theta_0=\theta-\Psi(k/\gamma)$.

In various examples, for a given k, the $\theta_0$-planes may be permuted based at least on each being shifted by a same amount $\Psi(k/\gamma)$ modulo the angular dimension, and then within a $(\theta_0, k)$-plane, grid cells may be shifted in a translation-invariant manner based at least on a constant translation $(\Phi_c(k/\gamma, \theta_0), \Phi_s(k/\gamma, \theta_0))$. Thus, in implementations where memory accesses are performed on the volumes, the memory accesses may be performed efficiently.

Figure 19:
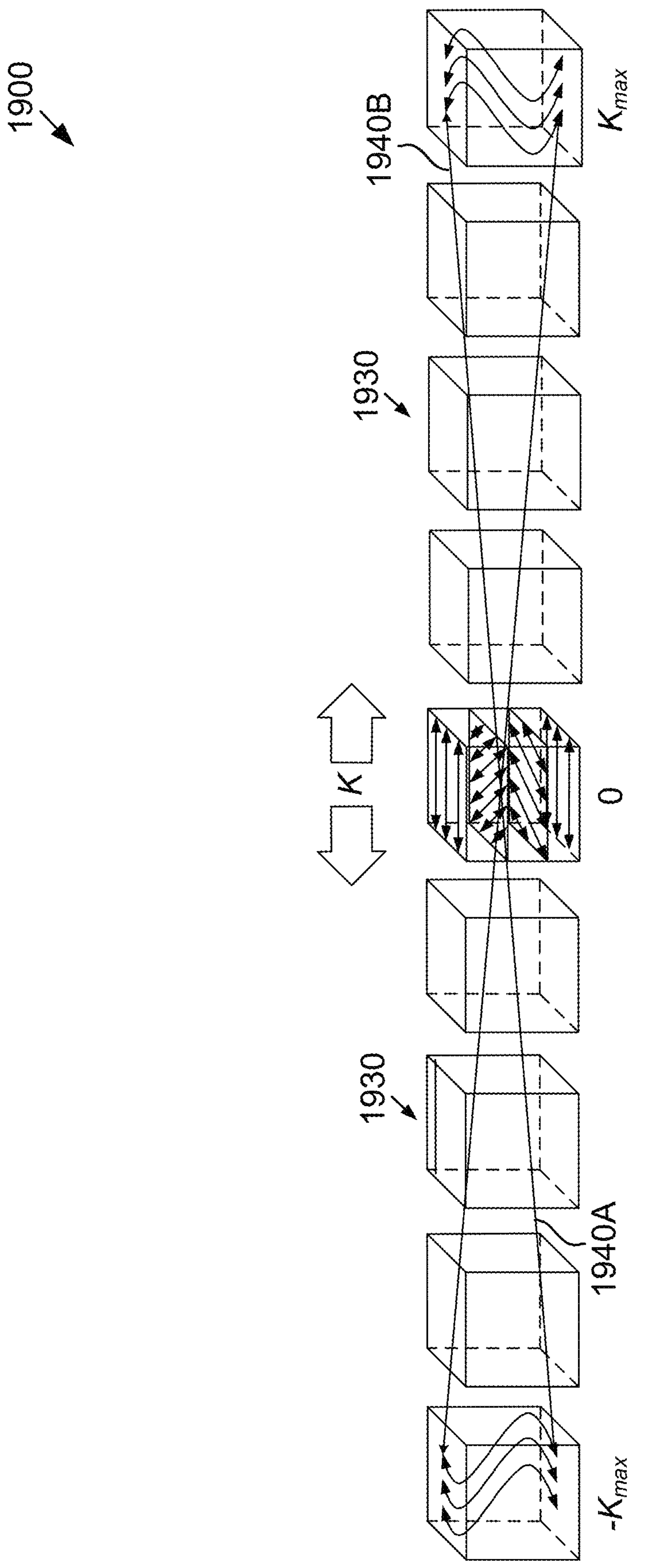
FIG. 19 illustrates an example visualization of volumes and edges of a graph corresponding to a configuration space that is parameterized using curvature, in accordance with some embodiments of the present disclosure.

Referring now to FIG. 19, FIG. 19 illustrates an example visualization 1900 of volumes and edges of a graph corresponding to a configuration space that is parameterized using curvature, in accordance with some embodiments of the present disclosure. As indicated in FIG. 19, volumes 1930 may be organized by an array of volumes indexed according to the curvature k. In at least one embodiment, the visualization 1900 may correspond to a memory organization for the volumes corresponding to different curvatures. Maneuver edges 1940A and 1940B may correspond to maneuvers and/or maneuver types which cross or span at least two volumes in the array of volumes 1930 (e.g., clothoids).

In at least one embodiment, the parameterization may move along the curvature k and/or some function thereof, for example, such that one step does not cause a jump in (x, y, θ) greater than one grid cell. As such, the resolution may be defined such that:

$$\left|\frac{dx}{dk}d_k\right| = \left|\frac{dx}{dt}\frac{dt}{dk}d_k\right| = \left|\frac{d_k v_{max}\cos\theta}{\gamma_{max}}\right| \le \left|\frac{d_k v_{max}}{\gamma_{max}}\right| \le d_x.$$

$$\left|\frac{dy}{dk}d_k\right| = \left|\frac{dy}{dt}\frac{dt}{dk}d_k\right| = \left|\frac{d_k v_{max}\sin\theta}{\gamma_{max}}\right| \le \left|\frac{d_k v_{max}}{\gamma_{max}}\right| \le d_x, \text{ and}$$

$$\left|\frac{d\theta}{dk}d_k\right| = \left|\frac{d\theta}{dt}\frac{dt}{dk}d_k\right| = \left|\frac{d_k v_{max} k}{\gamma_{max}}\right| \le \left|\frac{d_k v_{max} k_{max}}{\gamma_{max}}\right| \le d_\theta,$$

which may result in a resolution defined in accordance with:

$$d_k \le d_x\gamma_{max}/v_{max}, \text{ and}$$

$$d_k \le R\,d_\theta\gamma_{max}/v_{max}.$$

The number of cells along the curvature dimension may correspond to $N_k=2k_{max}/d_k$. The time, distance, number of spatial grid cells and number of angular grid cells equivalent distance, respectively, that the vehicle 2600 takes to change the steering over a full range may be defined as $t_W=2k_{max}/\gamma_{max}$, $d_W=t_W v_{max}$, $N_{xW}=d_W/d_x$, and $N_{\theta W}=d_W/(Rd_\theta)$. The criteria above may then be written as $N_k\ge 2k_{max}v_{max}/(d_x\gamma_{max})$ and $N_k\ge 2k_{max}v_{max}/(Rd_\theta\gamma_{max})$ or $N_k\ge N_{xW}$ and $N_k\ge N_{\theta W}$.

The foregoing may be used to frame the 3D approach as a limit case of the 4D approach. For example, the forgoing may define the curvature resolution as at least the number of grid cells needed to change steering. In the 3D approach, the change to steering may be assumed to be instantaneous with $N_k=1$. However, using clothoids, the 4D approach may provide a more accurate model of steering transitions while moving.

In at least one embodiment, curvature resolution $N_k$ may be set to allow for modeling of a steering change using as many grid cells. In at least one embodiment, the number of cells along the curvature dimension $N_k$ may be determined and $\gamma_{max}=2k_{max}v_{max}/(Rd_\theta N_k)$ may be set as the slowest steering rate that the reachability manager 122 can model. The target curvature resolution may then be based at least on $N_{\theta W}=t_W v_{max}/(Rd_\theta)=N_\theta t_W v_{max}/(2\pi R)$. Thus, the multiplier on the angular resolution may correspond to $t_W v_{max}/(2\pi R)$, and in a non-limiting example, steering time $t_W=4$ s, maximum speed $v_{max}=6.7$ m/s, turning radius R=10 m is $4*6.7/62.8\cong0.43$ (around half the angular resolution).

While examples are provided where curves are parameterized using curvature k, as described herein, one or more other variables corresponding to a change in curvature for the vehicle 2600 may be used to parameterize the curves (e.g., to model a rate of change). As an example, the curves may be parameterized by x and y, similarly as for straights.

In addition to or alternatively from parameterizing the configuration space using one or more variables corresponding to a change or curvature, the configuration space may be parameterized based at least on velocity and/or acceleration. For example, a 5D configuration space may be defined with associated control and dynamics. The 5D configuration space may, for example, be defined according to $X=(x, y, \theta, k, v)$ with control $u=(\gamma, a)$, and the dynamics function $\dot{X}=f(X, u)=(v\cos\theta, v\sin\theta, vk, \gamma, a)$. Here, $\gamma$ may refer to curvature rate, and a acceleration.

Curvature rate and acceleration may be bounded according to $|\gamma|\leq y_{max}$, $|a|\leq a_{max}$. In at least one embodiment, the 5D configuration space may be simplified to 3D based at least on removing the bounds. Modelling control as applying directly to the velocity v may result in a 4D configuration space $X=(x, y, \theta, k)$ with control $u=(y, v)$ and dynamics $f(X, u)=(v\cos\theta, v\sin\theta, vk, y)$. If control is further modeled as applying directly to the curvature k, a 3D configuration space $X=(x, y, \theta)$ may result with control $u=(k, v)$ and $f(X, u)=v(\cos\theta, \sin\theta, k)$, which may correspond to the 3D model described herein.

The example 3D, 4D, and 5D models may differ by whether the curvature can be controlled directly or via a rate of change y, and whether velocity can be controlled directly or via acceleration a. Pontryagin's maximum principle indicates that for shortest time paths with the 3D, 4D, and 5D models, the steering control may be either straight or at the extremes ($|k|=k_{max}$ or $k=0$ or $|y|=\gamma_{max}$), and the velocity control may be at the extremes ($|v|=v_{max}$ or $|a|=a_{max}$). A vehicle constrained to only these controls may be referred to as an extremal vehicle, with an extremal vehicle corresponding to each of the 3D, 4D, and 5D models.

The Reeds-Shepp 3D model is extremal longitudinally through $|v|=v_{max}$, but not laterally for the steering. Without transition/switching costs, shortest time paths may be the same as shortest distance paths. When the models are restricted to only go forward, the Dubins 3D model may be used as a longitudinally extremal version of a forward-only 3D model. A longitudinally extremal version of a 4D model may be provided without a curvature limit. A 5D model may be provided with bounds on curvature rate of change and velocity rate of change, which may not be provided for the 3D model. Thus, the cost Function of the 3D Extremal vehicle may be augmented with transition costs that model the time spent turning the steering wheel and accelerating/decelerating and changing gear.

As described herein, a 5D model generalization may include the acceleration a as an additional state variable and use a 2D array of 3D volumes to organize memory and/or computation. The maneuver kernels described herein with respect to the 3D and 4D approaches may still apply where the velocity is maximal (e.g., the first and last row of volumes). Further, the volumes may still represent the value function of the transition state, but transition edges may not be needed to model stopping. In at least one embodiment, transition edges may be used only to apply mild transition penalties as appropriate to prevent excessive switching between maneuver types. Edges may be used to represent curves for which $$|v| < v_{max} \text{ and } a = 0 \text{ and } v = 0 \text{ and } |\gamma| = \gamma_{max}, \tag{1}$$

$$|a| = a_{max} \text{ and } |k| = k_{max} \text{ and } \gamma = 0, \tag{2}$$

$$|a| = a_{max} \text{ and } k = 0 \text{ and } \gamma = 0, \text{ and } |a| = a_{max} \text{ and } |\gamma| = \gamma_{max}, \tag{3}$$

inserted into $\dot{X}=f(X, u)=(v\cos\theta, v\sin\theta, vk, \gamma, a)$.

For Equation (1), only curvature may be changing. For Equations (2) and (3), constant steering may be used while following the same spatial curves as the 3D approach, but with acceleration, which can be handled with similar kernels as the 3D approach but moving along v when appropriate. For Equation (4), a start at $X=(x_0, y_0, \theta_0, k_0, v_0)$ may be assumed, where $k_0=0$.

Vehicle dynamics may be defined according to:

$$\psi(t, v_0) = v_0\gamma t^2/2 + \gamma a t^3/3,$$

$$\phi_s(t, \theta_0, v_0) = \int_0^t (v_0 + at)\sin(\theta_0 + \psi(t, v_0))\,d\tau, \text{ and}$$

$$\phi_c(t, \theta_0, v_0) = \int_0^t (v_0 + at)\cos(\theta_0 + \psi(t, v_0))\,d\tau.$$

The solution maneuver curves for Equation (4) may be $(x_0+\phi_c(t, \theta_0, v_0), y_0+\phi_s(t, \theta_0, v_0), \theta_0+\psi(t, v_0), \gamma t, v_0+at)$. Integer versions may be defined according to:

$$A(t) = \text{round}(at),$$

$$\Psi(t, v_0) = \text{round}(\psi(t, v_0)),$$

$$\Phi_s(t, \theta_0, v_0) = \text{round}(\phi_s(t, \theta_0, v_0)), \text{ and}$$

$$\Phi_c(t, \theta_0, v_0) = \text{round}(\phi_c(t, \theta_0, v_0)).$$

The reachability manager 122 may use an integer grid of $(x_0, y_0, \theta_0, v_0)$ as thread-indices, and sweep the curves parameterized by the curvature k, across the array of volumes. Then $t=k/\gamma$ and the threads may map bijectively to each volume via the mapping:

$$(x_0, y_0, \theta_0, v_0, k) \to$$

$$(x_0 + \Phi_c(k/\gamma, \theta_0, v_0),$$

$$y_0 + \Phi_s(k/\gamma, \theta_0, v_0),$$

-continued $$\theta_0 + \Psi(k/\gamma, v_0),$$

$$k, \text{ and}$$

$$v_0 + A(k/\gamma)),$$

which may be considered modulo the spatial, angular, and velocity dimensions similar to the 3D approach. The mapping may be an approximation (by rounding) to the continuum solution and map integer vectors to integer vectors. The mapping may be bijective having an inverse $(x, y, \theta, k, v) \rightarrow (x_0 - \Phi_c(k/\gamma, \theta_0, v_0), y_0 - \Phi_s(k/\gamma, \theta_0, v_0), \theta_0, k, v_0)$, where $v_0 = v - A(k/\gamma)$ and $\theta_0 = \theta - \Psi(k/\gamma, v_0)$.

If memory access is performed, it can be implemented efficiently because for a given k, the $v_0$-volumes may be permuted by all being shifted by the same amount $A(k/\gamma)$ modulo the velocity dimension and then within a $(k, v_0)$ volume, the $\theta_0$-planes may be permuted by all being shifted by the same amount $\Psi(k/\gamma, v_0)$ modulo the angular dimension, and within a $(\theta_0, k, v_0)$-plane, grid cells may be shifted in a translation-invariant manner by a constant translation $(\Phi_c(k/\gamma, \theta_0, v_0), \Phi_s(k/\gamma, \theta_0, v_0))$.

Figure 20:
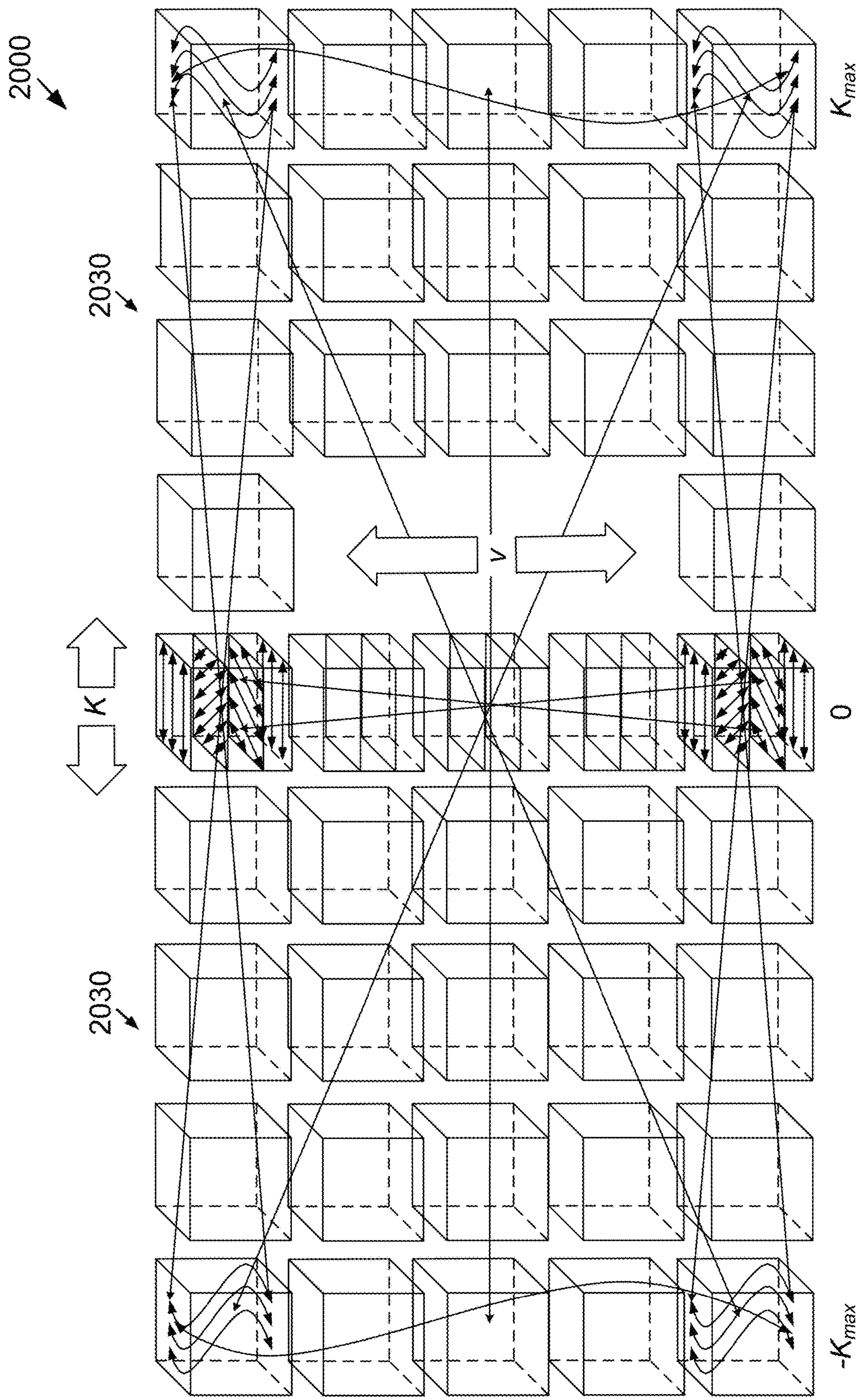
FIG. 20 illustrates an example visualization of volumes and edges of a graph corresponding to a configuration space that is parameterized using curvature and velocity, in accordance with some embodiments of the present disclosure.

Referring now to FIG. 20, FIG. 20 illustrates an example visualization 2000 of volumes and edges of a graph corresponding to a configuration space that is parameterized using curvature and velocity, in accordance with some embodiments of the present disclosure. As indicated in FIG. 20, volumes 2030 may be organized as a 2D array of volumes indexed according to the curvature k and velocity v. In at least one embodiment, the visualization 2000 may correspond to a memory organization for the volumes corresponding to different curvatures and velocities.

In at least one embodiment, the grid may be parameterized in terms of k, for which a resolution may be chosen to avoid jumps in $(x, y, \theta)$. This may provide freedom to choose the velocity resolution $N_v$. For example, a smaller resolution of $N_v=8$ may be chosen and with $v_{max}=6.7$ m/s and $a_{max}=5$ m/s$^2$, and the time to accelerate/brake may be around 1.34 s.

Figure 21:
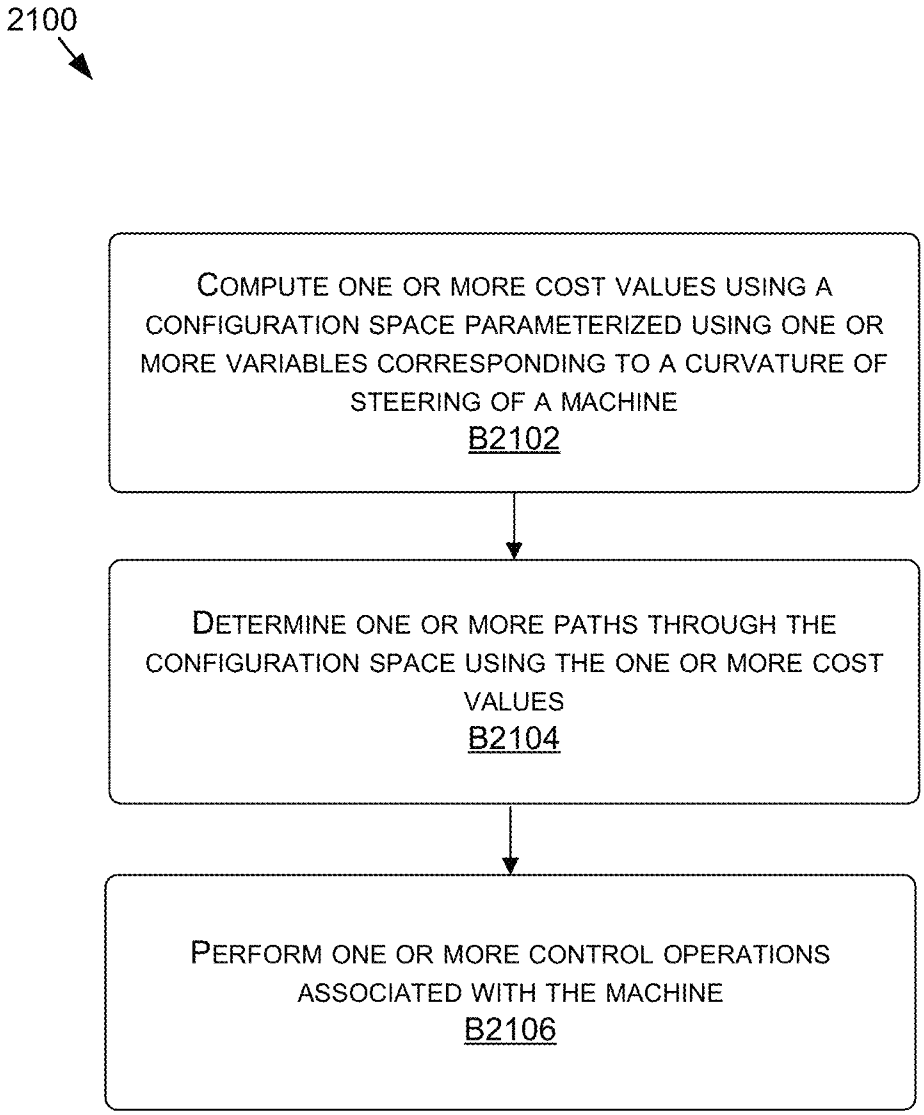
FIG. 21 is a flow diagram showing a method for determining paths through a configuration space parameterized using steering curvature, in accordance with some embodiments of the present disclosure.

Referring now to FIG. 21, FIG. 21 is a flow diagram showing a method 2100 for determining paths through a configuration space parameterized using steering curvature, in accordance with some embodiments of the present disclosure. The method 2100, at block B2102 includes computing one or more cost values using a configuration space parameterized using one or more variables corresponding to a curvature of steering of a machine. For example, the reachability manager 122 may compute one or more cost values for the machine 2600 to traverse configurations of the configuration space 112 using one or more maneuvers, where the configuration space 112 is parameterized using one or more first variables corresponding to a pose of the machine 2600 and one or more second variables corresponding to a curvature of steering of the machine 2600.

At block B2102, the method 2100 includes determining one or more paths through the configuration space using the one or more cost values. For example, the path evaluator 130 may determine one or more paths through the configuration space using the one or more cost values.

At block B2102, the method 2100 includes performing one or more control operations associated with the machine. For example, the control component(s) 2350 may perform, based at least on the one or more paths, one or more control operations associated with the machine.

Figure 22:
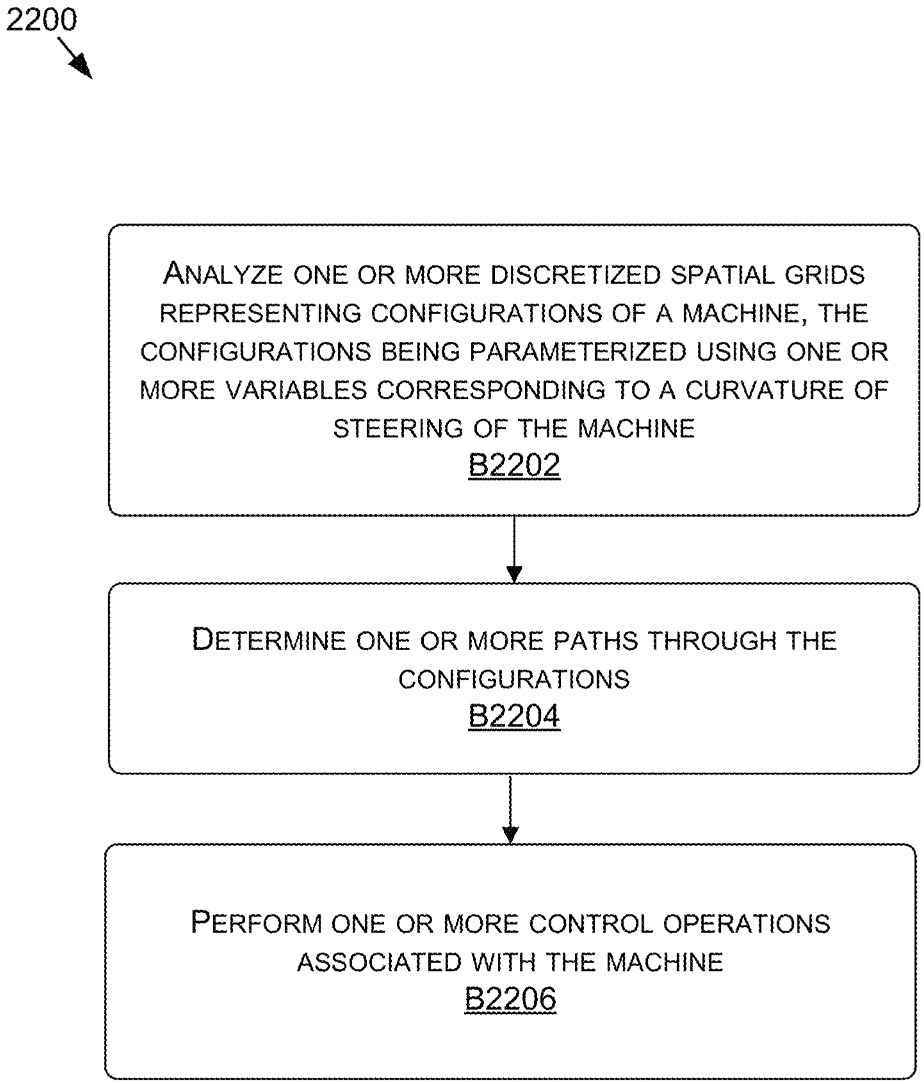
FIG. 22 is a flow diagram showing a method for determining paths through configurations parameterized using steering curvature using a discretized spatial grid, in accordance with some embodiments of the present disclosure.

Referring now to FIG. 22, FIG. 22 is a flow diagram showing a method 2200 for determining paths through configurations parameterized using steering curvature using a discretized spatial grid, in accordance with some embodiments of the present disclosure. The method 2200, at block B2202 includes analyzing one or more discretized spatial grids representing configurations of a machine, the configurations being parameterized using one or more variables corresponding to a curvature of steering of the machine. For example, the reachability manager 122 may analyze one or more discretized spatial grids representing configurations of the machine 2600 to model the machine 2600 traversing the configurations using one or more maneuvers, where the configurations are parameterized using one or more variables corresponding to a curvature of steering of the machine 2600.

At block B2202, the method 2200 includes determining one or more paths through the configurations. For example, the path evaluator 130 may, based at least on the analyzing, determine one or more paths through the configurations.

At block B2202, the method 2200 includes performing one or more control operations associated with the machine. For example, the control component(s) 2350 may perform, based at least on the one or more paths, one or more control operations associated with the machine.

ADDITIONAL EXAMPLES

Figure 23:
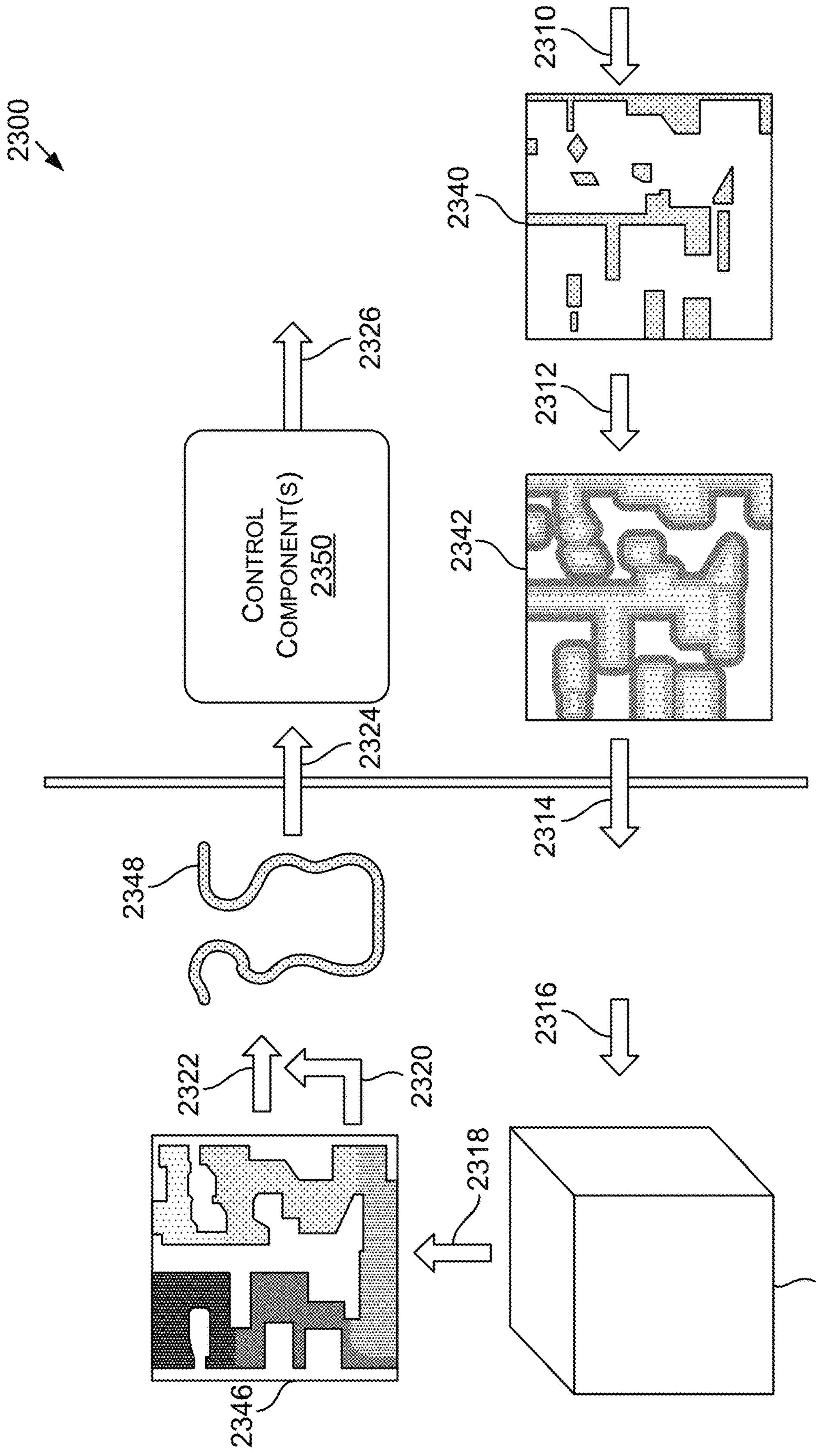
FIG. 23 illustrates an example process which may be used to determine one or more paths through a configuration space, in accordance with some embodiments of the present disclosure.

Referring now to FIG. 23, FIG. 23 illustrates an example process 2300 which may be used to determine one or more paths through a configuration space, in accordance with some embodiments of the present disclosure.

The process 2300, at 2310, may include receiving an indication of one or more locations of one or more obstacles in an environment. For example, the path planner 110 may receive an obstacle image(s) 2340 indicating one or more locations of one or more obstacles in the environment. In at least one embodiment, the obstacle image(s) 2340 includes a hard and/or binary obstacle image. For example, pixels of the image(s) may correspond to locations in the environment, one or more first values for a pixel may indicate an obstacle is present at the corresponding location(s), and one or more second values for a pixel may indicate an obstacle is not present at the corresponding location(s).

In embodiments where the obstacle image(s) 2340 includes a hard or binary obstacle image (or more generally location associated values), at 2312, the hard indication of one or more locations of one or more obstacles in an environment may be used to determine a soft indication of one or more locations of one or more obstacles in an environment. For example, the path planner 110 may transform the obstacle image(s) 2340 into one or more soft obstacle images 2342. In at least one embodiment, the transformation may include distance transforming the obstacle image (s) 2340 to compute a new obstacle image(s) 2342 that encodes the pixel values as a function of distance.

In embodiments where one or more parallel process units (PPUs), such as one or more GPUs, are used to evaluate the configuration space, 2312 and 2310 may be performed using one or more CPUs. At 2314, the CPU(s) may transfer the indication of one or more locations of one or more obstacles in the environment (e.g., the obstacle image(s) 2342) to the PPU(s). At 2316, the indication of one or more locations of one or more obstacles in the environment (e.g., the obstacle image(s) 2342) is used (e.g., by the PPU(s)) to render the obstacle location(s) into one or more configuration space volumes 2344. For example, values corresponding to the obstacle location(s) indicated by the obstacle image(s) 2342 may be determined and stored in one or more corresponding locations of the configuration space volume(s) 2344.

At 2318, the configuration space volume(s) 2344 may be used (e.g., by the PPU(s)) to search for one or more paths through a corresponding configuration space 2346. As an example, using a parallel processing approach, such as a kernel-style processing approach described herein, a graph corresponding to the configuration space 2346 may be processed based at least on cycling through maneuver kernels for any number of cycles (e.g., a fixed number of cycles, such as eight cycles). At 2320, the processed graph may be used to perform a goal search to determine one or more goal vertices in the graph for one or more through in the configuration space. At 2322, the path planner 110 may back-track through the processed graph from the one or more goal vertices to extract one or more paths or plans 2348. In the process 2300 of FIGS. 23, 2318, 2320, and 2322 may vary for different forms of graph search, such as for non-parallel or serial approaches.

At 2324, the path(s) or plan(s) 2348 may be provided to a control component(s) 2350 of the vehicle 2600. In embodiments where the process 2300 is performed using a PPU(s), at 2324, the process 2300 may include transferring the path(s) or plan(s) 2348 to the CPU(s). At 2326, the control component(s) 2350 may use the path(s) or plan(s) 2348 to perform one or more control operations for the vehicle 2600. For example, the control component(s) 2350 may control the vehicle 2600 to traverse the environment using the path(s) or plan(s) 2348 (e.g., to follow the path, to generate or select one or more trajectories based on the path, etc.).

Obstacle Rendering

In embodiments that include obstacle rendering, the obstacle rendering may be used (e.g., by the freespace manager 120) to determine, for example, the occupancy space of FIG. 4. Various approaches may be used for obstacle representation over spatial position and orientation. For example, in at least one embodiment, the freespace manager 120 may use any method to assign costs or values to edges of the graph. Non-limiting examples of suitable approaches are described herein. In at least one embodiment, the freespace manager 120 calculates an obstacle volume (e.g., the one or more configuration space volumes 2344) of floating-point numbers, which may be thought of as the reciprocal of the highest velocity for the vehicle 2600 possible at each position and orientation. The obstacle volume may be multiplied with the spatial length of each edge leaving a corresponding vertex, to result in a time to traverse that edge.

The multiplication may, for example, be performed on-the-fly such that one or more edges (e.g., maneuver edges) need not be explicitly stored or represented in memory. The obstacle volume may be rendered from an obstacle image(s), such as the obstacle image(s) 2342, which may store the reciprocals of the highest velocity possible at original world locations (x, y). The rendering may test a shape(s) of the vehicle 2600 against the obstacle image and handles any additional area and orientation related penalties. Any suitable shape may be used to represent the vehicle 2600, such as a bounding shape (e.g., a bounding box). In at least one embodiment, the obstacle input may be widened or dilated by the length and/or width of the shape of the vehicle 2600 in different directions in different e-planes. The widening may be performed separably (e.g., one pass for width and one pass for length). The signal may be maximum-filtered using only three comparisons per input, regardless of the filter width. The signal may additionally or alternatively be average-filtered using only two operations per input, regardless of the filter width by using an integral image (e.g., a summed-area table).

Where an obstacle image is binary, with only hard obstacle costs, such as for the obstacle image 2340, obstacle rendering may be accelerated using bit-vectors. For example, for a bit-vector width of 32, as many as 32 grid cells may be handled in a single bit-vector, with 32 times less memory use while allowing one thread to do the work of 32. Further, if the cost function is simplified to the number of maneuvers, the graph may be processed even faster, which may hinder the ability to favor shorter maneuvers or to use soft obstacle costs. In this approach, the graph edge weights may be zero for maneuver edges (or infinite where there are obstacles) and one may be used for transition edges. Using this approach, the value of a vertex during maneuver processing may be represented using a single bit. For example, a bit value of 0 may indicate the vertex can be reached in m maneuvers or less. Where sequential threads are already aligned along the x-axis, one bit-vector may represent 32 vertices and one thread may perform the work of 32 threads in approaches that do not employ bit-vectors.

When processing cycles using bit-vectors and the star graph 600B, as an example, the maneuver kernels may read from the previous volume (e.g., at m maneuvers) of the transition vertices of the star graph 600B and produce the reachability bits of one of the volumes of maneuver vertices (e.g., at m maneuvers plus that maneuver). The reachability bits may then be combined using a logical AND into the reachability bits of the transition vertices (e.g., at m+1 maneuvers). During processing of one maneuver, the reachability bits may propagate along the maneuver curves until stopped by an obstacle. Reachability may be turned off when there is an obstacle, and turned on when there is reachability from the previous maneuver cycle. With bit-vectors, the minimum operations may become logical AND with one of the addition operations becoming logical OR, simplifying the pseudocode 1530 from FIG. 15 to:

```
for (v=~0, i=0, i<N; i++) {
v&        =Vi[i];        //Read value from volume
Vo[i]     =v;            //Store back best value
v|        =B[i];}        //Update value
}
```

where the variables v, Vi, Vo, and B may now be bit-vectors.

As an example, a warp (or basic unit of parallel processing) of 32 threads each handling 32 maneuver curves simultaneously as a bit vector may handles 32×32=1024 maneuvers in parallel. Rather than reading or writing misaligned, a shuffle-instruction communicating between threads of a warp can be used, making one warp handle an entire row of the volume as a large bit-vector, while reading and writing aligned memory. When proceeding through $N_T$ maneuver cycles, the output reachability bit volumes may be maintained to support back-tracking. Only $N_T$ bits per vertex may be required in the configuration space, which for $N_T$=8 may require a quarter of memory usage compared to a non-bit vector approach.

Bit-vectors may be used to implement hard obstacle costs, for example, where a cost on an edge may be so high that the cost completely forbids using that edge, effectively removing that edge from potential paths. Soft obstacle costs may be used to provide a finite cost to an edge that results in a lower likelihood for the vehicle 2600 to use that edge (e.g., indicates using that edge is slower or more costly). It may be more difficult to guarantee safety of a planned path when using soft costs. However, if only hard costs are used, it may be difficult to both achieve sufficient margin from an obstacle and at the same time allow paths where the vehicle 2600 gets close to the obstacle when necessary, such as when inching into a parking space or slowly pushing through a narrow section.

To address these potential issues, a maximum velocity may be set that allows a correspondence between time and distance. Additionally, the maximum speed may be modulated by how close the vehicle 2600 is to obstacles or cause the vehicle 2600 to stay further away from obstacles when the vehicle 2600 is traveling fast. For example, it may be required that the closest distance to any obstacle is at least the stopping distance of the vehicle 2600 plus what can be traveled in a reaction time. In any case, the reciprocal of the maximum velocity at a spatial point may be some function of the distance to the nearest obstacle. The reciprocal of the maximum velocity at a spatial point can be efficiently computed from a binary obstacle image using a distance transform, in linear time with the number of pixels or in parallel. Using the reciprocal of the maximum velocity at a spatial point may force slower travel near obstacles, result in a more realistic model of time spent, and incentivize staying away from obstacles if possible. Otherwise, optimal paths may typically lean up exactly against obstacle boundaries.

In one or more embodiments, all of the variables r, F, Ri, Ro may be processed as bit vectors. For example, if the variables are declared as 32 bit unsigned integers, 32 bits and therefore 32 parallel trajectories may be processed in parallel as bit vectors. The processing may not include any conditional processing or branches—just a logical AND operation to stop propagation when freespace stops and a logical OR operation to start or restart propagation when reachability from the previous iteration is indicated in the input. In addition, the processing of this core loop may flow in parallel and exact synchronization between many threads, each responsible for one trajectory, so that the threads are effectively performing large vector operations in synchronization.

Configuration Space Translation Suitable for Parallel Processing

In at least one embodiment, in order to process trajectories in parallel so as to determine reachability of the poses therein, the reachability evaluator 148 may analyze disjoint trajectories within the configuration space 112, allowing for independent processing. In accordance with disclosed embodiments, the disjoint trajectories may comprise a set of trajectories of a common trajectory or turn type (e.g., turn radius and direction). For example, for each maneuver and/or maneuver type, the configuration space 112 may include a disjoint union of the discretized maneuver curves. In processing the trajectories or sections thereof (e.g., each by a respective thread), the pose translator 146 of the reachability manager 122 may be configured to determine shifted poses of the configuration space 112 based at least on translating the poses of the configuration space 112 along at least one axis of the configuration space 112 to determine the shifted poses of the disjoint trajectories. The disjoint trajectories (or sections thereof) may be evaluated using parallel processing (e.g., by a respective thread), allowing for the reachability evaluator 148 to rapidly evaluate the reachability of the shifted poses.

In at least one embodiment, while progressing through a turn type, the vehicle traces through the trajectory of poses in the configuration space 112, which may be defined using Equation (5):

$$P(\theta) = (x_0 + qR\sin\theta,\ y_0 + qR(\cos\theta - 1),\ \theta), \tag{5}$$

parameterized by θ, where R is the turn radius, q is the turn direction (e.g., +1 for right when going forward or −1 for left when going forward), and $(x_0, y_0)$ is the position when 0 is zero. In at least one embodiment, $$R = k_{max}^{-1}$$

is the minimum turn radius.

Figure 24A:
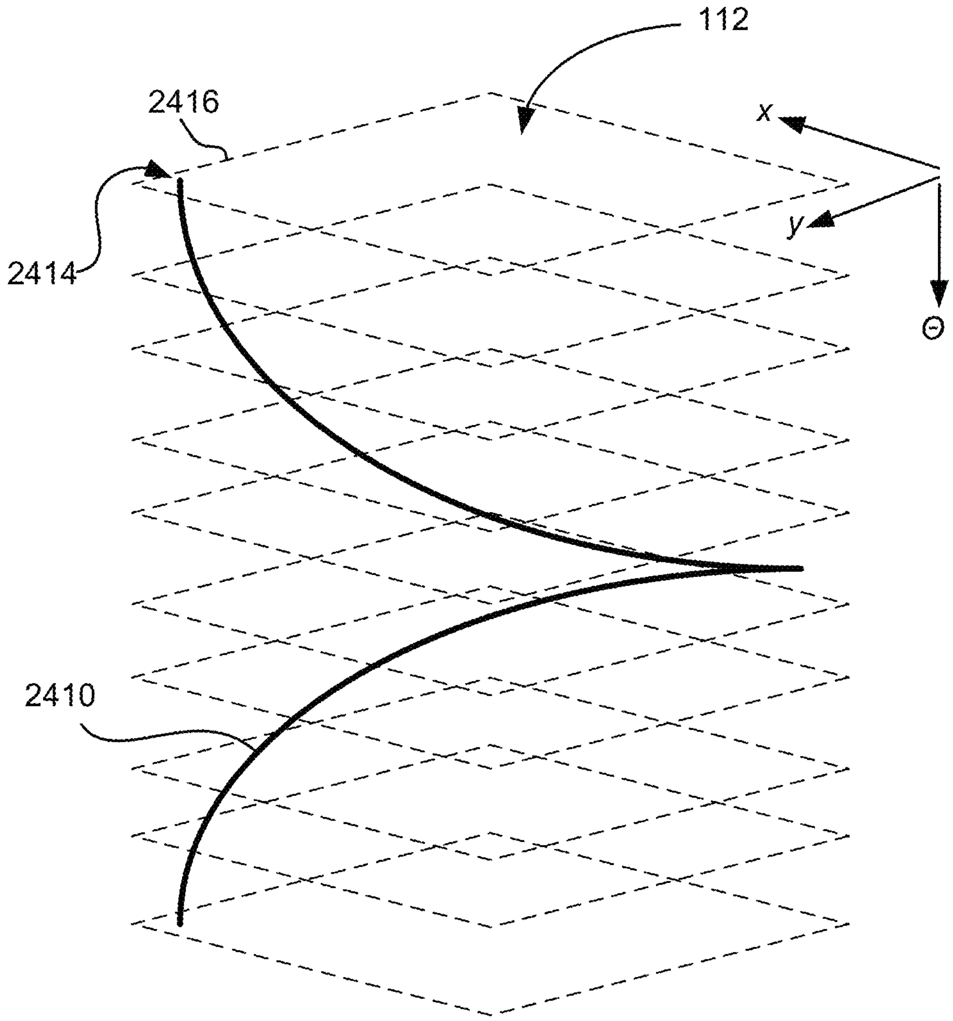
FIG. 24A illustrates an example of a corkscrew of a turn laid out in a configuration space, in accordance with some embodiments of the present disclosure.
Figure 24B:
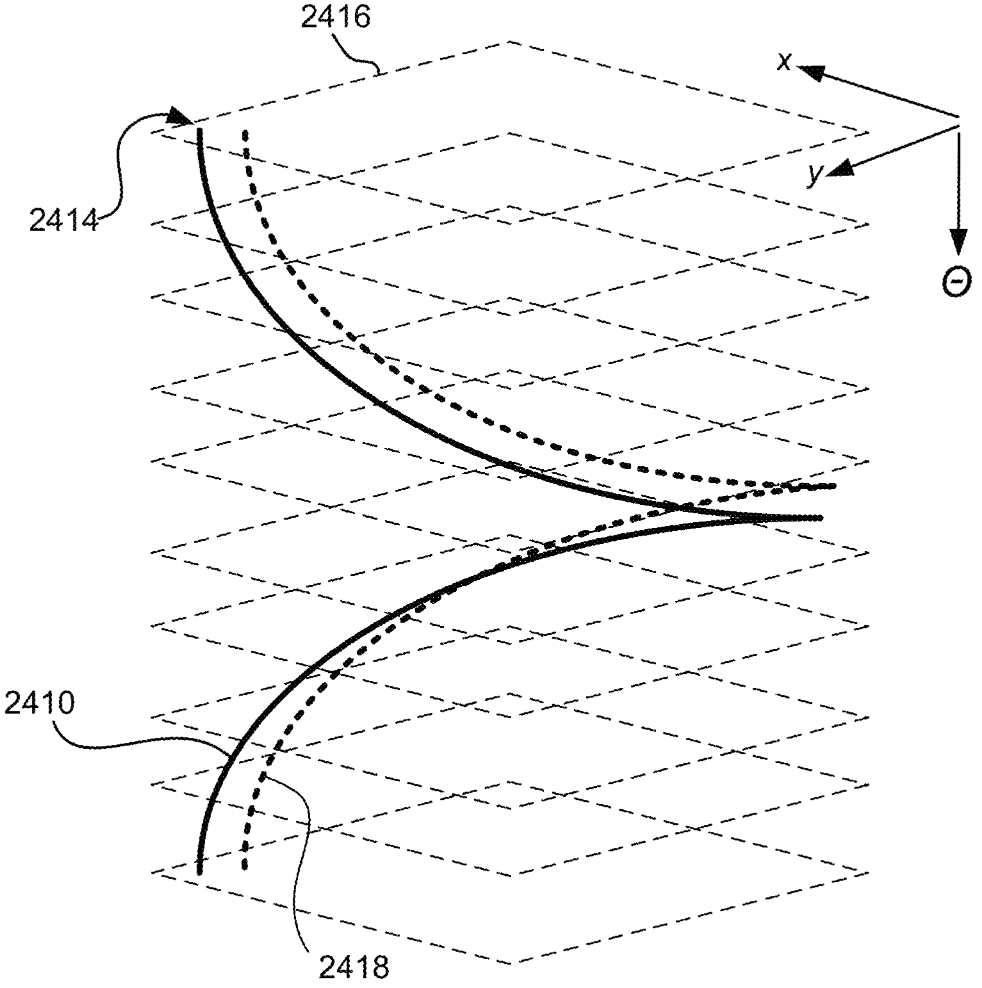
FIG. 24B illustrates an example of the corkscrew of the turn of FIG. 6A along with a corkscrew of another turn that is a translated copy of the turn laid out in the configuration space, in accordance with some embodiments of the present disclosure.

FIGS. 24A-24B are used to describe examples of approaches that may be used by the pose translator 146 to translate the poses of the configuration space 112. Referring now to FIG. 24A, FIG. 24A illustrates an example of a corkscrew of a turn 2410 laid out in the configuration space 112, in accordance with some embodiments of the present disclosure. As shown, the turn 2410 may conceptually map to a corkscrew in the configuration space 112 by tracing through the trajectory of poses defined by Equation (5). That is, as a turn progresses through the space (e.g., tracing the poses defined by the Equation (5)), the turn may progress from current (x, y) coordinates to the next (x, y) coordinates, while also progressing along the θ-axis through θ planes, such as θ plane 2416. In other words, all of the x, y, and θ coordinates may be changing throughout the turn in the corkscrew manner indicated in FIG. 24A.

In the configuration space 112, each turn having the same turn radius and initial orientation (the same turn type) may be a translated copy of each other turn, but with a different starting point (x, y), stemming from the fact that the vehicle may behave the same way regardless of where it is initially positioned. For example, FIG. 24A illustrates the turn 2410 associated with a fixed turn radius and starting at (x, y) coordinates 2414 in θ plane 2416. Each of the other turns having the same turn radius—but starting at different (x, y) coordinates in θ plane 2416—may be a translated copy of the turn 2410 in the configuration space 112. For example, referring to FIG. 24B, FIG. 24B illustrates an example of a corkscrew of the turn 2410 of FIG. 24A along with a corkscrew of a turn 2412 that is a translated copy of the turn 2418 laid out in the configuration space 112, in accordance with some embodiments of the present disclosure. The turns having the same turn radius may have translative parallelism, which may be exploited for parallel processing using the pose translator 146. While turns are described, other types of trajectories and/or sections thereof may also have translative parallelism, which may similarly be exploited for parallel processing as described herein.

In at least one embodiment, the pose translator 146 may translatively shift the poses of the configuration space 112 along at least one axis (e.g., the θ-axis) and the reachability evaluator 148 may process each of the poses along the at least one axis in parallel to assess reachability (e.g., with one thread per turn, or section thereof). For example, the parallelism of turn types may be exposed by the pose translator 146 performing a translative shift that makes the set of corkscrews in the configuration space 112 that correspond to the same turn radius a bundle of parallel lines along the θ-axis. The parallel lines may be proceed through the configuration space 112 in parallel as disjoint trajectories, allowing for independent processing thereof.

In at least one embodiment, for a given turn radius R, and direction q (a turn type), the pose translator 146 may perform a non-negative translative shift defined by Equation (6):

$$a(\theta)=(a_x(\theta),\, a_y(\theta))=R(q\sin\theta,\, -q\cos\theta) \tag{6}$$

as a function of θ and apply the transformation (e.g., using a warp) defined by Equation (7):

$$(x, y, 0)\rightarrow(x-a_x(\theta),\, y-a_y(\theta),\, \theta) \tag{7}$$

to the configuration space 112. This may amount to a translative shift of each constant θ plane of the configuration space 112 volume. The inverse translation may correspond to Equation (8):

$$(x', y', \theta)\rightarrow(x'+a_x(\theta),\, y'+a_y(\theta),\, \theta). \tag{8}$$

Figure 24C:
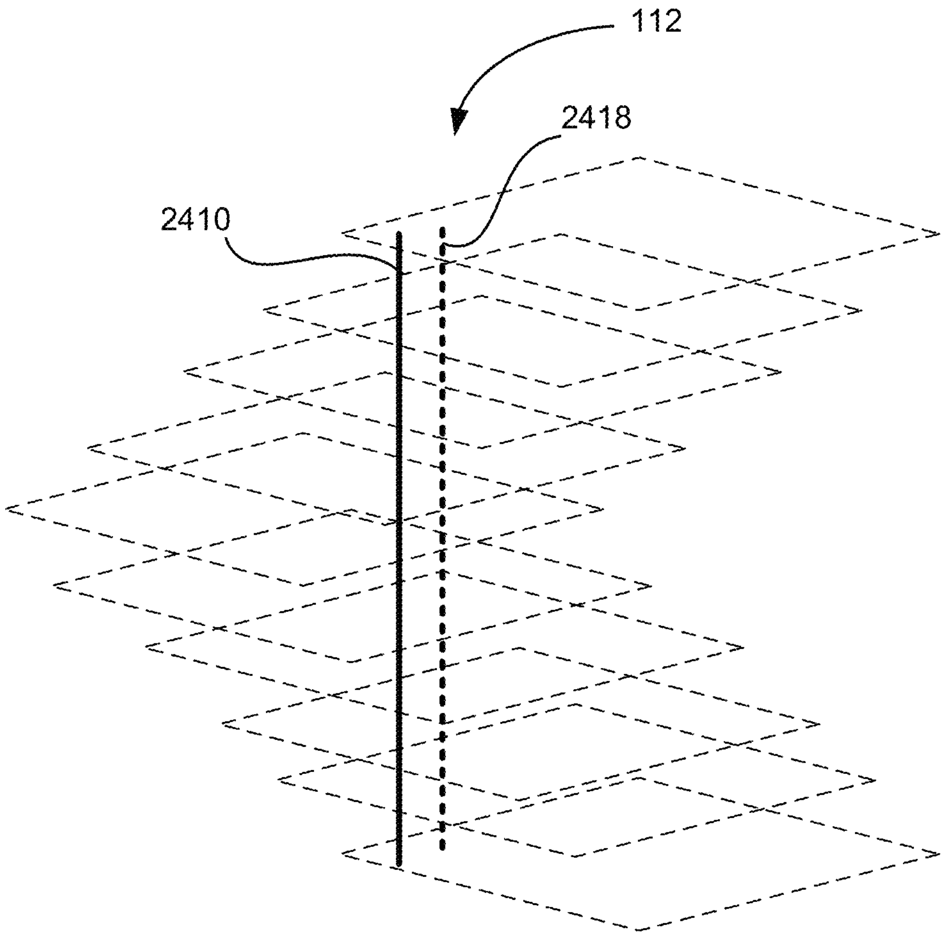
FIG. 24C illustrates an example of shifted trajectories formed by translating the corkscrews of FIG. 24B, in accordance with some embodiments of the present disclosure.

The transformed version of the turn trajectories of a turn type may be defined by Equation (9):

$$X'(\theta)=(x_0,\, y_0+qR,\, \theta), \tag{9}$$

which is a set of lines parallel to each other and to the θ-axis. For example, referring to FIG. 24C, FIG. 24C illustrates an example of shifted trajectories formed by translating the corkscrews of FIG. 24B, in accordance with some embodiments of the present disclosure. In particular, FIG. 24C conceptually illustrates the configuration space 112 along with the turns 2410 and 2418 as translated or shifted by the pose translator 146. As shown, the turns 2410 and 2418 (e.g., having the same turn radius and direction) are now parallel lines along the θ-axis and may be processed as such. This transformation may be possible because the trajectories are translation invariant with respect to translation along x and y in the sense that the operations of following the turn curve and translating commute. The trajectories of the turn type may be considered translated copies of each other and have the same shape regardless of the starting point ($x_0$, $y_0$) coordinates. The parallelism along the θ-axis contributes to the massive parallelism of the path planner 110 in a way that is suitable for a modern parallel processor. Optionally the data may be transposed to switch the θ-axis and the x-axis so that the trajectories are always parallel to the x-axis (or θ-axis).

In one or more embodiments, the pose translator 146 may transform the configuration space 112 (e.g., virtually by access pattern or actually by copying data around) for each turn type (e.g., same radius and direction) so that the turn curves of that turn type form the parallel lines. The reachability evaluator 148 and/or other system components may then process through each of the lines in parallel. The processing may run parallel to the θ-axis along each of the parallel lines as selected by ($x_0$, $y_0$) while accessing the original configuration space according to Equation (10):

$$(x_0+a_x(\theta),\, y_0+a_y(\theta),\, \theta), \tag{10}$$

which may be given by the inverse of the transformation defined above. This transformation may be easily invertible, and therefore bijective. It may be desirable for this bijective property to persist when using a discretized implementation of the transformation. For example, by having a bijective transformation, complete parallel separation may be maintained between the threads processing individual trajectories (or sections thereof), without having to resort to atomic operations or worrying about read or write race conditions. This may also enhance the ability for each cell in the discretized configuration space to be tended to by one of the threads in processing a turn type. The bijective property may be achieved, for example, by quantizing t(θ) the same way within each constant θ plane. The transformation of the configuration space 112 performed by the pose translator 246 may then be a translative shift of each constant θ plane, regarded as an image, by an integer number of pixels. This may be ideally suited for parallel implementations as the shifted memory access may be done on-the-fly while doing the processing, thereby reducing memory access which may be a limiting factor. In addition, the difference in translative shifts in successive planes may be reduced (e.g., to not differ by more than one pixel or some other threshold value) to avoid large jumps along the discretized trajectory processing. This may be achieved by having sufficient angular resolution of the configuration space 112.

Figure 25:
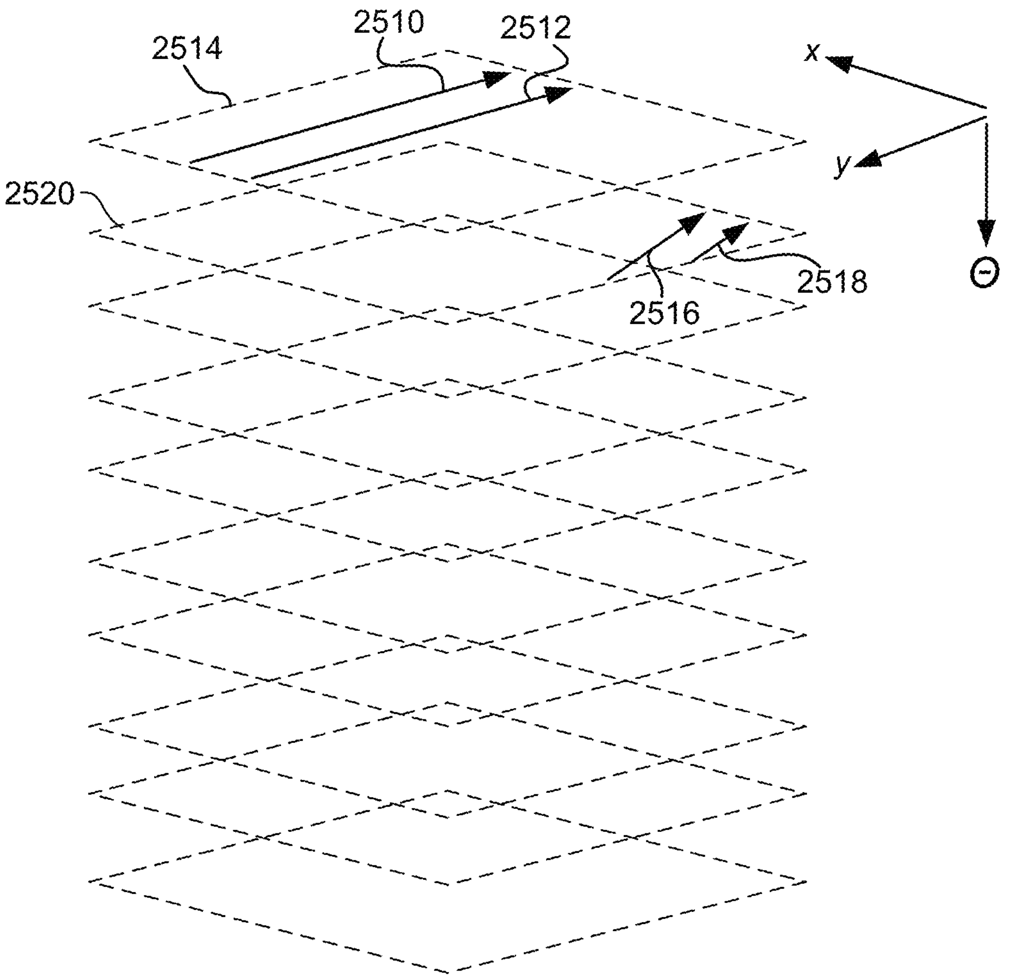
FIG. 25 is an illustration of how straight driving paths may conceptually map to a configuration space, in accordance with some embodiments of the present disclosure.

When assessing reachability, the path planner 110 may evaluate curved turns, as well as straight maneuvering (e.g., turns having an infinite turn radius). When traversing through a trajectory of poses along a straight path, the poses may be defined using Equation (11):

$$X(u)=(x_0+u\cos\theta,\, y_0+u\sin\theta,\, \theta), \tag{11}$$

parameterized by u, where θ is the constant heading angle and ($x_0$, $y_0$) is the starting position when u is zero. In the configuration space 112, the trajectories may be represented as lines at angle θ in each θ plane. For example, FIG. 25 illustrates trajectories 2510 and 2512 starting at respective (x, y) coordinates and both oriented according to the θ associated with a θ plane 2514. In addition, FIG. 25 illustrates trajectories 2516 and 2518, which start at respective (x, y) and are both oriented according to a different θ associated with a θ plane 2520.

A transformation (e.g., by the pose translator 146) of the straight case into parallel lines aligned with one of the coordinate axes may be accomplished in various manners. For example, in at least one embodiment, each θ plane could be rotated by the angle −θ, and as a continuous transformation, this approach is bijective. For example, warps of work may be defined where each warp is to rotate each constant θ plane independently around its center by the angle −θ so that all straight lines driven line up parallel to the x-axis. This approach may be efficient in a GPU because the warps are of each constant θ plane that is an image rotation which may be accomplished using interpolation method 'nearest' (e.g., to preserve the integrity of the integers in the space that is warped). The rotation may rotate some corners outside the original space, which may be accounted for by using a padded version of the space. All cells that are outside of the original space may be treated as never reachable and disallowed as if by obstacles or high cost.

A discretized image rotation may not easily preserve a bijective transformation property, although a bijective image rotation may be achieved by three shearing coordinate transformations. In an alternative aspect, a single shearing transformation may be applied per θ plane, which may produce less discretization noise and may provide the ability to perform the transformation on-the-fly while processing via simple translative shifts of the memory access vector operations.

By way of example, when the direction of the lines is closer to the x-axis direction than the y-axis direction ($|\tan\theta|\leq 1$) or some other threshold value, the pose translator 146 may shear the trajectories to become parallel with the x-axis, and otherwise with the y-axis. In the former case (e.g., closer to the x-axis), the pose translator 146 may set $x_0=0$, and in the latter (e.g., closer to the y-axis), the pose translator 146 may set $y_0=0$ and still consider all lines.

For the latter case, these operations may result in the trajectory family defined by Equation (12):

$$X(u)=\begin{cases}(u\cos\theta,\ y_0+u\sin\theta,\ \theta), & |\tan\theta|\leq 1\\ (x_0+u\cos\theta,\ u\sin\theta,\ \theta), & |\tan\theta|>1\end{cases}. \tag{12}$$

The bijective shearing transformation may be applied per θ plane, which may make all lines parallel to the y-axis. For the former case, these operations may result in the trajectory family defined by Equation (13):

$$(x,y,\theta)\rightarrow\begin{cases}(y-x\sin\theta/\cos\theta,\ x,\ \theta), & |\tan\theta|\leq 1\\ (x-y\cos\theta/\sin\theta,\ y,\ \theta), & |\tan\theta|>1\end{cases}. \tag{13}$$

After this transformation, the trajectories may take the form of Equation (14):

$$\begin{cases}X'(u)=(y_0,\ u\cos\theta,\ \theta), & |\tan\theta|\leq 1\\ X'(u)=(x_0,\ u\sin\theta,\ \theta), & |\tan\theta|>1'\end{cases} \tag{14}$$

which is a set of lines parallel with the x-axis. The inverse of the transformation may correspond to Equation (15):

$$(x',y',\theta)\rightarrow\begin{cases}(y',\ x'+y'\ \sin\theta/\cos\theta,\ \theta), & |\tan\theta|\leq 1\\ (x'+y'\ \cos\theta/\sin\theta,\ y',\ \theta), & |\tan\theta|>1\end{cases}, \tag{15}$$

and similar to the curved turn case, the reachability evaluator 148 may run the processing along these lines while accessing the original configuration space according to Equation (16):

$$\begin{cases}(x,\ y+x\tan\theta,\ \theta), & |\tan\theta|\leq 1\\ \left(x-y\tan\left(\theta+\frac{\pi}{2}\right),\ y,\ \theta\right), & |\tan\theta|>1'\end{cases} \tag{16}$$

which may be given by the inverse of the shearing transformation.

To achieve a bijective transformation of the straight case into parallel lines aligned with one of the coordinate axes, each θ plane could be rotated by the angle −θ. As a continuous transformation, this is bijective. However, a discretized image rotation may not easily preserve this property. While it is possible to perform a bijective image rotation by three shearing coordinate transformations, performing one shearing may be simpler.

Discretized Maneuver Curves

In at least one embodiment, the discretization of maneuvers may be carefully defined so that for one maneuver type the maneuvers do not overlap while covering the configuration space 112 exactly. The transformations of the configuration space 112 may be based at least on the maneuvers and/or maneuver types being translation-invariant with respect to translation along one or more axes. For example, the turn curves may be translation-invariant with respect to translation along x and y. That is, the corresponding maneuvers may be translated copies of each other and have the same shape regardless of the starting point. Similarly, the straight maneuver curves may be translation-invariant within a θ-plane. The bijective transformation and the parallel and covering disjoint union property may be preserved in the discretized version of the maneuvers. This may allow for all of the maneuvers to be available, unambiguous, and reversible at every vertex of the discretized graph, as in the continuum configuration space. Further, the parallelism exposed by this property may be suitable for a parallel processor.

In at least one embodiment, processing approaches described herein, may transform the configuration space 112 (e.g., virtually by memory access pattern) so that the PPU(s) can run threads (or inner for-loops in a CPU implementation) parallel to the θ or y-axis (or one or more other axes in other examples) along the parallel lines, as selected by (x', y') or (x', θ) per thread, while accessing the original configuration space using the discretized versions of the inverse transformations set forth in Equations (8) and (18). The invertible and bijective property of the transformation may provide for complete parallel separation between the threads processing individual maneuvers, without having to resort to atomic operations or worrying about read or write race conditions.

In at least one embodiment, the discretization of the configuration space 112 may be defined using the spatial and angular resolution in terms of numbers $N_x$, $N_y$, $N_\Theta$ of spatial and angular grid cells. The size of the spatial grid cells may be set to one and the minimum turning radius may be adapted accordingly. The discretized spatial grid may be indexed by integers $i,j\in\mathbb{Z}$ such that $0\leq i<N_x$, $0\leq j<N_y$. Similarly, the integer $\Theta\in\mathbb{Z}$ such that $0\leq\Theta<N_\Theta$ may represent the angle $\theta(\Theta)=2\pi\Theta/N_\Theta$.

In at least one embodiment, the configuration space 112 is cyclical along the θ-dimension (and curves wrap around). A technique may be used so that the spatial dimensions can also be treated as cyclical. For example, during obstacle rendering, the freespace manager 120 may insert a hard obstacle wall (e.g., a single cell wall) in each spatial dimension (at i=0 and j=0). All coordinate and memory accesses may then be considered modulo the size of the dimensions. Using this approach may allow the thread grid structure and maneuver curves to fit the memory volume exactly without padding, idle threads, wasted cycles or expensive special case conditional tests in the loops. Rather, the curves may simply wrap around modulo the dimensions as needed and all threads may perform the same amount of work.

For simplicity, the spatial grid may be assumed to be a square ($N_x=N_y$). For efficiency, all dimensions may be made a power of two so that the modulo (%) operation, which is often expensive and may require Euclid's algorithm, can be carried out by an ultra-fast bit-mask operation. For example, if $N_x$ is a power of two, then the mask $M_x=N_x-1$ can be defined and then i % $N_x$=i&$M_x$.

To derive a discretized version of turn maneuver curves, integer coordinates x', y'$\in \mathbb{Z}$ may be used such that $0 \le x' < N_x$, $0 \le y' < N_y$ in the transformed space to identify a thread. Within each thread, the integer $\Theta \in \mathbb{Z}$ may be used such that $0 \le \Theta < N_\theta$ to sweep along the curve. The inverse transformation of Equation (8) to the configuration space 112 may provide for Equation (17)

$$(x', y', \Theta) \rightarrow \left(x' + qR\sin\frac{2\pi\Theta}{N_\theta},\ y' - qR\cos\frac{2\pi\Theta}{N_\theta},\ \frac{2\pi\Theta}{N_\theta}\right). \tag{17}$$

Equation (17) may provide vector coordinates at exact turn curve points. However, the vector coordinates may not fall exactly at integer locations, so they can be rounded. A straightforward approach to rounding the maneuver coordinates may introduce rounding error into the discretized configuration space. In at least one embodiment, a more advanced rounding approach may be used to reduce the rounding error. For example, for circular turns the rounding error may be reduced to ¼ instead of ½.

In at least one embodiment, the rounding may be performed using a custom rounding operation that rounds to the nearest integer or one or more fractions thereof. For example, the rounding operation $\zeta(x)=\text{round}(2x)/2$ may be configured to round to the nearest integer or half-integer. Let $\alpha(\Theta)=R\sin(\theta(\Theta))$ with four additional references $\alpha_{\mathbb{i}}(\Theta)=\alpha(\Theta+\mathbb{i}N_\theta/4)$, where $\mathbb{i} \in \{0,1,2,3\}$ and the integer lookup table $\beta(\Theta)=\lfloor\zeta(\alpha(\Theta))\rfloor$ with four additional pointer references $\beta_{\mathbb{i}}(\Theta)=\beta(\Theta+\mathbb{i}N_\theta/4)$. The parameter $\alpha(\Theta)$ is a scaled sinusoid, $\beta(\Theta)$ is a custom rounded and truncated version of the scaled sinusoid, and the lookups $\beta_0$, $\beta_1$, $\beta_2$, $\beta_3$ correspond to the sin, cos, −sin, −cos portions, respectively and analogously for α.

Accordingly, Equation (17) may be rewritten as Equation (18):

$$\begin{cases} (x' + \alpha_0(\Theta),\ y' + \alpha_3(\Theta),\ \theta(\Theta)),\ q = +1\ (LEFT\ ) \\ (x' + \alpha_2(\Theta),\ y' + \alpha_1(\Theta),\ \theta(\Theta)),\ q = -1\ (RIGHT) \end{cases}, \tag{18}$$

which may still define exact curves because $\alpha_i$ may be arbitrary real numbers. The rounding operation $\zeta(x)$ may be used to round the curves. The remaining truncation residual may be defined according to Equation (19):

$$\Psi(\Theta) = \zeta(\alpha(\Theta)) - \lfloor\zeta(\alpha(\Theta))\rfloor = \zeta(\alpha(\Theta)) - \beta(\Theta) \tag{19}$$

and its four additional references $\Psi_i(\Theta)=\Psi(\Theta+iN_\theta/4)$. Then, $\zeta(\alpha(\Theta))=\beta(\Theta)+\Psi(\Theta)$, and Equation (18) can be rounded to Equation (20):

$$\begin{cases} (x' + \beta_0(\Theta) + \Psi_0(\Theta),\ y' + \beta_3(\Theta) + \Psi_3(\Theta),\ \theta(\Theta)) \\ (x' + \beta_2(\Theta) + \Psi_2(\Theta),\ y' + \beta_1(\Theta) + \Psi_1(\Theta),\ \theta(\Theta)) \end{cases}, \tag{20}$$

while incurring at most a ¼ rounding error. Now that $\Psi_2(\Theta)=\Psi_0(\Theta)$ and $\Psi_3(\Theta)=\Psi_1(\Theta)$, Equation (20) can be rewritten as Equation (21):

$$\begin{cases} (x' + \beta_0(\Theta) + \Psi_0(\Theta),\ y' + \beta_3(\Theta) + \Psi_1(\Theta),\ \theta(\Theta)) \\ (x' + \beta_2(\Theta) + \Psi_0(\Theta),\ y' + \beta_1(\Theta) + \Psi_1(\Theta),\ \theta(\Theta)) \end{cases} \tag{21}$$

The points may be chosen in each Θ-plane of the continuum configuration space that the vertices of the graph actually represent, and that freedom may be used to shift half a grid cell in x, for example, when and only when $\Psi_0(\Theta)$ is non-zero and half a grid cell in y, and, for example, when and only when $\Psi_1(\Theta)$ is non-zero. That is, given integer coordinates (i, j, Θ) indexing into vertices of the discretized volume, the continuum configurations actually represented may be given by the mapping Equation (22):

$$(i, j, \Theta) \rightarrow (x, y, \theta) = (i + \Psi_0(\Theta),\ j + \Psi_1(\Theta),\ \theta(\Theta)), \tag{22}$$

which may be accounted for in obstacle rendering and plan interpretation. This optimization may be skipped, for example, by filling the lookup table β with values rounded in the standard approach, in which case $\Psi(\Theta)=0$.

Applying the inverse of Equation (22) to Equation (21) may provide a mapping from the integer coordinates (x', y', Θ) to the graph vertices (i, j, Θ) as in Equation (23):

$$(x', y', \Theta) \rightarrow \begin{cases} (x' + \beta_0(\Theta),\ y' + \beta_3(\Theta),\ \Theta),\ (\text{LEFT}) \\ (x' + \beta_2(\Theta),\ y' + \beta_1(\Theta),\ \Theta),\ (\text{RIGHT}) \end{cases} \tag{23}$$

and the modulo operation may be applied each of the coordinates to provide Equation (24):

$$(x', y', \Theta) \rightarrow \begin{cases} ((x' + \beta_0(\Theta))\ \&\ M_x,\ (y' + \beta_3(\Theta))\ \&\ M_x,\ \Theta) \\ ((x' + \beta_2(\Theta))\ \&\ M_x,\ (y' + \beta_1(\Theta))\ \&\ M_x,\ \Theta) \end{cases}, \tag{24}$$

corresponding to the discretized turn maneuver curves expressed as a mapping from the thread index (x', y') and the curve sweep coordinate Θ to integer coordinates of a vertex in the volume. The bijective property is apparent as only a constant integer translation and modulo operation may be applied within each constant Θ-plane. In at least one embodiment, the translative shifts in successive planes are configured to not differ by more than one pixel to avoid large jumps along the discretized trajectory processing—which may be achieved by having sufficient angular resolution.

For straight maneuver curves, integer coordinates x', $\Theta \in \mathbb{Z}$ may be used such that $0 \le x' < N_x$, $0 \le \Theta < N_\theta$ in the transformed space to identify a thread. Within each thread, the integer y'$\in \mathbb{Z}$ may be used such that $0 \le y' < N_y$ to sweep along the curve.

Assuming a definition in accordance with Equations (25) and (26):

$$\mathbb{1}(\Theta) = \begin{cases} 0, & |\tan(\theta(\Theta))| \le 1 \\ 1, & \text{otherwise} \end{cases} \tag{25}$$

$$\mathcal{K}(\Theta) = \begin{cases} \sin(\theta(\Theta))/\cos(\theta(\Theta)), & \mathbb{1}(\Theta) = 0 \\ \cos(\theta(\Theta))/\sin(\theta(\Theta)), & \mathbb{1}(\Theta) \ne 0 \end{cases}, \tag{26}$$

the inverse transformation of Equation (15) to the configuration space 112, can then be written as Equation (27):

$$(x', y', \Theta) \rightarrow \begin{cases} (y', x' + y'\mathcal{K}(\Theta), \theta(\Theta)), & \mathbb{I}(\Theta) = 0 \\ (x' + y'\mathcal{K}(\Theta), y', \theta(\Theta)), & \mathbb{I}(\Theta) \neq 0 \end{cases} \tag{27}$$

Assuming a definition of $\mathcal{B}$ (y', Θ)=round(y' $\mathcal{K}$(Θ)), Equation (27) may be rounded to Equation (28):

$$(x', y', \Theta) \rightarrow \begin{cases} (y', x' + \mathcal{B}(y', \Theta), \theta(\Theta)), & \mathbb{I}(\Theta) = 0 \\ (x' + \mathcal{B}(y', \Theta), y', \theta(\Theta)), & \mathbb{I}(\Theta) \neq 0 \end{cases}, \tag{28}$$

while incurring at most ½ rounding error in the skewing direction and 0 otherwise. A constant may be added within each Θ-plane to the line parameterization. In at least one embodiment, the constant is used to add $\Psi_0(\Theta)$ to x and $\Psi_1(\Theta)$ to y to align with the exact grid coordinates of Equation (22). Applying the inverse to Equation (28), followed by the modulo operation, may result in Equation (29):

$$(x', y', \Theta) \rightarrow \begin{cases} (y', (x' + \mathcal{B}(y', \Theta))\ \&\ M_x, \Theta), & \mathbb{I}(\Theta) = 0 \\ ((x' + \mathcal{B}(y', \Theta))\ \&\ M_x, y', \Theta), & \mathbb{I}(\Theta) \neq 0 \end{cases}, \tag{29}$$

which may define the discretized straight maneuver curves expressed as a mapping from the thread index (x', Θ) and the curve sweep coordinate y' to integer coordinates of a vertex in the volume.

In at least one embodiment, to move in the forward direction, y' should may be swept in the positive direction when indicated by the function defined by Equation (30):

$$\mathbb{J}(\Theta) = \begin{cases} \text{sign}(\cos(\theta(\Theta))), & \mathbb{I}(\Theta) = 0 \\ \text{sign}(\sin(\theta(\Theta))), & \mathbb{I}(\Theta) \neq 0 \end{cases}, \tag{30}$$

where the bijective property may be apparent since (y', Θ) can be recovered and only an integer skewing and modulo operation may be applied per (y', Θ).

Resolution for the Discretized Configuration Space

The resolution for the configuration space 112 may be determined in an application specific manner. As an example, the process of determining a practical resolution for the coordinates of the configuration space 112 may include determining a spatial resolution for (x, y), and may be related to how accurately the obstacle costs (whether hard or soft) are to be modeled, and the extent of padding for the bounding region for the vehicle 2600. By way of example, and not limitation, the spatial resolution may be selected as $d_x=d_y=0.125$ m and the spatial area may have the dimensions $d_X=d_Y=64$ m. As a result, $N_x=N_y=d_X/d_x=512$.

The angular resolution may be based at least on allowing for one angular step of rotation to move any point on the vehicle 2600 less than one spatial step to facilitate collision checking. In the current example, let the vehicle extents be $d_f=3.65$ m, $d_b=0.85$ m, $d_l=d_r=0.85$ m for forward, backward, left, right, respectively from the center of the rear wheel axis, and padding $d_p=0.15$ m. These parameters may provide a bounding box of $d_f+d_p=3.8$ m forward, 1 m backward and 1 m to each side of the center of the rear wheel axis. As the poses of the vehicle 2600 change, the front corners of the bounding box may swing the fastest when rotating, and are about $$d_c = \sqrt{(d_f + d_p)^2 + (d_l + d_p)^2} = 3.9 \text{ m}$$

from the center of the rear wheel axis. Thus, the angular resolution may be $d_\theta \leq d_x/d_c$ expressed in radians (e.g., around 1.8°) and $N_\theta=2w/d_\theta$, resulting in $N_\theta \geq 2\pi d_c/d_x$.

The angular resolution may further be based at least on providing an angular step along a turn maneuver curve to correspond to less than one spatial step, which may result in $N_\theta \geq 2\pi R/d_x$, where $$R = k_{max}^{-1}$$

is the turn radius used. Assuming R=10 m results in $N_\theta \geq 503$. Thus, a cube of $N_R=512^3$ total vertices may be a practical volume for this example.

The angular resolution may further be based at least on an amount of spatial error that would result when an angular error is projected out by traveling a long distance. For example, angular error projected out by the minimum turning radius may be configured to be less than one spatial pixel.

Examples of Maneuver Edges

In at least one embodiment, edge mappings may be defined that map a source vertex to a destination vertex. The edge mapping may define one or more of the maneuver edges. For examples, for turn maneuver edges, maneuver edges may result from applying the inverse of Equation (24), then going up or down one Θ-plane and applying Equation (24). Assuming a definition of the constant $M_\theta=N_\theta-1$, and $\Theta^+=(\Theta+1)\&M_\theta$, $\Theta^-=(\Theta-1)\&M_\theta$ as functions of Θ, as well as the lookup tables $\beta^+(\Theta)$=PGP $\beta(\Theta^+)-\beta(\Theta)$ and $\beta^-(\Theta)=\beta(\Theta^-)-\beta(\Theta)$ with four additional references $\beta_{\mathbb{i}}^{\ +}(\Theta)=\beta^+(\Theta+\mathbb{i}\,N_\theta/4)$ and $\beta_{\mathbb{i}}^{\ -}(\Theta)=\beta^-(\Theta+\mathbb{i}\,N_\theta/4)$, respectively. Further, assuming that indices are interpreted modulo the dimensions $N_x$, $N_x$, $N_\theta$. Based on these assumptions, the turn maneuver edges (i, j, Θ) may correspond to Equations (31)-(34):

$$\left(i + \beta_0^+(\Theta),\ j + \beta_3^+(\Theta),\ \Theta^+\right) \text{ (LEFT-FORWARD)} \tag{31}$$

$$\left(i + \beta_0^-(\Theta),\ j + \beta_3^-(\Theta),\ \Theta^-\right) \text{ (LEFT-BACKWARD)} \tag{32}$$

$$\left(i + \beta_2^-(\Theta),\ j + \beta_1^-(\Theta),\ \Theta^-\right) \text{ (RIGHT-FORWARD)} \tag{33}$$

$$\left(i + \beta_2^+(\Theta),\ j + \beta_1^+(\Theta),\ \Theta^+\right) \text{ (RIGHT-BACKWARD).} \tag{34}$$

Similarity, for straight maneuver edges, the mapping may apply the inverse of Equation (29), increasing or decreasing y' by one, and then applying Equation (29). The inverse may correspond to Equation (35):

$$(i, j, \Theta) \rightarrow \begin{cases} ((j - \mathcal{B}(i, \Theta))\ \&\ M_x, i, \Theta), & \mathbb{I}(\Theta) = 0 \\ ((i - \mathcal{B}(j, \Theta))\ \&\ M_x, j, \Theta), & \mathbb{I}(\Theta) \neq 0 \end{cases}. \tag{35}$$

Assuming a definition of $i^+=(i+1)\&M_x$, $i^-=(i-1)\&M_x$ as functions of i, as well as $\mathcal{B}^+(i, \Theta)=\mathcal{B}(i^+, \Theta)-\mathcal{B}(i, \Theta)$ and $\mathcal{B}^-(i, \Theta)=\mathcal{B}(i^-, \Theta)-\mathcal{B}(i, \Theta)$. The straight maneuver edges (i, j, Θ) may then correspond to Equations (36) and (37):

$$\begin{cases} (i^+, (j + \mathcal{B}^+(i, \Theta))\ \&\ M_x, \Theta), & \mathbb{I}(\Theta) = 0 \\ ((i + \mathcal{B}^+(j, \Theta))\ \&\ M_x, j^+, \Theta), & \mathbb{I}(\Theta) \neq 0 \end{cases} \tag{36}$$

-continued $$\begin{cases} (i^-, (j + \mathcal{B}^-(i, \Theta))\ \&\ M_x, \Theta), & \mathbb{I}(\Theta) = 0 \\ ((i + \mathcal{B}^-(j, \Theta))\ \&\ M_x, j^-, \Theta), & \mathbb{I}(\Theta) \neq 0 \end{cases}. \tag{37}$$

When $\mathbb{J}(\Theta) \geq 0$, Equation (36) refers to the forward direction and Equation (37) refers to the reverse, and vice versa. The turn maneuver edges may correspond to a spatial distance travelled of $2\pi R/N_\Theta$. The straight maneuver edges may correspond to the distance $1/|\cos\theta(\Theta)|$ when $\mathbb{I}(\Theta)=0$ and $1/|\sin\theta(\Theta)|$ otherwise. In at least one embodiment, the distances may be used as multipliers on the obstacle costs when calculating the edge weights.

In parallel processing implementations, threads may operate in unison so that they jointly form massive vector operations. For example, a warp of adjacent threads (e.g., 32 adjacent threads) may access memory efficiently in parallel if the threads access consecutive memory locations. In at least one embodiment, the configuration space 112 may be searched where all of the core computational work is performed with threads of a warp accessing consecutive memory locations in parallel. For example, the warps of maneuver kernels for turns may line up along the x-axis, which may also be how the memory is organized. In a GPU implementation, to avoid transposed access during the processing of straight maneuvers, parts of the memory volume may be kept for which $|\tan\theta| \leq 1$ in transposed form, such that warps line up along the x-axis. As an exception, the path panner 110 may transpose between threads when crossing between transposed and non-transposed sections of the volume. This transposition may occur at a few slices of the volume, rather than throughout the bulk of the volume.

Goal Search

As described herein, the trajectory assessor 150 of the path evaluator 130 may use the reachability space(s) annotated by the reachability evaluator 148 over one or more iterations to identify and/or select a path using the back tracer 152. In one or more embodiments, the back tracer 152 may back-trace to find a path that achieved in the smallest number of trajectories or turns (or more generally, the lowest cost path) to reach a goal. The back tracer 152 may be performed by a CPU and/or with parallel processing (e.g., using at least one GPU).

A goal search may be used to determine one or more goal configurations or poses for one or more planned paths. Achieving an exact goal pose at the end of a path plan may be a hard control problem due to non-holonomic constraints. To achieve higher resilience to small quantization errors, perception jitter or control slop, in at least one embodiment, more than one configuration may be included in the goal set. Further, a reward function (such as a function of difference to the ideal pose) may be used over the goal set. The optimization criterion may be the reward for the vertex minus the cost to get to that vertex to allow the path planner 110 to decide that a small pose alignment is not worth additional maneuvers and to ensure that the target or goal set is reached in the right number of maneuvers even if there is some quantization noise incurred along the way. Having multiple ideal goals is also possible, such as multiple parking spot candidates and vehicle directions. In at least one embodiment, the goal search is a light computation, but may still be performed on the PPU to avoid transferring the value volume to the CPU.

Back-Tracing

After processing the graph corresponding to the configuration space 112 and using a goal search to find a vertex corresponding to a goal configuration, the back tracer 152 may back-track from the vertex to extract the path that achieved the best cost (e.g., the lowest cost). In at least one embodiment, the back-tracking process is computationally light weight, but is also performed on the PPU(s) to avoid transferring the value volume. In at least one embodiment, forward-tracking may be used, for example, where every time a vertex value is improved, the reachability evaluator 148 records the source vertex and maneuver type responsible for the improvement. Back-tracking may then be simplified by following the recorded indices backwards, but the forward-tracing may increase memory usage and bulk processing time. Thus, each step of back-tracking may include a Bellman-iteration in reverse. For the current vertex, the back tracer 152 may consider the source vertices and edges that could have improved the cost value last, and calculate what the value would be if there was an improvement. Then, the back tracer 152 may select the source vertex that achieves the smallest value in accordance with Equation (38):

$$\underset{(i,j,\Theta)}{\operatorname{argmin}} \mathbb{E}_{sum}(i, j, \Theta) + V(i, j, \Theta), \tag{38}$$

where $\mathbb{E}_{sum}(i, j, \Theta)$ may refer to the sum of the edges to get from vertex (i, j, Θ) to the current vertex. Using this approach, the smallest cost value may be the value of the current vertex, but using the minimum avoids equality comparisons on floating point values. In the case of multiple equal smallest values, those candidates are all valid back-tracking choices. Unless the value is infinite, the back tracer 152 may select the best source vertex and repeat until a start vertex is determined.

In approaches that use a non-parallel or serial approaches, such as for Dijkstra processing of the graph, the back-tracking may proceed one edge at a time. For kernel-style processing, only the values of the transition vertices may be available. Therefore, one back-tracking step may amount to back-tracing through all of the maneuver curves or types that go through the current vertex in their entirety, using Equations (31)-(34), (36), and (37), adding edge values sequentially, and comparing the running sum plus the value of each vertex to the current minimum. This approach may be akin to the back tracer 152 running the maneuver kernel in reverse, but for only one curve for each maneuver instead of many in parallel.

In at least one embodiment, the back tracer 152 may search for one or more cells in a target set of one or more poses for which the final reachability output is set in the reachability space(s). For example, the back tracer 152 may loop over a target set of poses, or if parallelism desired, using a parallel reduction. If there is more than one cell that has reachability set, then one or more poses may be selected by some preference function, such as based on closeness to some selected pose. If there is no such pose, this may indicate there is no N-turn path that reaches the target set, in which case an (N+1)-turn plan could be evaluated.

Once a cell is selected to start a back-trace from, it may be assumed that the cell was reached after i iterations and one of the turn types reached the pose from another pose that was reached one iteration earlier (on iteration i−1). The back tracer 152 may therefore back-trace all K turn types from that cell, and somewhere along them, it will find a cell that is set to reachable in an output reachability space from the iteration i−1. As the turns may have repeatable coordinate definitions, they may be back-traced exactly as evaluated.

This back-trace of K turns can be done sequentially by a CPU, or by a parallel reduction. There may be cyclic ambiguity as a turn may have been used in the forward or backward direction. The ambiguity may be resolved by checking the freespace along the back-traced turns and stopping the back-trace if an obstacle is found (in embodiments where obstacles may completely block a path).

In the case of a more general cost function, the criterion may be to find the cell with the lowest cost among those for which the cost reduction is equal to the cost of the back-traced turn. If there is more than one cell that satisfies the criterion, a heuristic could be used to select a cell, such as pick the cell that requires the shortest turn to reach. If the target set was reached in less than N turns, some of the initial back-tracing steps will find a reachable cell from the previous iteration as the same cell (because that turn step was not required). The back tracer 152 may determine this criterion is satisfied and remove that turn from a path solution. Once a cell is found, the process may be repeated from that cell until a reachable cell is found after iteration 1. The back-trace may conclude with the current pose representing the reachable space before any turns and may be performed with the current pose to resolve the cyclic ambiguity.

Examples of Transition Costs

In at least one embodiment, transition costs model time taken to accelerate, decelerate, change gear and change steering with the cost function being the time taken to follow a path. All distances may be divided by $v_{max}$, or equivalently the transition times may be multiplied by $v_{max}$ to determine the distance the vehicle would have traveled at full speed during the transition time. Thus, all the costs may be handled in distance-equivalents, and about shortest distances may be evaluated with or without transition costs. For example, assuming $v_{max}$=15 mph≅6.7 m/s, the time to turn the wheel over half its range is $t_w$=2 s, and the full range $t_w$=2$t_w$. Using these assumptions, the transition cost in terms of equivalent distance may be $d_w=t_w v_{max}$=13.4 m. A time to change gear may be $t_g$=1 s, but may have an associated steering change and may be assumed to occur while steering. In at least one embodiment, additional time is added to a cost to account for acceleration/deceleration, providing transition costs $d_T$ on transition edges in the range of 10-20 m, which is comparable to the minimum turn radius.

Sections

In at least one embodiment, maneuvers may be divided into sections to expose additional parallelism and reduce processing time. Sections may be used to split the processing of maneuvers up into parallel sections. For example, for sections as short as four grid cells, parallelism can be exposed to up to a quarter of the volume resolution. However, processing may not be completely independent between sections as the cost value or reachability may ripple through the entire maneuver for one or two cycles. This can be handled by a parallel reduction pattern that gathers results hierarchically, performs a small amount of processing with the gathered results, and then scatters the results back out again to individual sections. The results of one section may be independent of other sections, with the exception of the cost value/reachability that enters a section at its beginning. Thus, given the value that enters the sections, the sections can be processed independently.

In at least one embodiment, to implement sections, a processing pass is performed that calculates per section the value (or reachability) leaving the section, as originated within the section itself. ('Sv'), and the cost (e.g., section distance) of going through the section from start to finish ('Sd').

An example of pseudocode for the processing pass follows, which assumes a section length n, and section index s:

```
for (v=∞, d=0, i=0; i<n; i++) {
  u     =V[i];              //Read value from volume
  b     =cx*B[i];           //Read and calculate distance
  d     +=b;                //Accumulate distance
  v     =min(v,u+ct)+b;}    //Update value
Sv[s]=v; Sd[s]=d;           //Store section output
```

Globally propagated effects may be determined in a subsequent and smaller processing pass that works with sections instead of individual cells. This process can be continued hierarchically with sections of sections and so on. For simplicity, only one layer of sections is discussed. This processing pass may work on sections similar to the pass within sections, but using section value instead of vertex value and section distance instead of single edge distance, as shown in the pseudocode below. The processing pass may loops over the section outputs twice in the case of turns and once in the case of straights. The first loop may warm up the value that might be propagated and the second loop may complete the full propagation and writes the result back. An example of pseudocode for the processing pass follows:

```
for (v=∞, s=0; s<N/n; s++) {
  v     =min(v+Sd[s], Sv[s]);}    //Ripple along
for (s=0; s<N/n; s++) {
  v     =min(v+Sd[s], Sv[s]);     //Ripple along
Sv[s]=v;}                          //Store back best value
```

A subsequent processing pass may be performed, which may be nearly identical to the basic loop of the normal algorithm, with the change that it uses section value as input instead of a starting value at zero. An example of pseudocode for the processing pass follows:

```
for (v=Sv[(s-1)%(N/n)], i=0; i<n; i++) {
  u=V[i];                      //Read value from volume
  V[i]=min(v,u);               //Store back best value
  v=min(v,u+ct)+cx*B[i];}      //Update value
```

A similar approach may be used to process bit-vectors using sections.

Example Autonomous Vehicle

Figure 26A:
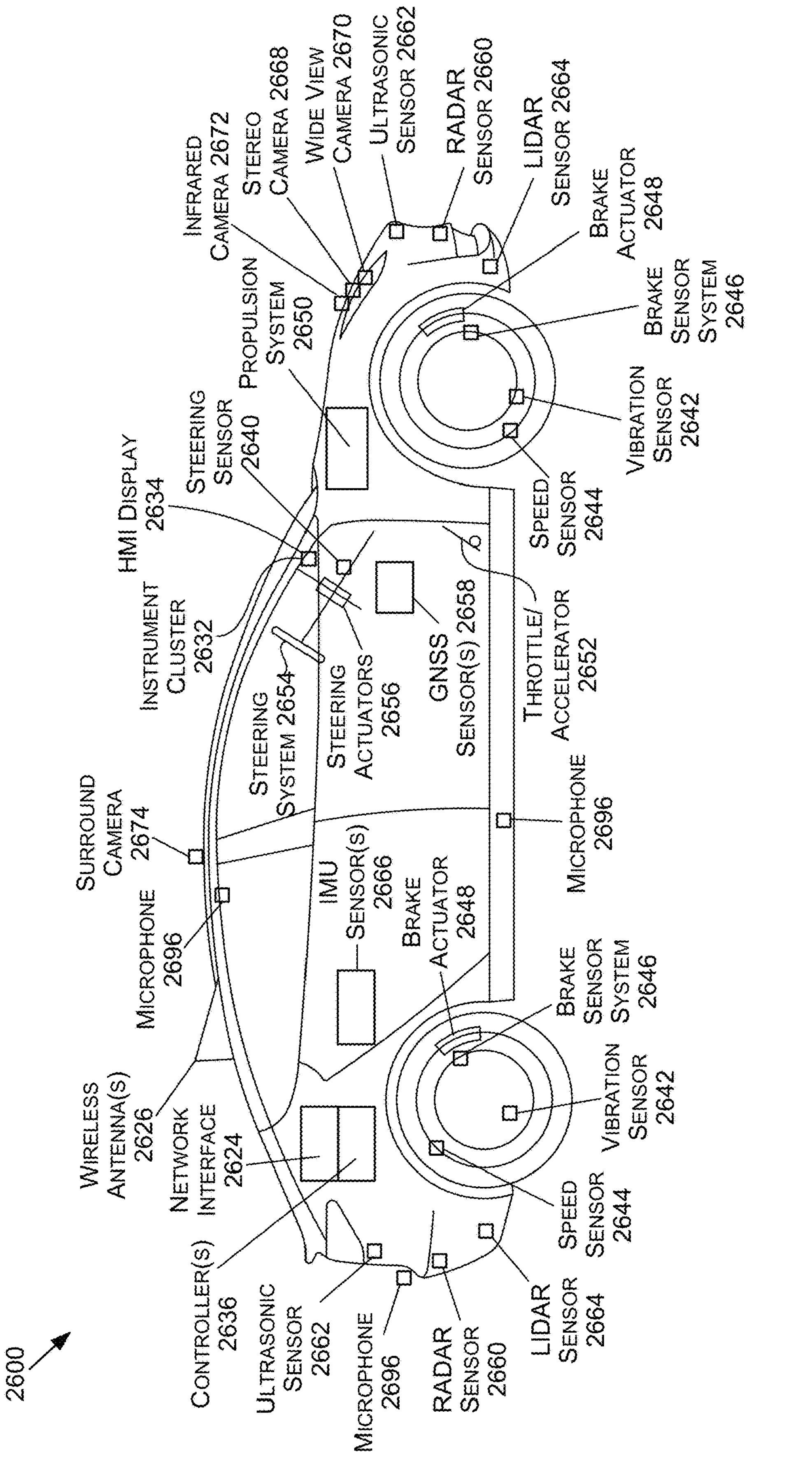
FIG. 26A is an illustration of an example autonomous vehicle, in accordance with some embodiments of the present disclosure.

FIG. 26A is an illustration of an example autonomous vehicle 2600, in accordance with some embodiments of the present disclosure. The autonomous vehicle 2600 (alternatively referred to herein as the "vehicle 2600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 2600 may be capable of functionality in accordance with one or more of Level 3-Level 5 of the autonomous driving levels. The vehicle 2600 may be capable of functionality in accordance with one or more of Level 1-Level 5 of the autonomous driving levels. For example, the vehicle 2600 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 2600 or other machine, such as being fully autonomous, being highly autonomous, being conditionally autonomous, being partially autonomous, providing assistive autonomy, being semi-autonomous, being primarily autonomous, or other designation.

The vehicle 2600 may include components such as a chassis, a vehicle body, wheels (e.g., 2, 4, 6, 8, 18, etc.), tires, axles, and other components of a vehicle. The vehicle 2600 may include a propulsion system 2650, such as an internal combustion engine, hybrid electric power plant, an all-electric engine, and/or another propulsion system type. The propulsion system 2650 may be connected to a drive train of the vehicle 2600, which may include a transmission, to enable the propulsion of the vehicle 2600. The propulsion system 2650 may be controlled in response to receiving signals from the throttle/accelerator 2652.

A steering system 2654, which may include a steering wheel, may be used to steer the vehicle 2600 (e.g., along a desired path or route) when the propulsion system 2650 is operating (e.g., when the vehicle is in motion). The steering system 2654 may receive signals from a steering actuator 2656. The steering wheel may be optional for full automation (Level 5) functionality.

The brake sensor system 2646 may be used to operate the vehicle brakes in response to receiving signals from the brake actuators 2648 and/or brake sensors.

Controller(s) 2636, which may include one or more system on chips (SoCs) 2604 (FIG. 26C) and/or GPU(s), may provide signals (e.g., representative of commands) to one or more components and/or systems of the vehicle 2600. For example, the controller(s) may send signals to operate the vehicle brakes via one or more brake actuators 2648, to operate the steering system 2654 via one or more steering actuators 2656, to operate the propulsion system 2650 via one or more throttle/accelerators 2652. The controller(s) 2636 may include one or more onboard (e.g., integrated) computing devices (e.g., supercomputers) that process sensor signals, and output operation commands (e.g., signals representing commands) to enable autonomous driving and/or to assist a human driver in driving the vehicle 2600. The controller(s) 2636 may include a first controller 2636 for autonomous driving functions, a second controller 2636 for functional safety functions, a third controller 2636 for artificial intelligence functionality (e.g., computer vision), a fourth controller 2636 for infotainment functionality, a fifth controller 2636 for redundancy in emergency conditions, and/or other controllers. In some examples, a single controller 2636 may handle two or more of the above functionalities, two or more controllers 2636 may handle a single functionality, and/or any combination thereof.

The controller(s) 2636 may provide the signals for controlling one or more components and/or systems of the vehicle 2600 in response to sensor data received from one or more sensors (e.g., sensor inputs). The sensor data may be received from, for example and without limitation, global navigation satellite systems ("GNSS") sensor(s) 2658 (e.g., Global Positioning System sensor(s)), RADAR sensor(s) 2660, ultrasonic sensor(s) 2662, LIDAR sensor(s) 2664, inertial measurement unit (IMU) sensor(s) 2666 (e.g., accelerometer(s), gyroscope(s), magnetic compass(es), magnetometer(s), etc.), microphone(s) 2696, stereo camera(s) 2668, wide-view camera(s) 2670 (e.g., fisheye cameras), infrared camera(s) 2672, surround camera(s) 2674 (e.g., 360 degree cameras), long-range and/or mid-range camera(s) 2698, speed sensor(s) 2644 (e.g., for measuring the speed of the vehicle 2600), vibration sensor(s) 2642, steering sensor(s) 2640, brake sensor(s) (e.g., as part of the brake sensor system 2646), and/or other sensor types.

One or more of the controller(s) 2636 may receive inputs (e.g., represented by input data) from an instrument cluster 2632 of the vehicle 2600 and provide outputs (e.g., represented by output data, display data, etc.) via a human-machine interface (HMI) display 2634, an audible annunciator, a loudspeaker, and/or via other components of the vehicle 2600. The outputs may include information such as vehicle velocity, speed, time, map data (e.g., the High Definition ("HD") map 2622 of FIG. 26C), location data (e.g., the vehicle's 2600 location, such as on a map), direction, location of other vehicles (e.g., an occupancy grid), information about objects and status of objects as perceived by the controller(s) 2636, etc. For example, the HMI display 2634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 2600 further includes a network interface 2624 which may use one or more wireless antenna(s) 2626 and/or modem(s) to communicate over one or more networks. For example, the network interface 2624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 2626 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 26B:
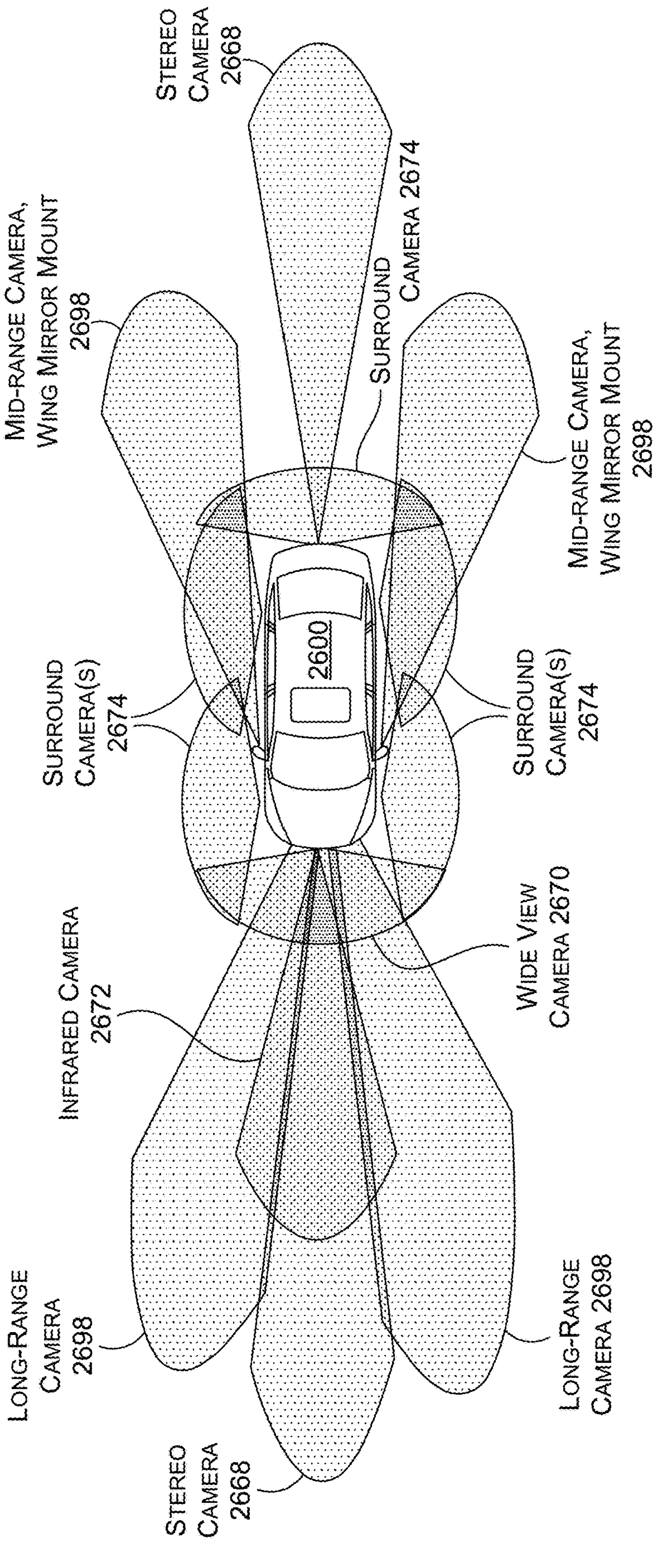
FIG. 26B is an example of camera locations and fields of view for the example autonomous vehicle of FIG. 26A, in accordance with some embodiments of the present disclosure.

FIG. 26B is an example of camera locations and fields of view for the example autonomous vehicle 2600 of FIG. 26A, in accordance with some embodiments of the present disclosure. The cameras and respective fields of view are one example embodiment and are not intended to be limiting. For example, additional and/or alternative cameras may be included and/or the cameras may be located at different locations on the vehicle 2600.

The camera types for the cameras may include, but are not limited to, digital cameras that may be adapted for use with the components and/or systems of the vehicle 2600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 2600 (e.g., front-facing cameras) may be used for surround view, to help identify forward facing paths and obstacles, as well aid in, with the help of one or more controllers 2636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 2670 that may be used to perceive objects coming into view from the periphery (e.g., pedestrians, crossing traffic or bicycles). Although only one wide-view camera is illustrated in FIG. 26B, there may be any number (including zero) of wide-view cameras 2670 on the vehicle 2600. In addition, any number of long-range camera(s) 2698 (e.g., a long-view stereo camera pair) may be used for depth-based object detection, especially for objects for which a neural network has not yet been trained. The long-range camera(s) 2698 may also be used for object detection and classification, as well as basic object tracking.

Any number of stereo cameras 2668 may also be included in a front-facing configuration. In at least one embodiment, one or more of stereo camera(s) 2668 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 2668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 2668 may be used in addition to, or alternatively from, those described herein.

Cameras with a field of view that include portions of the environment to the side of the vehicle 2600 (e.g., side-view cameras) may be used for surround view, providing information used to create and update the occupancy grid, as well as to generate side impact collision warnings. For example, surround camera(s) 2674 (e.g., four surround cameras 2674 as illustrated in FIG. 26B) may be positioned to on the vehicle 2600. The surround camera(s) 2674 may include wide-view camera(s) 2670, fisheye camera(s), 360 degree camera(s), and/or the like. Four example, four fisheye cameras may be positioned on the vehicle's front, rear, and sides. In an alternative arrangement, the vehicle may use three surround camera(s) 2674 (e.g., left, right, and rear), and may leverage one or more other camera(s) (e.g., a forward-facing camera) as a fourth surround view camera.

Cameras with a field of view that include portions of the environment to the rear of the vehicle 2600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 2698, stereo camera(s) 2668), infrared camera(s) 2672, etc.), as described herein.

Figure 26C:
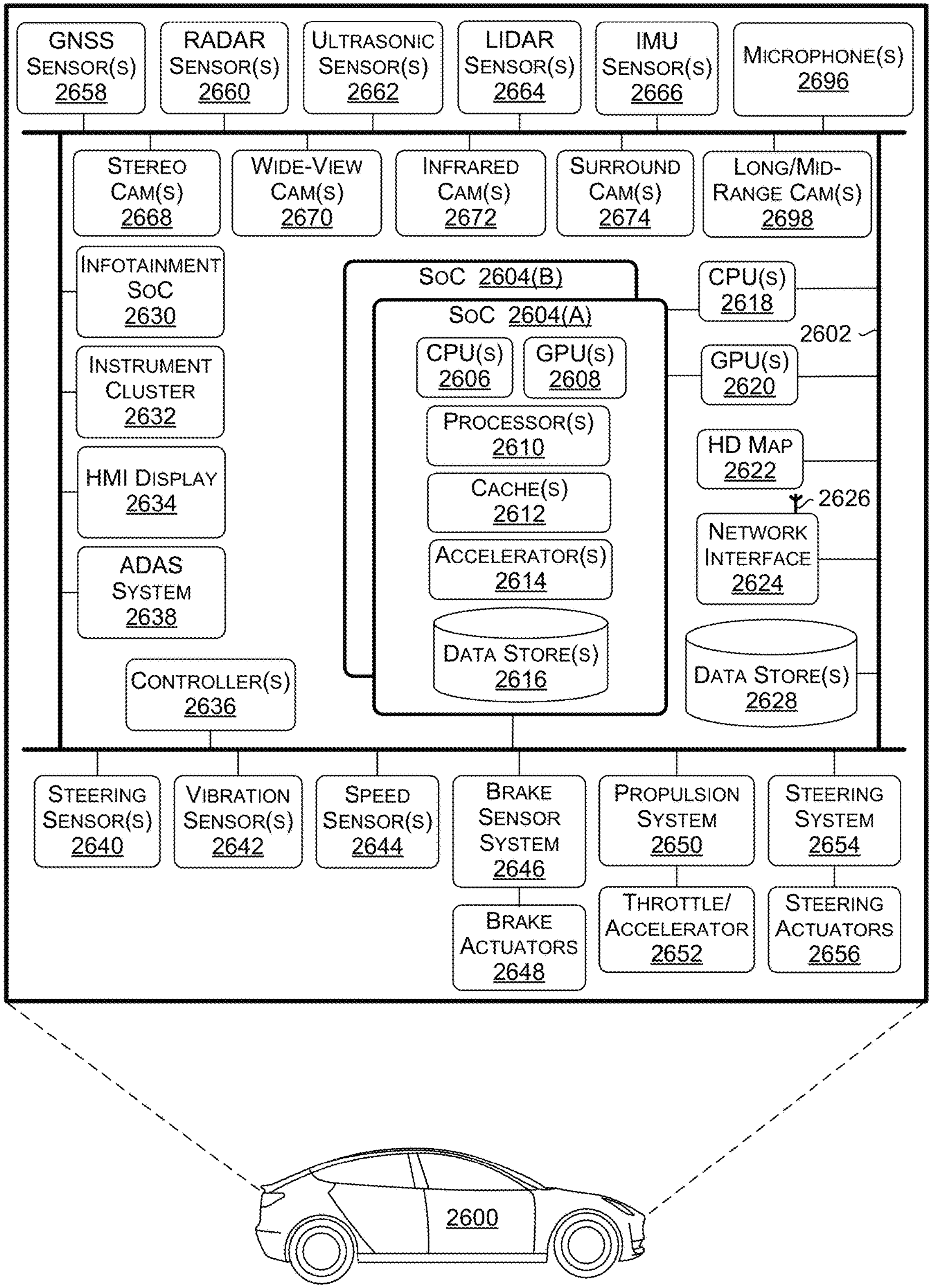
FIG. 26C is a block diagram of an example system architecture for the example autonomous vehicle of FIG. 26A, in accordance with some embodiments of the present disclosure.

FIG. 26C is a block diagram of an example system architecture for the example autonomous vehicle 2600 of FIG. 26A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 2600 in FIG. 26C are illustrated as being connected via bus 2602. The bus 2602 may include a Controller Area Network (CAN) data interface (alternatively referred to herein as a "CAN bus"). A CAN may be a network inside the vehicle 2600 used to aid in control of various features and functionality of the vehicle 2600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 2602 is described herein as being a CAN bus, this is not intended to be limiting. For example, in addition to, or alternatively from, the CAN bus, FlexRay and/or Ethernet may be used. Additionally, although a single line is used to represent the bus 2602, this is not intended to be limiting. For example, there may be any number of busses 2602, which may include one or more CAN busses, one or more FlexRay busses, one or more Ethernet busses, and/or one or more other types of busses using a different protocol. In some examples, two or more busses 2602 may be used to perform different functions, and/or may be used for redundancy. For example, a first bus 2602 may be used for collision avoidance functionality and a second bus 2602 may be used for actuation control. In any example, each bus 2602 may communicate with any of the components of the vehicle 2600, and two or more busses 2602 may communicate with the same components. In some examples, each SoC 2604, each controller 2636, and/or each computer within the vehicle may have access to the same input data (e.g., inputs from sensors of the vehicle 2600), and may be connected to a common bus, such the CAN bus.

The vehicle 2600 may include one or more controller(s) 2636, such as those described herein with respect to FIG. 26A. The controller(s) 2636 may be used for a variety of functions. The controller(s) 2636 may be coupled to any of the various other components and systems of the vehicle 2600, and may be used for control of the vehicle 2600, artificial intelligence of the vehicle 2600, infotainment for the vehicle 2600, and/or the like.

The vehicle 2600 may include a system(s) on a chip (SoC) 2604. The SoC 2604 may include CPU(s) 2606, GPU(s) 2608, processor(s) 2610, cache(s) 2612, accelerator(s) 2614, data store(s) 2616, and/or other components and features not illustrated. The SoC(s) 2604 may be used to control the vehicle 2600 in a variety of platforms and systems. For example, the SoC(s) 2604 may be combined in a system (e.g., the system of the vehicle 2600) with an HD map 2622 which may obtain map refreshes and/or updates via a network interface 2624 from one or more servers (e.g., server(s) 2678 of FIG. 26D).

The CPU(s) 2606 may include a CPU cluster or CPU complex (alternatively referred to herein as a "CCPLEX"). The CPU(s) 2606 may include multiple cores and/or L2 caches. For example, in some embodiments, the CPU(s) 2606 may include eight cores in a coherent multi-processor configuration. In some embodiments, the CPU(s) 2606 may include four dual-core clusters where each cluster has a dedicated L2 cache (e.g., a 2 MB L2 cache). The CPU(s) 2606 (e.g., the CCPLEX) may be configured to support simultaneous cluster operation enabling any combination of the clusters of the CPU(s) 2606 to be active at any given time.

The CPU(s) 2606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 2606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 2608 may include an integrated GPU (alternatively referred to herein as an "iGPU"). The GPU(s) 2608 may be programmable and may be efficient for parallel workloads. The GPU(s) 2608, in some examples, may use an enhanced tensor instruction set. The GPU(s) 2608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 2608 may include at least eight streaming microprocessors. The GPU(s) 2608 may use compute application programming interface(s) (API(s)). In addition, the GPU(s) 2608 may use one or more parallel computing platforms and/or programming models (e.g., NVIDIA's CUDA).

The GPU(s) 2608 may be power-optimized for best performance in automotive and embedded use cases. For example, the GPU(s) 2608 may be fabricated on a Fin field-effect transistor (FinFET). However, this is not intended to be limiting and the GPU(s) 2608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 2608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 2608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 2608 to access the CPU(s) 2606 page tables directly. In such examples, when the GPU(s) 2608 memory management unit (MMU) experiences a miss, an address translation request may be transmitted to the CPU(s) 2606. In response, the CPU(s) 2606 may look in its page tables for the virtual-to-physical mapping for the address and transmits the translation back to the GPU(s) 2608. As such, unified memory technology may allow a single unified virtual address space for memory of both the CPU(s) 2606 and the GPU(s) 2608, thereby simplifying the GPU(s) 2608 programming and porting of applications to the GPU(s) 2608.

In addition, the GPU(s) 2608 may include an access counter that may keep track of the frequency of access of the GPU(s) 2608 to memory of other processors. The access counter may help ensure that memory pages are moved to the physical memory of the processor that is accessing the pages most frequently.

The SoC(s) 2604 may include any number of cache(s) 2612, including those described herein. For example, the cache(s) 2612 may include an L3 cache that is available to both the CPU(s) 2606 and the GPU(s) 2608 (e.g., that is connected both the CPU(s) 2606 and the GPU(s) 2608). The cache(s) 2612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 2604 may include an arithmetic logic unit(s) (ALU(s)) which may be leveraged in performing processing with respect to any of the variety of tasks or operations of the vehicle 2600—such as processing DNNs. In addition, the SoC(s) 2604 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 2606 and/or GPU(s) 2608.

The SoC(s) 2604 may include one or more accelerators 2614 (e.g., hardware accelerators, software accelerators, or a combination thereof). For example, the SoC(s) 2604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 2608 and to off-load some of the tasks of the GPU(s) 2608 (e.g., to free up more cycles of the GPU(s) 2608 for performing other tasks). As an example, the accelerator(s) 2614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 2614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 2608, and by using an inference accelerator, for example, a designer may target either the DLA(s) or the GPU(s) 2608 for any function. For example, the designer may focus processing of CNNs and floating point operations on the DLA(s) and leave other functions to the GPU(s) 2608 and/or other accelerator(s) 2614.

The accelerator(s) 2614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 2606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 2614 (e.g., the hardware acceleration cluster) may include a computer vision network on-chip and SRAM, for providing a high-bandwidth, low latency SRAM for the accelerator(s) 2614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 2604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 2614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 2666 output that correlates with the vehicle 2600 orientation, distance, 3D location estimates of the object obtained from the neural network and/or other sensors (e.g., LIDAR sensor(s) 2664 or RADAR sensor(s) 2660), among others.

The SoC(s) 2604 may include data store(s) 2616 (e.g., memory). The data store(s) 2616 may be on-chip memory of the SoC(s) 2604, which may store neural networks to be executed on the GPU and/or the DLA. In some examples, the data store(s) 2616 may be large enough in capacity to store multiple instances of neural networks for redundancy and safety. The data store(s) 2612 may comprise L2 or L3 cache(s) 2612. Reference to the data store(s) 2616 may include reference to the memory associated with the PVA, DLA, and/or other accelerator(s) 2614, as described herein.

The SoC(s) 2604 may include one or more processor(s) 2610 (e.g., embedded processors). The processor(s) 2610 may include a boot and power management processor that may be a dedicated processor and subsystem to handle boot power and management functions and related security enforcement. The boot and power management processor may be a part of the SoC(s) 2604 boot sequence and may provide runtime power management services. The boot power and management processor may provide clock and voltage programming, assistance in system low power state transitions, management of SoC(s) 2604 thermals and temperature sensors, and/or management of the SoC(s) 2604 power states. Each temperature sensor may be implemented as a ring-oscillator whose output frequency is proportional to temperature, and the SoC(s) 2604 may use the ring-oscillators to detect temperatures of the CPU(s) 2606, GPU(s) 2608, and/or accelerator(s) 2614. If temperatures are determined to exceed a threshold, the boot and power management processor may enter a temperature fault routine and put the SoC(s) 2604 into a lower power state and/or put the vehicle 2600 into a chauffeur to safe stop mode (e.g., bring the vehicle 2600 to a safe stop).

The processor(s) 2610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 2610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 2610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 2610 may further include a real-time camera engine that may include a dedicated processor subsystem for handling real-time camera management.

The processor(s) 2610 may further include a high-dynamic range signal processor that may include an image signal processor that is a hardware engine that is part of the camera processing pipeline.

The processor(s) 2610 may include a video image compositor that may be a processing block (e.g., implemented on a microprocessor) that implements video post-processing functions needed by a video playback application to produce the final image for the player window. The video image compositor may perform lens distortion correction on wide-view camera(s) 2670, surround camera(s) 2674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 2608 is not required to continuously render new surfaces. Even when the GPU(s) 2608 is powered on and active doing 3D rendering, the video image compositor may be used to offload the GPU(s) 2608 to improve performance and responsiveness.

The SoC(s) 2604 may further include a mobile industry processor interface (MIPI) camera serial interface for receiving video and input from cameras, a high-speed interface, and/or a video input block that may be used for camera and related pixel input functions. The SoC(s) 2604 may further include an input/output controller(s) that may be controlled by software and may be used for receiving I/O signals that are uncommitted to a specific role.

The SoC(s) 2604 may further include a broad range of peripheral interfaces to enable communication with peripherals, audio codecs, power management, and/or other devices. The SoC(s) 2604 may be used to process data from cameras (e.g., connected over Gigabit Multimedia Serial Link and Ethernet), sensors (e.g., LIDAR sensor(s) 2664, RADAR sensor(s) 2660, etc. that may be connected over Ethernet), data from bus 2602 (e.g., speed of vehicle 2600, steering wheel position, etc.), data from GNSS sensor(s) 2658 (e.g., connected over Ethernet or CAN bus). The SoC(s) 2604 may further include dedicated high-performance mass storage controllers that may include their own DMA engines, and that may be used to free the CPU(s) 2606 from routine data management tasks.

The SoC(s) 2604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 2604 may be faster, more reliable, and even more energy-efficient and space-efficient than conventional systems. For example, the accelerator(s) 2614, when combined with the CPU(s) 2606, the GPU(s) 2608, and the data store(s) 2616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 2620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 2608.

In some examples, a CNN for facial recognition and vehicle owner identification may use data from camera sensors to identify the presence of an authorized driver and/or owner of the vehicle 2600. The always on sensor processing engine may be used to unlock the vehicle when the owner approaches the driver door and turn on the lights, and, in security mode, to disable the vehicle when the owner leaves the vehicle. In this way, the SoC(s) 2604 provide for security against theft and/or carjacking.

In another example, a CNN for emergency vehicle detection and identification may use data from microphones 2696 to detect and identify emergency vehicle sirens. In contrast to conventional systems, that use general classifiers to detect sirens and manually extract features, the SoC(s) 2604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 2658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 2662, until the emergency vehicle(s) passes.

The vehicle may include a CPU(s) 2618 (e.g., discrete CPU(s), or dCPU(s)), that may be coupled to the SoC(s) 2604 via a high-speed interconnect (e.g., PCIe). The CPU(s) 2618 may include an X86 processor, for example. The CPU(s) 2618 may be used to perform any of a variety of functions, including arbitrating potentially inconsistent results between ADAS sensors and the SoC(s) 2604, and/or monitoring the status and health of the controller(s) 2636 and/or infotainment SoC 2630, for example.

The vehicle 2600 may include a GPU(s) 2620 (e.g., discrete GPU(s), or dGPU(s)), that may be coupled to the SoC(s) 2604 via a high-speed interconnect (e.g., NVIDIA's NVLINK). The GPU(s) 2620 may provide additional artificial intelligence functionality, such as by executing redundant and/or different neural networks, and may be used to train and/or update neural networks based on input (e.g., sensor data) from sensors of the vehicle 2600.

The vehicle 2600 may further include the network interface 2624 which may include one or more wireless antennas 2626 (e.g., one or more wireless antennas for different communication protocols, such as a cellular antenna, a Bluetooth antenna, etc.). The network interface 2624 may be used to enable wireless connectivity over the Internet with the cloud (e.g., with the server(s) 2678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 2600 information about vehicles in proximity to the vehicle 2600 (e.g., vehicles in front of, on the side of, and/or behind the vehicle 2600). This functionality may be part of a cooperative adaptive cruise control functionality of the vehicle 2600.

The network interface 2624 may include a SoC that provides modulation and demodulation functionality and enables the controller(s) 2636 to communicate over wireless networks. The network interface 2624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 2600 may further include data store(s) 2628 which may include off-chip (e.g., off the SoC(s) 2604) storage. The data store(s) 2628 may include one or more storage elements including RAM, SRAM, DRAM, VRAM, Flash, hard disks, and/or other components and/or devices that may store at least one bit of data.

The vehicle 2600 may further include GNSS sensor(s) 2658. The GNSS sensor(s) 2658 (e.g., GPS, assisted GPS sensors, differential GPS (DGPS) sensors, etc.), to assist in mapping, perception, occupancy grid generation, and/or path planning functions. Any number of GNSS sensor(s) 2658 may be used, including, for example and without limitation, a GPS using a USB connector with an Ethernet to Serial (RS-232) bridge.

The vehicle 2600 may further include RADAR sensor(s) 2660. The RADAR sensor(s) 2660 may be used by the vehicle 2600 for long-range vehicle detection, even in darkness and/or severe weather conditions. RADAR functional safety levels may be ASIL B. The RADAR sensor(s) 2660 may use the CAN and/or the bus 2602 (e.g., to transmit data generated by the RADAR sensor(s) 2660) for control and to access object tracking data, with access to Ethernet to access raw data in some examples. A wide variety of RADAR sensor types may be used. For example, and without limitation, the RADAR sensor(s) 2660 may be suitable for front, rear, and side RADAR use. In some example, Pulse Doppler RADAR sensor(s) are used.

The RADAR sensor(s) 2660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 2660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 2600 surroundings at higher speeds with minimal interference from traffic in adjacent lanes. The other two antennae may expand the field of view, making it possible to quickly detect vehicles entering or leaving the vehicle's 2600 lane.

Mid-range RADAR systems may include, as an example, a range of up to 2660 m (front) or 80 m (rear), and a field of view of up to 42 degrees (front) or 2650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 2600 may further include ultrasonic sensor(s) 2662. The ultrasonic sensor(s) 2662, which may be positioned at the front, back, and/or the sides of the vehicle 2600, may be used for park assist and/or to create and update an occupancy grid. A wide variety of ultrasonic sensor(s) 2662 may be used, and different ultrasonic sensor(s) 2662 may be used for different ranges of detection (e.g., 2.5 m, 4 m). The ultrasonic sensor(s) 2662 may operate at functional safety levels of ASIL B.

The vehicle 2600 may include LIDAR sensor(s) 2664. The LIDAR sensor(s) 2664 may be used for object and pedestrian detection, emergency braking, collision avoidance, and/or other functions. The LIDAR sensor(s) 2664 may be functional safety level ASIL B. In some examples, the vehicle 2600 may include multiple LIDAR sensors 2664 (e.g., two, four, six, etc.) that may use Ethernet (e.g., to provide data to a Gigabit Ethernet switch).

In some examples, the LIDAR sensor(s) 2664 may be capable of providing a list of objects and their distances for a 360-degree field of view. Commercially available LIDAR sensor(s) 2664 may have an advertised range of approximately 2600 m, with an accuracy of 2 cm-3 cm, and with support for a 2600 Mbps Ethernet connection, for example. In some examples, one or more non-protruding LIDAR sensors 2664 may be used. In such examples, the LIDAR sensor(s) 2664 may be implemented as a small device that may be embedded into the front, rear, sides, and/or corners of the vehicle 2600. The LIDAR sensor(s) 2664, in such examples, may provide up to a 120-degree horizontal and 35-degree vertical field-of-view, with a 200 m range even for low-reflectivity objects. Front-mounted LIDAR sensor(s) 2664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 2600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 2664 may be less susceptible to motion blur, vibration, and/or shock.

The vehicle may further include IMU sensor(s) 2666. The IMU sensor(s) 2666 may be located at a center of the rear axle of the vehicle 2600, in some examples. The IMU sensor(s) 2666 may include, for example and without limitation, an accelerometer(s), a magnetometer(s), a gyroscope(s), a magnetic compass(es), and/or other sensor types. In some examples, such as in six-axis applications, the IMU sensor(s) 2666 may include accelerometers and gyroscopes, while in nine-axis applications, the IMU sensor(s) 2666 may include accelerometers, gyroscopes, and magnetometers.

In some embodiments, the IMU sensor(s) 2666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 2666 may enable the vehicle 2600 to estimate heading without requiring input from a magnetic sensor by directly observing and correlating the changes in velocity from GPS to the IMU sensor(s) 2666. In some examples, the IMU sensor(s) 2666 and the GNSS sensor(s) 2658 may be combined in a single integrated unit.

The vehicle may include microphone(s) 2696 placed in and/or around the vehicle 2600. The microphone(s) 2696 may be used for emergency vehicle detection and identification, among other things.

The vehicle may further include any number of camera types, including stereo camera(s) 2668, wide-view camera(s) 2670, infrared camera(s) 2672, surround camera(s) 2674, long-range and/or mid-range camera(s) 2698, and/or other camera types. The cameras may be used to capture image data around an entire periphery of the vehicle 2600. The types of cameras used depends on the embodiments and requirements for the vehicle 2600, and any combination of camera types may be used to provide the necessary coverage around the vehicle 2600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 26A and FIG. 26B.

The vehicle 2600 may further include vibration sensor(s) 2642. The vibration sensor(s) 2642 may measure vibrations of components of the vehicle, such as the axle(s). For example, changes in vibrations may indicate a change in road surfaces. In another example, when two or more vibration sensors 2642 are used, the differences between the vibrations may be used to determine friction or slippage of the road surface (e.g., when the difference in vibration is between a power-driven axle and a freely rotating axle).

The vehicle 2600 may include an ADAS system 2638. The ADAS system 2638 may include a SoC, in some examples. The ADAS system 2638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 2660, LIDAR sensor(s) 2664, and/or a camera(s). The ACC systems may include longitudinal ACC and/or lateral ACC. Longitudinal ACC monitors and controls the distance to the vehicle immediately ahead of the vehicle 2600 and automatically adjust the vehicle speed to maintain a safe distance from vehicles ahead. Lateral ACC performs distance keeping, and advises the vehicle 2600 to change lanes when necessary. Lateral ACC is related to other ADAS applications such as LCA and CWS.

CACC uses information from other vehicles that may be received via the network interface 2624 and/or the wireless antenna(s) 2626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 2600), while the I2V communication concept provides information about traffic further ahead. CACC systems may include either or both I2V and V2V information sources. Given the information of the vehicles ahead of the vehicle 2600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 2660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 2660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 2600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 2600 if the vehicle 2600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 2660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 2600 is backing up. Some RCTW systems include AEB to ensure that the vehicle brakes are applied to avoid a crash. RCTW systems may use one or more rear-facing RADAR sensor(s) 2660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 2600, the vehicle 2600 itself must, in the case of conflicting results, decide whether to heed the result from a primary computer or a secondary computer (e.g., a first controller 2636 or a second controller 2636). For example, in some embodiments, the ADAS system 2638 may be a backup and/or secondary computer for providing perception information to a backup computer rationality module. The backup computer rationality monitor may run a redundant diverse software on hardware components to detect faults in perception and dynamic driving tasks. Outputs from the ADAS system 2638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 2604.

In other examples, ADAS system 2638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 2638 may be fed into the primary computer's perception block and/or the primary computer's dynamic driving task block. For example, if the ADAS system 2638 indicates a forward crash warning due to an object immediately ahead, the perception block may use this information when identifying objects. In other examples, the secondary computer may have its own neural network which is trained and thus reduces the risk of false positives, as described herein.

The vehicle 2600 may further include the infotainment SoC 2630 (e.g., an in-vehicle infotainment system (IVI)). Although illustrated and described as a SoC, the infotainment system may not be a SoC, and may include two or more discrete components. The infotainment SoC 2630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 2600. For example, the infotainment SoC 2630 may radios, disk players, navigation systems, video players, USB and Bluetooth connectivity, carputers, in-car entertainment, Wi-Fi, steering wheel audio controls, hands free voice control, a heads-up display (HUD), an HMI display 2634, a telematics device, a control panel (e.g., for controlling and/or interacting with various components, features, and/or systems), and/or other components. The infotainment SoC 2630 may further be used to provide information (e.g., visual and/or audible) to a user(s) of the vehicle, such as information from the ADAS system 2638, autonomous driving information such as planned vehicle maneuvers, trajectories, surrounding environment information (e.g., intersection information, vehicle information, road information, etc.), and/or other information.

The infotainment SoC 2630 may include GPU functionality. The infotainment SoC 2630 may communicate over the bus 2602 (e.g., CAN bus, Ethernet, etc.) with other devices, systems, and/or components of the vehicle 2600. In some examples, the infotainment SoC 2630 may be coupled to a supervisory MCU such that the GPU of the infotainment system may perform some self-driving functions in the event that the primary controller(s) 2636 (e.g., the primary and/or backup computers of the vehicle 2600) fail. In such an example, the infotainment SoC 2630 may put the vehicle 2600 into a chauffeur to safe stop mode, as described herein.

The vehicle 2600 may further include an instrument cluster 2632 (e.g., a digital dash, an electronic instrument cluster, a digital instrument panel, etc.). The instrument cluster 2632 may include a controller and/or supercomputer (e.g., a discrete controller or supercomputer). The instrument cluster 2632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 2630 and the instrument cluster 2632. In other words, the instrument cluster 2632 may be included as part of the infotainment SoC 2630, or vice versa.

Figure 26D:
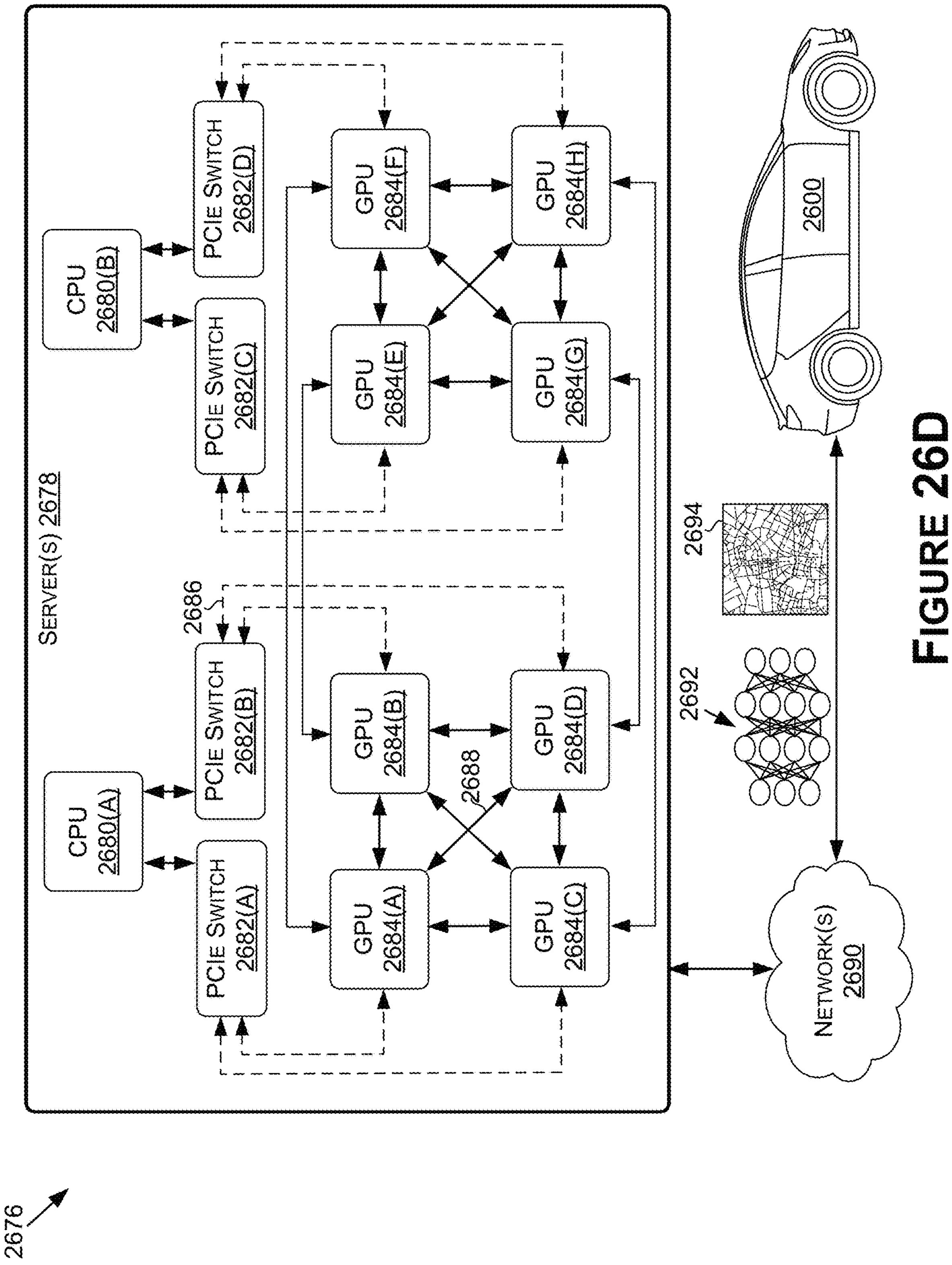
FIG. 26D is a system diagram for communication between cloud-based server(s) and the example autonomous vehicle of FIG. 26A, in accordance with some embodiments of the present disclosure.

FIG. 26D is a system diagram for communication between cloud-based server(s) and the example autonomous vehicle 2600 of FIG. 26A, in accordance with some embodiments of the present disclosure. The system 2676 may include server(s) 2678, network(s) 2690, and vehicles, including the vehicle 2600. The server(s) 2678 may include a plurality of GPUs 2684(A)-2684(H) (collectively referred to herein as GPUs 2684), PCIe switches 2682(A)-2682(H) (collectively referred to herein as PCIe switches 2682), and/or CPUs 2680(A)-2680(B) (collectively referred to herein as CPUs 2680). The GPUs 2684, the CPUs 2680, and the PCIe switches may be interconnected with high-speed interconnects such as, for example and without limitation, NVLink interfaces 2688 developed by NVIDIA and/or PCIe connections 2686. In some examples, the GPUs 2684 are connected via NVLink and/or NVSwitch SoC and the GPUs 2684 and the PCIe switches 2682 are connected via PCIe interconnects. Although eight GPUs 2684, two CPUs 2680, and two PCIe switches are illustrated, this is not intended to be limiting. Depending on the embodiment, each of the server(s) 2678 may include any number of GPUs 2684, CPUs 2680, and/or PCIe switches. For example, the server(s) 2678 may each include eight, sixteen, thirty-two, and/or more GPUs 2684.

The server(s) 2678 may receive, over the network(s) 2690 and from the vehicles, image data representative of images showing unexpected or changed road conditions, such as recently commenced road-work. The server(s) 2678 may transmit, over the network(s) 2690 and to the vehicles, neural networks 2692, updated neural networks 2692, and/or map information 2694, including information regarding traffic and road conditions. The updates to the map information 2694 may include updates for the HD map 2622, such as information regarding construction sites, potholes, detours, flooding, and/or other obstructions. In some examples, the neural networks 2692, the updated neural networks 2692, and/or the map information 2694 may have resulted from new training and/or experiences represented in data received from any number of vehicles in the environment, and/or based on training performed at a datacenter (e.g., using the server(s) 2678 and/or other servers).

The server(s) 2678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 2690, and/or the machine learning models may be used by the server(s) 2678 to remotely monitor the vehicles.

In some examples, the server(s) 2678 may receive data from the vehicles and apply the data to up-to-date real-time neural networks for real-time intelligent inferencing. The server(s) 2678 may include deep-learning supercomputers and/or dedicated AI computers powered by GPU(s) 2684, such as a DGX and DGX Station machines developed by NVIDIA. However, in some examples, the server(s) 2678 may include deep learning infrastructure that use only CPU-powered datacenters.

The deep-learning infrastructure of the server(s) 2678 may be capable of fast, real-time inferencing, and may use that capability to evaluate and verify the health of the processors, software, and/or associated hardware in the vehicle 2600. For example, the deep-learning infrastructure may receive periodic updates from the vehicle 2600, such as a sequence of images and/or objects that the vehicle 2600 has located in that sequence of images (e.g., via computer vision and/or other machine learning object classification techniques). The deep-learning infrastructure may run its own neural network to identify the objects and compare them with the objects identified by the vehicle 2600 and, if the results do not match and the infrastructure concludes that the AI in the vehicle 2600 is malfunctioning, the server(s) 2678 may transmit a signal to the vehicle 2600 instructing a fail-safe computer of the vehicle 2600 to assume control, notify the passengers, and complete a safe parking maneuver.

For inferencing, the server(s) 2678 may include the GPU(s) 2684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 27:
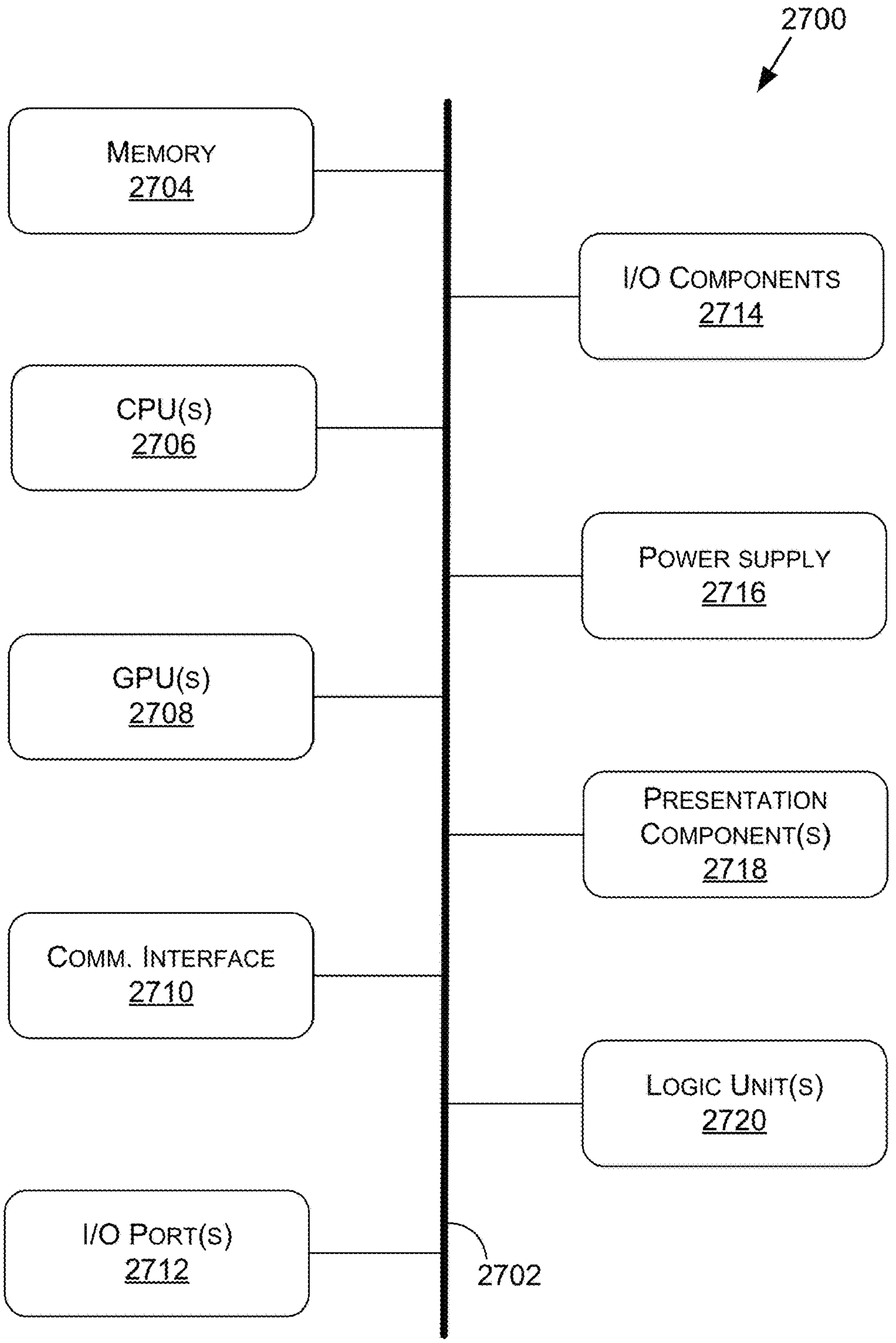
FIG. 27 is a block diagram of an example computing device suitable for use in implementing some embodiments of the present disclosure.

FIG. 27 is a block diagram of an example computing device(s) 2700 suitable for use in implementing some embodiments of the present disclosure. Computing device 2700 may include an interconnect system 2702 that directly or indirectly couples the following devices: memory 2704, one or more central processing units (CPUs) 2706, one or more graphics processing units (GPUs) 2708, a communication interface 2710, input/output (I/O) ports 2712, input/output components 2714, a power supply 2716, one or more presentation components 2718 (e.g., display(s)), and one or more logic units 2720. In at least one embodiment, the computing device(s) 2700 may comprise one or more virtual machines (VMs), and/or any of the components thereof may comprise virtual components (e.g., virtual hardware components). For non-limiting examples, one or more of the GPUs 2708 may comprise one or more vGPUs, one or more of the CPUs 2706 may comprise one or more vCPUs, and/or one or more of the logic units 2720 may comprise one or more virtual logic units. As such, a computing device(s) 2700 may include discrete components (e.g., a full GPU dedicated to the computing device 2700), virtual components (e.g., a portion of a GPU dedicated to the computing device 2700), or a combination thereof.

Although the various blocks of FIG. 27 are shown as connected via the interconnect system 2702 with lines, this is not intended to be limiting and is for clarity only. For example, in some embodiments, a presentation component 2718, such as a display device, may be considered an I/O component 2714 (e.g., if the display is a touch screen). As another example, the CPUs 2706 and/or GPUs 2708 may include memory (e.g., the memory 2704 may be representative of a storage device in addition to the memory of the GPUs 2708, the CPUs 2706, and/or other components). In other words, the computing device of FIG. 27 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 27.

The interconnect system 2702 may represent one or more links or busses, such as an address bus, a data bus, a control bus, or a combination thereof. The interconnect system 2702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 2706 may be directly connected to the memory 2704. Further, the CPU 2706 may be directly connected to the GPU 2708. Where there is direct, or point-to-point connection between components, the interconnect system 2702 may include a PCIe link to carry out the connection. In these examples, a PCI bus need not be included in the computing device 2700.

The memory 2704 may include any of a variety of computer-readable media. The computer-readable media may be any available media that may be accessed by the computing device 2700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 2704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 2700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 2706 may be configured to execute at least some of the computer-readable instructions to control one or more components of the computing device 2700 to perform one or more of the methods and/or processes described herein. The CPU(s) 2706 may each include one or more cores (e.g., one, two, four, eight, twenty-eight, seventy-two, etc.) that are capable of handling a multitude of software threads simultaneously. The CPU(s) 2706 may include any type of processor, and may include different types of processors depending on the type of computing device 2700 implemented (e.g., processors with fewer cores for mobile devices and processors with more cores for servers). For example, depending on the type of computing device 2700, the processor may be an Advanced RISC Machines (ARM) processor implemented using Reduced Instruction Set Computing (RISC) or an x86 processor implemented using Complex Instruction Set Computing (CISC). The computing device 2700 may include one or more CPUs 2706 in addition to one or more microprocessors or supplementary co-processors, such as math co-processors.

In addition to or alternatively from the CPU(s) 2706, the GPU(s) 2708 may be configured to execute at least some of the computer-readable instructions to control one or more components of the computing device 2700 to perform one or more of the methods and/or processes described herein. One or more of the GPU(s) 2708 may be an integrated GPU (e.g., with one or more of the CPU(s) 2706 and/or one or more of the GPU(s) 2708 may be a discrete GPU. In embodiments, one or more of the GPU(s) 2708 may be a coprocessor of one or more of the CPU(s) 2706. The GPU(s) 2708 may be used by the computing device 2700 to render graphics (e.g., 3D graphics) or perform general purpose computations. For example, the GPU(s) 2708 may be used for General-Purpose computing on GPUs (GPGPU). The GPU(s) 2708 may include hundreds or thousands of cores that are capable of handling hundreds or thousands of software threads simultaneously. The GPU(s) 2708 may generate pixel data for output images in response to rendering commands (e.g., rendering commands from the CPU(s) 2706 received via a host interface). The GPU(s) 2708 may include graphics memory, such as display memory, for storing pixel data or any other suitable data, such as GPGPU data. The display memory may be included as part of the memory 2704. The GPU(s) 2708 may include two or more GPUs operating in parallel (e.g., via a link). The link may directly connect the GPUs (e.g., using NVLINK) or may connect the GPUs through a switch (e.g., using NVSwitch). When combined together, each GPU 2708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 2706 and/or the GPU(s) 2708, the logic unit(s) 2720 may be configured to execute at least some of the computer-readable instructions to control one or more components of the computing device 2700 to perform one or more of the methods and/or processes described herein. In embodiments, the CPU(s) 2706, the GPU(s) 2708, and/or the logic unit(s) 2720 may discretely or jointly perform any combination of the methods, processes and/or portions thereof. One or more of the logic units 2720 may be part of and/or integrated in one or more of the CPU(s) 2706 and/or the GPU(s) 2708 and/or one or more of the logic units 2720 may be discrete components or otherwise external to the CPU(s) 2706 and/or the GPU(s) 2708. In embodiments, one or more of the logic units 2720 may be a coprocessor of one or more of the CPU(s) 2706 and/or one or more of the GPU(s) 2708.

Examples of the logic unit(s) 2720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 2710 may include one or more receivers, transmitters, and/or transceivers that enable the computing device 2700 to communicate with other computing devices via an electronic communication network, included wired and/or wireless communications. The communication interface 2710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 2720 and/or communication interface 2710 may include one or more data processing units (DPUs) to transmit data received over a network and/or through interconnect system 2702 directly to (e.g., a memory of) one or more GPU(s) 2708.

The I/O ports 2712 may enable the computing device 2700 to be logically coupled to other devices including the I/O components 2714, the presentation component(s) 2718, and/or other components, some of which may be built in to (e.g., integrated in) the computing device 2700. Illustrative I/O components 2714 include a microphone, mouse, keyboard, joystick, game pad, game controller, satellite dish, scanner, printer, wireless device, etc. The I/O components 2714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 2700. The computing device 2700 may be include depth cameras, such as stereoscopic camera systems, infrared camera systems, RGB camera systems, touchscreen technology, and combinations of these, for gesture detection and recognition. Additionally, the computing device 2700 may include accelerometers or gyroscopes (e.g., as part of an inertia measurement unit (IMU)) that enable detection of motion. In some examples, the output of the accelerometers or gyroscopes may be used by the computing device 2700 to render immersive augmented reality or virtual reality.

The power supply 2716 may include a hard-wired power supply, a battery power supply, or a combination thereof. The power supply 2716 may provide power to the computing device 2700 to enable the components of the computing device 2700 to operate.

The presentation component(s) 2718 may include a display (e.g., a monitor, a touch screen, a television screen, a heads-up-display (HUD), other display types, or a combination thereof), speakers, and/or other presentation components. The presentation component(s) 2718 may receive data from other components (e.g., the GPU(s) 2708, the CPU(s) 2706, DPUs, etc.), and output the data (e.g., as an image, video, sound, etc.).

Example Data Center

Figure 28:
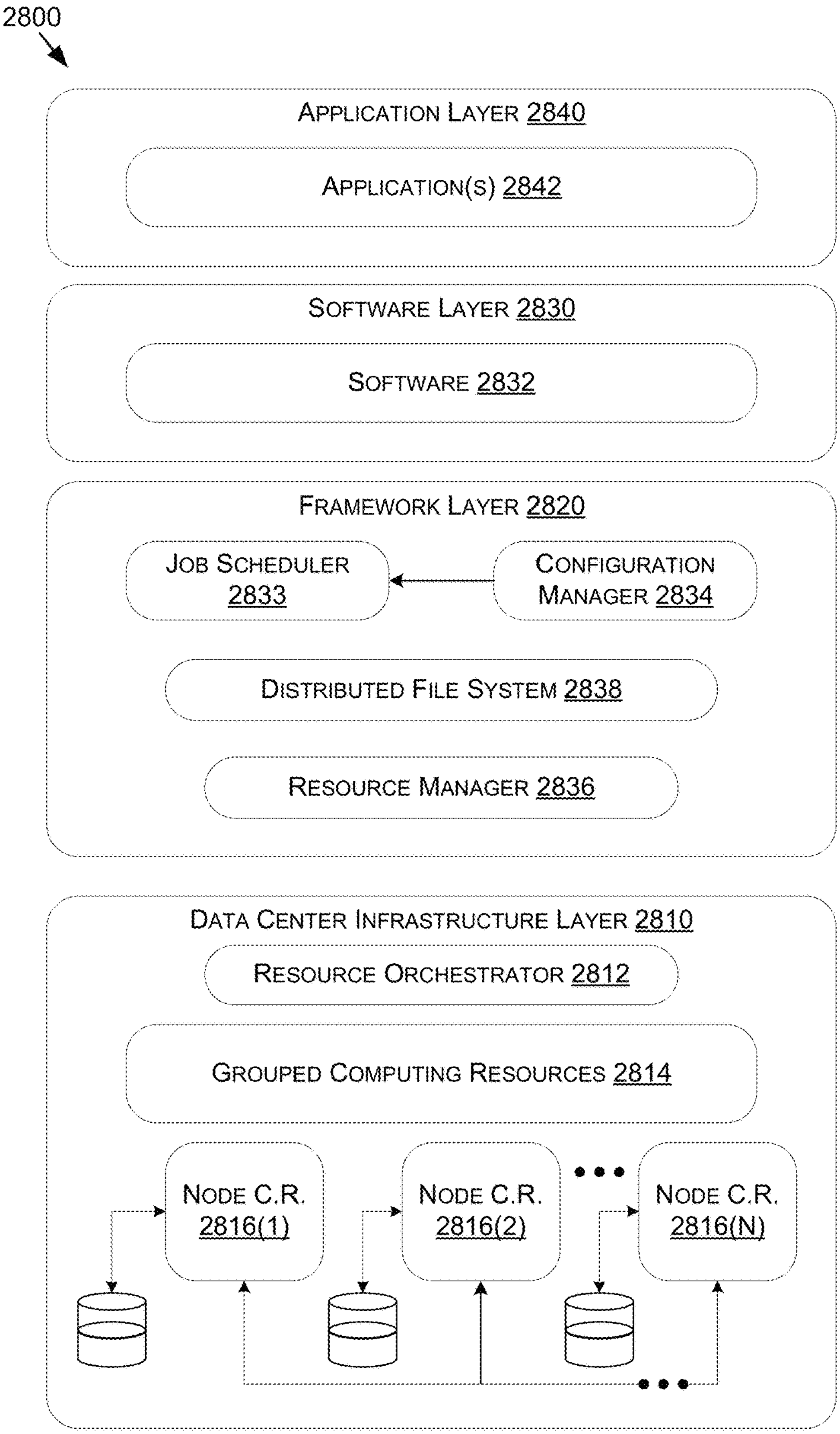
FIG. 28 is a block diagram of an example data center suitable for use in implementing some embodiments of the present disclosure.

FIG. 28 illustrates an example data center 2800 that may be used in at least one embodiments of the present disclosure. The data center 2800 may include a data center infrastructure layer 2810, a framework layer 2820, a software layer 2830, and/or an application layer 2840.

As shown in FIG. 28, the data center infrastructure layer 2810 may include a resource orchestrator 2812, grouped computing resources 2814, and node computing resources ("node C.R.s") 2816(1)-2816(N), where "N" represents any whole, positive integer. In at least one embodiment, node C.R.s 2816(1)-2816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 2816(1)-2816(N) may correspond to a server having one or more of the above-mentioned computing resources. In addition, in some embodiments, the node C.R.s 2816(1)-28161 (N) may include one or more virtual components, such as vGPUs, vCPUs, and/or the like, and/or one or more of the node C.R.s 2816(1)-2816(N) may correspond to a virtual machine (VM).

In at least one embodiment, grouped computing resources 2814 may include separate groupings of node C.R.s 2816 housed within one or more racks (not shown), or many racks housed in data centers at various geographical locations (also not shown). Separate groupings of node C.R.s 2816 within grouped computing resources 2814 may include grouped compute, network, memory or storage resources that may be configured or allocated to support one or more workloads. In at least one embodiment, several node C.R.s 2816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 2812 may configure or otherwise control one or more node C.R.s 2816(1)-2816(N) and/or grouped computing resources 2814. In at least one embodiment, resource orchestrator 2812 may include a software design infrastructure (SDI) management entity for the data center 2800. The resource orchestrator 2812 may include hardware, software, or some combination thereof.

In at least one embodiment, as shown in FIG. 28, framework layer 2820 may include a job scheduler 2833, a configuration manager 2834, a resource manager 2836, and/or a distributed file system 2838. The framework layer 2820 may include a framework to support software 2832 of software layer 2830 and/or one or more application(s) 2842 of application layer 2840. The software 2832 or application(s) 2842 may respectively include web-based service software or applications, such as those provided by Amazon Web Services, Google Cloud and Microsoft Azure. The framework layer 2820 may be, but is not limited to, a type of free and open-source software web application framework such as Apache Spark™ (hereinafter "Spark") that may utilize distributed file system 2838 for large-scale data processing (e.g., "big data"). In at least one embodiment, job scheduler 2833 may include a Spark driver to facilitate scheduling of workloads supported by various layers of data center 2800. The configuration manager 2834 may be capable of configuring different layers such as software layer 2830 and framework layer 2820 including Spark and distributed file system 2838 for supporting large-scale data processing. The resource manager 2836 may be capable of managing clustered or grouped computing resources mapped to or allocated for support of distributed file system 2838 and job scheduler 2833. In at least one embodiment, clustered or grouped computing resources may include grouped computing resource 2814 at data center infrastructure layer 2810. The resource manager 2836 may coordinate with resource orchestrator 2812 to manage these mapped or allocated computing resources.

In at least one embodiment, software 2832 included in software layer 2830 may include software used by at least portions of node C.R.s 2816(1)-2816(N), grouped computing resources 2814, and/or distributed file system 2838 of framework layer 2820. One or more types of software may include, but are not limited to, Internet web page search software, e-mail virus scan software, database software, and streaming video content software.

In at least one embodiment, application(s) 2842 included in application layer 2840 may include one or more types of applications used by at least portions of node C.R.s 2816 (1)-2816(N), grouped computing resources 2814, and/or distributed file system 2838 of framework layer 2820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 2834, resource manager 2836, and resource orchestrator 2812 may implement any number and type of self-modifying actions based on any amount and type of data acquired in any technically feasible fashion. Self-modifying actions may relieve a data center operator of data center 2800 from making possibly bad configuration decisions and possibly avoiding underutilized and/or poor performing portions of a data center.

The data center 2800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 2800. In at least one embodiment, trained or deployed machine learning models corresponding to one or more neural networks may be used to infer or predict information using resources described above with respect to the data center 2800 by using weight parameters calculated through one or more training techniques, such as but not limited to those described herein.

In at least one embodiment, the data center 2800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 2700 of FIG. 27—e.g., each device may include similar components, features, and/or functionality of the computing device(s) 2700. In addition, where backend devices (e.g., servers, NAS, etc.) are implemented, the backend devices may be included as part of a data center 2800, an example of which is described in more detail herein with respect to FIG. 28.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 2700 described herein with respect to FIG. 27. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

1. A method comprising: selectively analyzing a graph based at least on costs associated with at least one of vertices or edges of the graph: the vertices indexed at least by configurations of a machine in a configuration space and by maneuver types used by the machine to traverse the configurations, the edges including maneuver edges linking first groups of the vertices corresponding to a same maneuver type of the maneuver types, and the edges including transition edges linking second groups of the vertices corresponding to different maneuver types of the maneuver types; based at least on the selectively analyzing, determining one or more paths through the graph; and performing one or more control operations associated with the machine based at least on the one or more paths.

2. The method of any of 1, wherein the maneuver types correspond to respective turns having different curvatures.

3. The method of any of 1-2, wherein the maneuver types include a maneuver type having a first variant that is a reversed version of a second variant of the maneuver type.

4. The method of any of 1-3, wherein at least one node of the vertices represents a transition state between at least two maneuver types of the maneuver types.

5. The method of any of 1-4, wherein the maneuver types include a first maneuver type representing a forward version of a maneuver and a second maneuver type representing a reversed version of the maneuver.

6. The method of any of 1-5, wherein at least one node of the vertices represents a transition state between at least two maneuver types of the maneuver types and represents at least one maneuver type of the maneuver types that is different than the at least two maneuver types.

7. The method of any of 6, wherein the at least one maneuver type includes a straight maneuver type, and the at least two maneuver types include at least one left turn maneuver type and at least one right turn maneuver type.

8. The method of any of 1-7, wherein at least one node of the vertices represents a transition state between at least two maneuver types of the maneuver types.

9. The method of any of 1-8, wherein the computing of the costs is based at least on transition costs corresponding to the transition edges and maneuver costs corresponding to the maneuver edges.

10. The method of any of 1-9, wherein the maneuver types include a set of longitudinally extremal maneuvers for a longitudinally extremal model of the machine.

11. A system comprising: one or more processors to perform operations including: selectively analyzing vertices or edges of a graph, the vertices indexed at least by configurations of a machine in a configuration space and by maneuver types used by the machine to traverse the configurations; based at least on the selectively analyzing, determining one or more paths through the graph; and performing, based at least on the one or more paths, one or more control operations associated with the machine.

12. The system of any of 11, wherein the maneuver types correspond to respective turns having different curvatures.

13. The system of any of 11-12, wherein the maneuver types include a maneuver type having a first variant that is a reversed version of a second variant of the maneuver type.

14. The system of any of 11-13, wherein at least one node of the vertices represents a transition state between at least two maneuver types of the maneuver types.

15. The system of any of 11-14, wherein the maneuver types include a first maneuver type representing forward version of a maneuver and a second maneuver type representing a reversed version of the maneuver.

16. The system of any of 11-15, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

17. At least one processor comprising: one or more circuits to perform one or more control operations associated with a machine using one or more paths through a graph, the one or more paths determined based at least on selectively analyzing vertices and edges of the graph, the vertices corresponding to configurations of a machine in a configuration space and respective maneuver types used by the machine to traverse the configurations.

18. The at least one processor of any of 17, wherein the maneuver types correspond to respective turns having different curvatures.

19. The at least one processor of any of 17-18, wherein the maneuver types include a maneuver type having a first variant that is a reversed version of a second variant of the maneuver type.

20. The at least one processor of any of 17-19, wherein the at least one processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

21. A method comprising: comparing one or more first cost values for a machine to traverse a configuration space using a first maneuver type to one or more second cost values for the machine to traverse the configuration space using a second maneuver type; based at least on the comparing, overwriting the one or more second cost values with the one or more first cost values in a memory volume that corresponds to configurations of the configuration space in a transition state between the first maneuver type and the second maneuver type; determining one or more paths through the configuration space using the one or more first cost values; and performing one or more control operations associated with the machine based at least on the one or more paths.

22. The method of any of 21, wherein the first maneuver type and the second maneuver type correspond to maneuvers leaving a transition state and entering back into the transition state.

23. The method of any of 21-22, comprising computing the one or more first cost values using one or more maneuver costs corresponding to the machine traversing the configuration space and one or more transition costs corresponding to the machine transitioning between maneuver types.

24. The method of any of 21-23, wherein the comparing indicates the one or more first cost values represent a lower cost than the one or more second cost values, and the overwriting is based at least on the one or more first cost values representing the lower cost.

25. The method of any of 21-24, wherein the comparing is based at least on performing value iteration through a set of the configurations reached by a maneuver corresponding to the first maneuver type.

26. The method of any of 21-25, further comprising: iteratively and in parallel, computing a first set of cost values through a first set of the configurations of a first maneuver corresponding to the first maneuver type and a second set of cost values through a second set of the configurations of a second maneuver corresponding to the second maneuver type, wherein the first set of cost values include the one or more first cost values and the second set of cost values includes the one or more second cost values.

27. The method of any of 21-26, wherein the first maneuver type is a left turn maneuver type, and the second maneuver type is a right turn maneuver type.

28. The method of any of 21-27, wherein the one or more first cost values model the machine changing gear and steering upon one or more of entering or exiting a maneuver corresponding to the first maneuver type.

29. A system comprising: one or more processors to perform operations including: determining cost values for a configuration in a configuration space using maneuver types, a cost value from the cost values corresponding to a respective maneuver type of the maneuver types being used by a machine to reach the configuration; selecting the cost value corresponding to the respective maneuver type from the cost values for storage at one or more memory locations that correspond to the configuration; determining one or more paths through the configuration space using the cost value; and performing one or more control operations associated with the machine based at least on the one or more paths.

30. The system of any of 29, wherein the one or more memory locations are in a memory volume that corresponds to a transition state of the machine transitioning between the maneuver types.

31. The system of any of 29-30, wherein the maneuver types correspond to maneuvers leaving a transition state and entering back into the transition state.

32. The system of any of 29-31, further comprising computing the cost value using one or more maneuver costs corresponding to the machine traversing the configuration space and one or more transition costs corresponding to the machine transitioning between two of the maneuver types.

33. The system of any of 29-32, wherein the selecting is based at least on the cost value representing a lowest cost of the cost values.

34. The system of any of 29-33, wherein the selecting is based at least on performing value iteration through configurations reached by a maneuver corresponding to the respective maneuver type.

35. The system of any of 29-34, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

36. At least one processor comprising: one or more circuits to perform one or more control operations associated with a machine using one or more paths corresponding to a cost value associated with a configuration of a configuration space, the cost value being stored at one or more memory locations corresponding to the configuration based at least on being selected from cost values corresponding to maneuver types the machine may use to reach the configuration.

37. The at least one processor of any of 36, wherein the one or more memory locations are in a memory volume that corresponds to a transition state of the machine transitioning between maneuver types.

38. The at least one processor of any of 36-37, wherein the maneuver types correspond to maneuvers leaving a transition state and entering back into the transition state.

39. The at least one processor of any of 36-38, wherein the cost value is selected for storage based at least on the cost value representing a lowest cost of the cost values.

40. The at least one processor of any of 36-39, wherein the at least one processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

41. A method comprising: computing one or more cost values for a machine to traverse configurations of a configuration space using one or more maneuvers, the configuration space being parameterized using one or more first variables corresponding to a pose of the machine and one or more second variables corresponding to a curvature of steering of the machine; determining one or more paths through the configuration space using the one or cost values; and performing one or more control operations associated with the machine based at least on the one or more paths.

42. The method of any of 41, wherein the configuration space is further parameterized using one or more third variables corresponding to one or more of a velocity or acceleration of the machine.

43. The method of any of 41-42, wherein the one or more cost values are computed using one or more discretized spatial grids representing of the configurations of the configuration space.

44. The method of any of 41-43, wherein the one or more maneuvers include a first maneuver having a first constant rate of change to the curvature and a second maneuver having a second constant rate to the curvature.

45. The method of any of 41-44, wherein the first maneuver forms a first clothoid and the second maneuver forms a second clothoid.

46. The method of any of 41-45, wherein the one or more maneuvers include a plurality of maneuvers that span across an array of fixed curvature maneuver volumes and the computing of the one or more cost values includes analyzing the plurality of maneuvers across the array.

47. The method of any of 41-46, wherein the computing the one or more cost values includes analyzing a graph of the configuration space that includes one or more first vertices corresponding to the machine performing the one or more maneuvers and one or more second vertices corresponding to a transition state in which the machine is stopped and changing steering profiles.

48. The method of any of 41-47, wherein the one or more maneuvers include a set of extremal maneuvers for an extremal model of the machine in which a rate of change for the curvature is held at a constant extreme.

49. A system comprising: one or more processors to perform operations including: analyzing one or more discretized spatial grids representing configurations of a machine to model the machine traversing the configurations using one or more maneuvers, the configurations being parameterized using one or more variables corresponding to a curvature of steering of the machine; based at least on the analyzing, determining one or more paths through the configurations; and performing one or more control operations associated with the machine based at least on the one or more paths.

50. The system of any of 49, wherein the configurations are further parameterized using one or more second variables corresponding to one or more of a velocity or acceleration of the machine.

51. The system of any of 49-50, wherein the one or more maneuvers include a first maneuver having a first constant rate of change to the curvature and a second maneuver having a second constant rate to the curvature.

52. The system of any of 49-51, wherein the first maneuver forms a first clothoid and the second maneuver forms a second clothoid.

53. The system of any of 49-52, wherein the one or more maneuvers include a plurality of maneuvers that span across an array of fixed curvature maneuver volumes and the analyzing includes analyzing the plurality of maneuvers across the array.

54. The system of any of 49-53, wherein the analyzing includes analyzing a graph of a configuration space that includes one or more first vertices corresponding to the machine performing the one or more maneuvers and one or more second vertices corresponding to a transition state in which the machine is stopped and changing steering profiles.

55. The system of any of 49-54, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

56. At least one processor comprising: one or more circuits to perform one or more control operations associated with a machine using one or more paths corresponding to a configuration space parameterized using one or more variables corresponding to a curvature of steering of the machine, the one or more paths being determined based at least on modeling the machine traversing the configuration space using one or more maneuvers.

57. The at least one processor of any of 56, wherein the configuration space is further parameterized using one or more second variables corresponding to one or more of a velocity or acceleration of the machine.

58. The at least one processor of any of 56-57, wherein the modeling is performed using one or more discretized spatial grids representing configurations of the configuration space.

59. The at least one processor of any of 56-58, wherein the one or more maneuvers include a first maneuver having a first constant rate of change to the curvature and a second maneuver having a second constant rate to the curvature.

60. The at least one processor of any of 56-59, wherein the at least one processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:

selectively analyzing a graph based at least on costs associated with at least one of vertices or edges of the graph:

the vertices indexed at least by configurations of a machine in a configuration space and by maneuver types used by the machine to traverse the configurations, the edges including maneuver edges linking first groups of the vertices corresponding to different configurations and a same maneuver type of the maneuver types, and the edges including transition edges linking within second groups of the vertices, one or more first vertices representing a first maneuver type to one or more second vertices representing a same configuration of the configurations as the one or more first vertices, and a second maneuver type of the maneuver types that is different than the first maneuver type, the analyzing using the transition edges to model, in the costs for the second groups, transition costs of the machine switching between the first maneuver type and the second maneuver type while retaining the same configuration;

based at least on the selectively analyzing, determining, using the costs, one or more paths through the graph; and performing one or more control operations associated with the machine based at least on the one or more paths.

2. The method of claim 1, wherein the maneuver types correspond to respective turns having different curvatures.

3. The method of claim 1, wherein the maneuver types include a maneuver type having a first variant that is a reversed version of a second variant of the maneuver type.

4. The method of claim 1, wherein at least one node of the vertices represents a transition state between at least two maneuver types of the maneuver types.

5. The method of claim 1, wherein the maneuver types include a first maneuver type representing a forward version of a maneuver and a second maneuver type representing a reversed version of the maneuver.

6. The method of claim 1, wherein the analyzing includes:

evaluating respective maneuver costs for reaching the same configuration respectively using the first maneuver type and the second maneuver type;

storing a selected cost of the respective maneuver costs in a shared memory location of a transition state representing the same configuration; and applying a transition cost of the transition costs to the selected cost accessed from the shared memory location to model the machine switching between the first maneuver type and the second maneuver type.

7. The method of claim 1, wherein the first maneuver type includes a straight maneuver type, and the second maneuver type includes at least one of a left turn maneuver type or a right turn maneuver type.

8. The method of claim 1, wherein the transition costs correspond to a time penalty for at least one of changing a gear of the machine or turning a steering wheel of the machine while the machine remains in the same configuration.

9. The method of claim 1, wherein the transition edges represent the transition costs and the maneuver edges represent maneuver costs that correspond to traveled distances and are incorporated with the transition costs to compute the costs.

10. The method of claim 1, wherein the transition edges form a star topology in which a transition vertex of the vertices represents a transition state between the one or more first vertices and the one or more second vertices.

11. A system comprising:

one or more processors to perform operations including:

selectively analyzing vertices or edges of a graph, the vertices indexed at least by configurations of a machine in a configuration space and by maneuver types used by the machine to traverse the configurations, the edges including transition edges linking within groups of the vertices, one or more first vertices representing a first maneuver type to one or more second vertices representing a same configuration of the configurations as the one or more first vertices, and a second maneuver type of the maneuver types that is different than the first maneuver type, the analyzing using the transition edges to model, in costs for the groups, transition costs of the machine switching between the first maneuver type and the second maneuver type while retaining the same configuration;

based at least on the selectively analyzing, determining, using the costs, one or more paths through the graph; and performing, based at least on the one or more paths, one or more control operations associated with the machine.

12. The system of claim 11, wherein the maneuver types correspond to respective turns having different curvatures.

13. The system of claim 11, wherein the maneuver types include a maneuver type having a first variant that is a reversed version of a second variant of the maneuver type.

14. The system of claim 11, wherein at least one node of the vertices represents a transition state between at least two maneuver types of the maneuver types.

15. The system of claim 11, wherein the maneuver types include a first maneuver type representing a forward version of a maneuver and a second maneuver type representing a reversed version of the maneuver.

16. The system of claim 11, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

17. At least one processor comprising:

one or more circuits to perform one or more control operations associated with a machine using one or more paths through a graph, the one or more paths determined based at least on selectively analyzing vertices and edges of the graph, the vertices corresponding to configurations of a machine in a configuration space and maneuver types used by the machine to traverse the configurations, the edges including transition edges linking within groups of the vertices, one or more first vertices representing a first maneuver type to one or more second vertices representing a same configuration of the configurations as the one or more first vertices, and a second maneuver type of the maneuver types that is different than the first maneuver type, the analyzing using the transition edges to model, in costs for the groups, transition costs of the machine switching between the first maneuver type and the second maneuver type while retaining the same configuration.

18. The at least one processor of claim 17, wherein the maneuver types correspond to respective turns having different curvatures.

19. The at least one processor of claim 17, wherein the maneuver types include a maneuver type having a first variant that is a reversed version of a second variant of the maneuver type.

20. The at least one processor of claim 17, wherein the at least one processor is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *